United States Patent
Edge

(10) Patent No.: US 9,402,163 B2
(45) Date of Patent: Jul. 26, 2016

(54) IN-BUILDING LOCATION SECURITY AND PRIVACY

(71) Applicant: QUALCOMM Incorporated, San Diego, CA (US)

(72) Inventor: Stephen William Edge, Escondido, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/301,134

(22) Filed: Jun. 10, 2014

(65) Prior Publication Data
US 2015/0024782 A1     Jan. 22, 2015

Related U.S. Application Data

(60) Provisional application No. 61/856,310, filed on Jul. 19, 2013.

(51) Int. Cl.
| H04W 4/04 | (2009.01) |
| H04W 12/06 | (2009.01) |
| H04W 12/10 | (2009.01) |
| H04W 12/12 | (2009.01) |
| H04W 4/02 | (2009.01) |

(52) U.S. Cl.
CPC ............... *H04W 4/04* (2013.01); *H04W 12/06* (2013.01); *H04W 12/10* (2013.01); *H04W 12/12* (2013.01); *H04W 4/02* (2013.01)

(58) Field of Classification Search
CPC ................................. H04W 4/04; H04W 12/06
USPC .......... 455/456.1, 456.3, 456.5, 456.6, 404.2, 455/517; 726/26, 27
See application file for complete search history.

(56) References Cited

U.S. PATENT DOCUMENTS

| 8,893,295 | B2 * | 11/2014 | Saxena | G06F 21/57 380/258 |
| 2005/0108372 | A1 * | 5/2005 | Guo | H04L 29/06 709/223 |
| 2006/0003784 | A1 * | 1/2006 | Chion | H04W 4/10 455/518 |
| 2008/0008157 | A1 | 1/2008 | Edge et al. | |

(Continued)

OTHER PUBLICATIONS

International Search Report and Written Opinion—PCT/US2014/045890—ISA/EPO—Oct. 1, 2014, 13 pgs.
Second Written Opinion from International Application No. PCT/US2014/045890, dated Jun. 25, 2015, 10 pp.
International Preliminary Report on Patentability—PCT/US2014/045890, European Patent Office—Munich, Germany, Oct. 2, 2015, 11 pgs.

*Primary Examiner* — Cong Tran
(74) *Attorney, Agent, or Firm* — Hunter Clark PLLC

(57) ABSTRACT

A location server includes: a first receiver module configured to receive, from a location-based services application server (LBS AS), a first identification for a first mobile device associated with the LBS AS; a second receiver module configured to receive, from an access/location network (ALN), a second identification for a second mobile device associated with the ALN; a comparison module, communicatively coupled to the first and second receiver modules, configured to determine whether the first and second identifications match and whether the first and second mobile devices are the same mobile device based at least in part on whether the first and second identifications match; and a location service information module, communicatively coupled to the comparison module, and configured to provide a location service for the first mobile device in response to the comparison module determining that the first and second mobile devices are the same mobile device.

44 Claims, 19 Drawing Sheets

(56) References Cited

U.S. PATENT DOCUMENTS

| | | | |
|---|---|---|---|
| 2011/0287779 A1* | 11/2011 | Harper | G01S 19/03 455/456.1 |
| 2012/0252418 A1 | 10/2012 | Kandekar et al. | |
| 2013/0045758 A1 | 2/2013 | Khorashadi et al. | |
| 2013/0067552 A1 | 3/2013 | Hawkes et al. | |
| 2013/0172010 A1 | 7/2013 | Kang et al. | |
| 2013/0184012 A1 | 7/2013 | Gupta et al. | |
| 2013/0191901 A1 | 7/2013 | Black | |
| 2013/0203383 A1 | 8/2013 | Stopel et al. | |
| 2013/0231133 A1* | 9/2013 | Soma | H04W 4/02 455/456.1 |
| 2015/0089660 A1* | 3/2015 | Song | G06F 3/0481 726/26 |

* cited by examiner

IN-BUILDING LOCATION SECURITY AND PRIVACY

CROSS-REFERENCE TO RELATED APPLICATIONS

This application claims the benefit of U.S. Provisional Application No. 61/856,310, filed Jul. 19, 2013, entitled "In-Building Location Security and Privacy," that is incorporated herein in its entirety for all purposes.

BACKGROUND

Support for accurate and reliable location of a mobile device in an indoor environment such a building, subway or venue is being developed but is currently not widely available nor as accurate or reliable as needed by applications, users and venue and building owners. Support for security and privacy in the context of in-building location is also at an early stage of development. For example, support for in-building location security and privacy, with the solution being developed by the In Location Alliance (ILA) is very limited. For example, several ways exist in which a mobile device (MD) can spoof a media access control (MAC) address of another MD in order to obtain the spoofed MD's location without authorization or to feed false location information to a location client of the spoofed MD. In the ILA architecture, there are three separate over-the-air (OTA) interfaces to an MD on which different MD identifiers (IDs) can be used. Verifying on a network side of the architecture that the same MD is at the end of each interface may be difficult.

SUMMARY

An example of a location server includes: a first receiver module configured to receive, from a location-based services application server, a first identification for a first mobile device associated with the location-based services application server; a second receiver module configured to receive, from an access/location network, a second identification for a second mobile device associated with the access/location network; a comparison module, communicatively coupled to the first receiver module and the second receiver module, configured to determine whether the first identification matches the second identification and to determine whether the first mobile device and the second mobile device are the same mobile device based at least in part on whether the first identification matches the second identification; and a location service information module, communicatively coupled to the comparison module, and configured to provide a location service for the first mobile device in response to the comparison module determining that the first mobile device and the second mobile device are the same mobile device.

Implementations of such a location server may include one or more of the following features. To provide the location service, the location service information module is configured to at least one of provide location assistance data to the first mobile device, provide a location estimate to the first mobile device, or provide a location estimate for the first mobile device to the location-based services application server. The location service information module is configured to obtain the location estimate for the first mobile device using at least one of measurements for the first mobile device provided by the access/location network, a location estimate for the first mobile device provided by the first mobile device, or location measurements provided by the first mobile device. The location server is a Secure User Plane Location (SUPL) Location Platform (SLP) and the location service information module is configured to obtain the location estimate for the first mobile device using a SUPL session between the location server and the first mobile device. The first identification includes a first internet protocol address and the second identification includes a second internet protocol address, or the first identification includes a first Media Access Control (MAC) address and the second identification includes a second MAC address. The location server further includes a venue identifier module configured to send a venue-assigned identifier (VID) to the first mobile device, the VID being temporarily unique to the first mobile device. The VID comprises a first Media Access Control (MAC) address. The server further includes a third receiver module configured to receive, from a third mobile device, a third identification for the third mobile device; where the comparison module is configured to determine whether the third identification matches the first identification and the second identification and to determine whether the first mobile device, the second mobile device, and the third mobile device are the same mobile device based at least in part on whether the third identification matches the first identification and the second identification; where the location service module is configured to provide the location service for the first mobile device is in response to the comparison module determining that the first mobile device, the second mobile device, and the third mobile device are the same mobile device; and where the first identification, the second identification, and the third identification all include an Internet Protocol address, a Venue Assigned Identity or a Media Access Control address.

Another example of a location server includes: first receiving means for receiving, from a location-based services application server, a first identification for a first mobile device associated with the location-based services application server; second receiving means for receiving, from an access/location network, a second identification for a second mobile device associated with the access/location network; comparison means, communicatively coupled to the first receiving means and the second receiving means, for determining whether the first identification matches the second identification; determining means for determining whether the first mobile device and the second mobile device are the same mobile device based at least in part on whether the first identification matches the second identification; and location service information means, communicatively coupled to the comparison means, for providing a location service for the first mobile device in response to the comparison means determining that the first mobile device and the second mobile device are the same mobile device.

Implementations of such a location server may include one or more of the following features. For providing the location service, the location service information means are configured to at least one of provide location assistance data to the first mobile device, provide a location estimate to the first mobile device, or provide a location estimate for the first mobile device to the location-based services application server. The location service information means are configured to obtain the location estimate for the first mobile device using at least one of measurements for the first mobile device provided by the access/location network, a location estimate for the first mobile device provided by the first mobile device, or location measurements provided by the first mobile device. The location server is a Secure User Plane Location (SUPL) Location Platform (SLP) and the location service information means are configured to obtain the location estimate for the first mobile device using a SUPL session between the location server and the first mobile device. The first identification includes a first internet protocol address and the second identification includes a second internet protocol address, or the first identification includes a first Media Access Control (MAC) address and the second identification includes a second MAC address. The location server further includes venue identifier means for sending a venue-assigned identifier (VID) to the first mobile device, the VID being temporarily unique to the first mobile device. The server further comprises a third receiving means for receiving, from a third mobile device, a third identification for the third mobile device; where the comparison means are configured to determine whether the third identification matches the first identification and the second identification and to determine whether the first mobile device, the second mobile device, and the third mobile device are the same mobile device based at least in part on whether the third identification matches the first identification and the second identification; where the location service means are configured to provide the location service for the first mobile device is in response to the comparison means determining that the first mobile device, the second mobile device, and the third mobile device are the same mobile device; and where the first identification, the second identification, and the third identification all include an Internet Protocol address, a Venue Assigned Identifier or a Media Access Control address.

An example of a mobile device includes: a transceiver configured to send and receive signals to and from a location-based services application server (LBS AS) and an access/location network (ALN); and a processor communicatively coupled to the processor and configured to: send, via the transceiver, a first identity for the mobile device toward the LBS AS; send, via the transceiver, a second identity for the mobile device toward the ALN, where the first identity and the second identity comprise a common identity for the mobile device; and obtain a location service from at least one of the LBS AS or the ALN via the transceiver.

Implementations of such a mobile device may include one or more of the following features. The common identity for the mobile device comprises an Internet Protocol (IP) address or a Media Access Control (MAC) address. To obtain the location service from the LBS AS or the ALN the processor is configured to receive, via the transceiver, at least one of location assistance data from the LBS AS or the ALN, or a location estimate for the mobile device from the LBS AS or the ALN. The processor is configured to: receive, via the transceiver, a venue-assigned identifier (VID) from the LBS AS or a location server, where the VID is temporarily unique to the mobile device; and include the VID in at least one of the first identity or the second identity. The VID comprises a Media Access Control (MAC) address. The processor is further configured to: send, via the transceiver, a third identity for the mobile device toward a location server, where the third identity comprises the common identity for the mobile device; and obtain, via the transceiver, another location service from the location server. The location server is a Secure User Plane Location (SUPL) Location Platform (SLP) and where to obtain the another location service from the location server, the processor is configured to receive, from the location server via the transceiver using a SUPL session, at least one of location assistance data or a location estimate for the mobile device. The ALN comprises at least one of an IEEE 802.11 WiFi access point (AP), a Bluetooth AP, or and a Femtocell.

Another example of a mobile device includes: means for sending a first identity for the mobile device toward a location-based services application server (LBS AS); means for sending a second identity for the mobile device toward an access/location network (ALN), where the first identity and the second identity comprise a common identity for the mobile device; and means for obtaining a location service from at least one of the LBS AS or the ALN.

Implementations of such a mobile device may include one or more of the following features. The common identity for the mobile device comprises an Internet Protocol (IP) address or a Media Access Control (MAC) address. For obtaining the location service from the LBS AS or the ALN, the means for obtaining are configured to receive at least one of location assistance data from the LBS AS or the ALN, or a location estimate for the mobile device from the LBS AS or the ALN. The mobile device further includes means for receiving a venue-assigned identifier (VID) from the LBS AS or a location server, where the VID is temporarily unique to the mobile device, and where at least one of the means for sending the first identity or the means for sending the second identity are configured to include the VID in at least one of the first identity or the second identity, respectively. The VID comprises a Media Access Control (MAC) address. The mobile device further includes: means for sending a third identity for the mobile device toward a location server, where the third identity comprises the common identity for the mobile device; and means for obtaining another location service from the location server. The location server is a Secure User Plane Location (SUPL) Location Platform (SLP) and where for obtaining the another location service from the location server, the means for obtaining the another location service are configured to receive, from the location server via the transceiver using a SUPL session, at least one of location assistance data or a location estimate for the mobile device.

Items and/or techniques described herein may provide one or more of the following capabilities, as well as other capabilities not mentioned. Spoofing of mobile device identifiers may be reduced or eliminated and mobile devices reliably identified on all three ILA over-the-air interfaces, e.g., by providing a venue-assigned identifier (such as a MAC address) for a mobile device. Better support for security, privacy, and service control may be provided for an ILA architecture. A mobile device or mobile device user may be identified to help ensure correct/authorized service is provided, including privacy support and billing. Sensitive venue information, e.g., access point locations and/or heat maps, may be restricted to trusted applications and/or trusted mobile devices. Mobile device information including mobile device location and identity may be protected against interception by third parties and provided only to entities approved or authorized by a mobile device user. Other capabilities may be provided and not every implementation according to the disclosure must provide any, let alone all, of the capabilities discussed. Further, it may be possible for an effect noted above to be achieved by means other than that noted, and a noted item/technique may not necessarily yield the noted effect.

DETAILED DESCRIPTION

Figure 1:
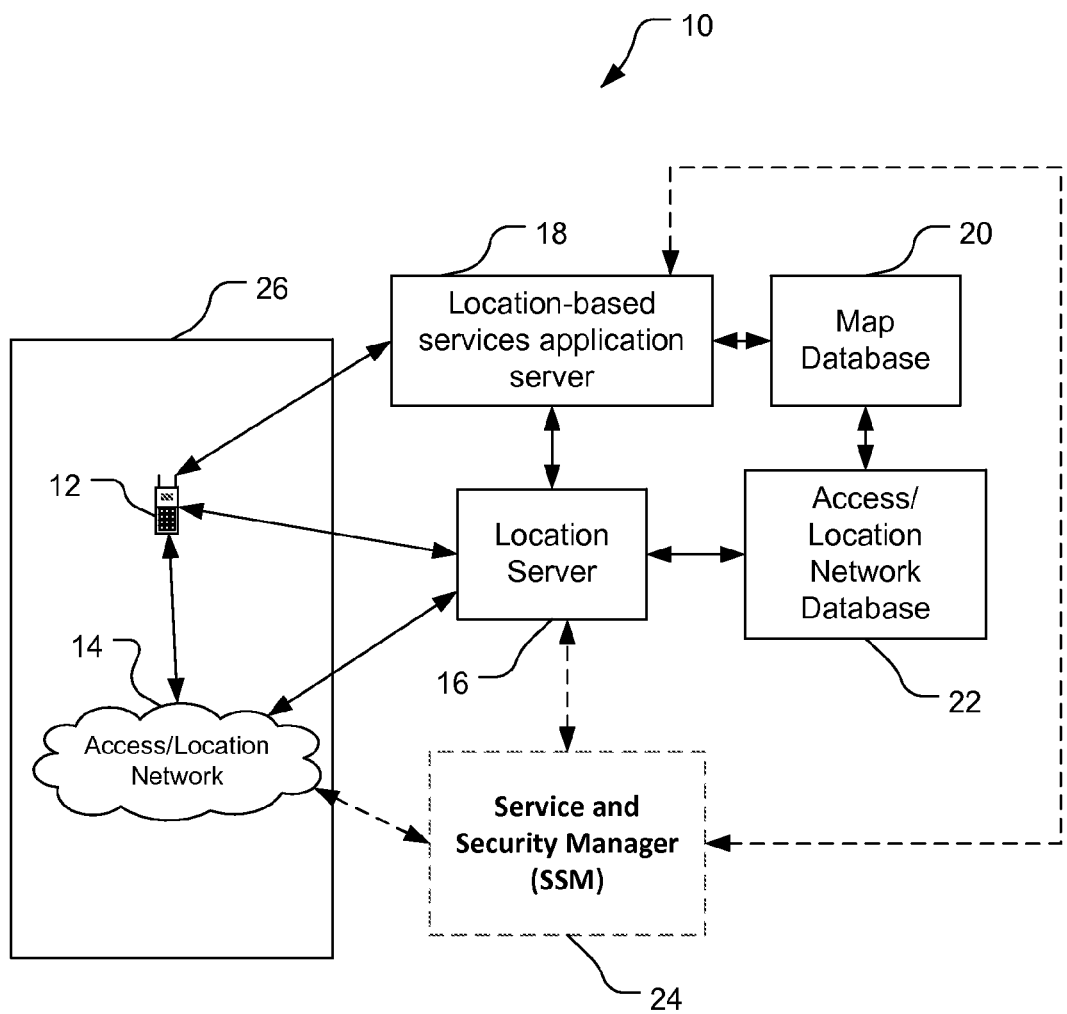
FIG. 1 is a simplified diagram of an architecture for performing indoor location of a mobile device accessing a wireless communication system.

Techniques in accordance with the disclosure may be used to support security and/or privacy for in-building location, e.g., based on the ILA architecture. For example, information concerning a mobile device (e.g., an address or identity for the mobile device) may be provided by the mobile device or by another entity to a location server through multiple interfaces, with the information received through at least one of the interfaces being trustworthy. The location server may compare the information received via the multiple interfaces and determine whether the information is for the same mobile device or possibly for different mobile devices. If the information is for the same mobile device, then information may be provided by the location server to a location-based services application server such that the location-based services application server provides a location service to the mobile device (e.g., to an application on the mobile device or to the user of the mobile device), to an external client, or to the owner or operator of a venue or building in which the mobile device is located. For example, a venue-assigned ID (VID) may be provided by a server to a mobile device on an OTA interface. The VID may be provided to the mobile device over a secure connection and thus the VID may be unknown to other mobile devices and not easily spoofed. The VID may then be provided by the mobile device to a location server via one or more other OTA interfaces. The VID would verify that the same mobile device was providing the VID to the location server. A MAC address may be used as a VID, which may provide some level of mobile device privacy (in addition to security) because a server associated with the venue would be assigning the mobile device MAC address and detection of the MAC address by other mobile devices, when transmitted by the mobile device, would not necessarily identify the mobile device (e.g., the user of the mobile device). The ILA architecture may also be extended by adding a service and security manager to support security, privacy, and service control.

A mobile device (MD) may be a cell phone, smart phone, PDA, laptop, tablet or some other device that is mobile and can send and receive wireless related communications and may be referred to as a mobile station, device, terminal, wireless terminal, mobile terminal, user equipment (UE), Secure User Plane Location (SUPL) Enabled Terminal (SET) or by some other name. It may be useful to obtain the location of the mobile device by the mobile device or by a network (e.g., a location server in a network) in order to provide the location to a user of the mobile device, to an application on the mobile device, or to an application in a network or venue. The provision of this location may enable provision of location-related services to the user of the mobile device, to an external client or to a network or venue. Examples of such location-related services may include provision of directions to a user of the mobile device, provision of maps (e.g., floor plans, a venue layout) applicable to the current location of the mobile device to the user of the mobile device, provision of assistance by a network or venue owner to the user of a mobile device (e.g., details of sales at nearby shops in a shopping mall or gate closure times at an airport) and collection of user-related information by a venue owner (e.g., the number of visitors to different parts of a venue).

Referring to FIG. 1, a communication system 10 includes a mobile device (MD) 12, an access/location network (ALN) 14, a location server (LS) 16, a location-based services application server (LBS AS) 18, a map database 20, an access/location network (ALN) database 22, and optionally, a service and security manager (SSM) 24. The MD 12 and the ALN 14 are disposed in an indoor area 26 that may be a building, venue, campus or some other structure or area with a significant amount of area indoors. The servers 16, 18 and the databases 20, 22 may belong to or may be operated on behalf of a venue that occupies part or all of the indoor area 26 (e.g., a shopping mall, college campus, hospital, airport or museum) and are shown disposed outside of the indoor area 26, but any, all, or any combination of the servers 16, 18 and/or the databases 20, 22 could be disposed within the indoor area 26. The system 10 is a communication system in that each of the MD 12, the ALN 14, the servers 16, 18, and the databases 20, 22 are configured to communicate with at least one of the other components of the system 10. Furthermore, the communication between the ALN 14 and the MD 12 may typically use wireless means—e.g., may employ IEEE 802.11x WiFi signaling, Bluetooth® signaling or wireless signaling as defined for cellular networks by standards organizations such as the 3rd Generation Partnership Project (3GPP) and the 3rd Generation Partnership Project 2 (3GPP2). For example, cellular communication between the ALN 14 and the MD 12 may be according to the Global System for Mobile communications (GSM) defined by 3GPP, Wideband Code Division Multiple Access (WCDMA) defined by 3GPP, Long Term Evolution (LTE) defined by 3GPP, or code division multiple access 2000 (cdma2000) defined by 3GPP2. The MD 12 can move or be moved to various locations within the indoor area 26 including onto different floors of the indoor area 26 when more than one floor is present. The MD 12, which may also be referred to as a User Equipment (UE), an access terminal (AT), a mobile station (MS), a subscriber unit, etc., may be any of a variety of devices such as a mobile phone, a smartphone, a laptop computer, a tablet computer, a personal digital assistant, etc. Only one MD 12 is shown in FIG. 1, and to simplify the discussion below, only this MD 12 is discussed, but more than one MD 12 may be used in the system 10. The ALN 14 may be a local network that includes access points (APs) that may support WiFi or Bluetooth wireless communication and/or femtocells that may support wireless communication according to WCDMA, LTE, or cdma2000. The SSM 24 is discussed more fully below, after discussion of FIGS. 1-16.

The communication system 10 may correspond in whole or in part to an indoor location system defined by the ILA. The Access/location Network (ALN) 14 may provide wireless communication access to the MD 12 and may enable communication between the MD 12 and other entities in the communication system 10 such as the location server (LS) 16 and the Location-Based Services Application Server (LBS AS) 18. The ALN 14 may also enable communication between the MD 12 and entities not shown in FIG. 1 such as the Internet and a location server or location servers remote from the indoor area 26. The LS 16 may support an ability to determine the current location of the MD 12 or enable the MD 12 to determine its current location and may include an ability to send location assistance data (AD) to the MD 12, obtain the location of the MD 12 using location-related measurements provided by the MD 12 and/or the ALN 14 and send an obtained location for the MD 12 to the MD 12 or to another client entity such as the LBS AS 18.

In particular implementations, the MD 12 may have circuitry and processing resources capable of computing a position fix or estimated location of the MD 12. For example, the MD 12 may compute a position fix based, at least in part, on pseudorange measurements to four or more Global Navigation Satellite System (GNSS) satellites for GNSS constellations such as GPS, Glonass or Galileo. In particular implementations, the MD 12 may receive, from the LS 16, positioning assistance data (e.g., almanac, ephemeris data, Doppler search windows) to aid in the acquisition and measurement of signals transmitted by GNSS satellites and/or aid the MD 12 to compute a location estimate from such measurements.

In other implementations, the MD 12 may obtain a location fix by processing signals received from terrestrial transmitters fixed at known locations (e.g., APs and/or base stations belonging to the ALN 14) using any one of several techniques such as, for example, Advanced Forward Link Trilateration (AFLT) or Observed Time Difference of Arrival (OTDOA). In these particular techniques, pseudoranges or timing differences may be measured by the MD 12 relative to three or more of such terrestrial transmitters fixed at known locations based, at least in part, on pilot or other positioning related signals transmitted by the transmitters and received at the MD 12. Here, the LS 16 may be capable of providing positioning assistance data to the MD 12 including, for example, information on signals to be measured (e.g., signal timing, signal content and/or signal scheduling) and locations and identities of terrestrial transmitters to facilitate positioning techniques such as AFLT and OTDOA. For example, the LS 16 may include a base station almanac (BSA) in AD sent to the MS 12 which indicates locations and identities of cellular base stations and/or APs in the ALN 14 and may provide information related to base station and AP transmitted signals such as transmission power, antenna gain and signal timing.

In particular environments such as indoor environments or urban canyons, the MD 12 may not be capable of acquiring signals from a sufficient number of GNSS satellites to perform positioning and may not receive signals from a sufficient number of base station transceivers to perform AFLT or OTDOA to compute a position fix. In these circumstances, the MD 12 may be capable of computing a position fix based, at least in part, on signals acquired from local transmitters (e.g., WiFi APs and/or Femtocells positioned at known locations). For example, the MD 12 may obtain a position fix by measuring ranges to three or more indoor terrestrial wireless access points which are positioned at known locations. Such ranges may be measured, for example, by obtaining a Media Access Control (MAC) ID address from signals received from WiFi APs and obtaining range measurements to the access points by measuring one or more characteristics of signals received from such access points such as, for example, a Received Signal Strength indication (RSSI) or a round trip signal propagation time (RTT). In alternative implementations, the MD 12 may obtain an indoor position fix by applying characteristics of acquired signals to a radio map indicating expected RSSI and/or RTT values at particular locations in an indoor area. In particular implementations, a radio map may associate identities of local transmitters (e.g., a MAC address which is discernible from a signal acquired from a local transmitter), expected RSSI from signals transmitted by the identified local transmitters, an expected RTT from the identified transmitters, and possibly standard deviations from these expected RSSI or RTT values. In alternative implementations, angles of arrival or departure may be used in lieu of or in combination with measurements of range or signature recognition in a radio map for estimating a location of a mobile device. These, however, are merely examples of positioning methods applicable to the indoor area 26 and the system 10, and that claimed subject matter is not limited in this respect.

In particular implementations, the MD 12 may receive positioning assistance data for indoor positioning operations from the LS 16. For example, such positioning assistance data may include locations and identities (e.g., MAC addresses) of transmitters in the ALN 14 positioned at known locations to enable measuring ranges to these transmitters based, at least in part, on a measured RSSI and/or a measured RTT, for example. Other positioning assistance data to aid indoor positioning operations may include radio maps, magnetic maps, routeability graphs, building layouts and floor plans indicating permitted locations, common locations and improbable locations (e.g., associated with walls and building infrastructure), just to name a few examples. Other positioning assistance data received by the MD 12 may include, for example, local maps of indoor areas for display or to aid in navigation. Such a map may be provided to the MD 12 as the MD 12 enters a particular indoor area. Such a map may show indoor features such as doors, hallways, entry ways, walls, etc., points of interest such as bathrooms, fire exits, pay phones, room names, stores, etc. By obtaining and displaying such a map, the MD 12 may overlay a current location of the MD 12 over the displayed map to provide the user of the MD 12 with additional context.

According to an embodiment, the MD 12 may access indoor navigation assistance data from the LS 16 by, for example, requesting particular types of indoor assistance data. In particular implementations, the LS 16 may be capable of providing indoor navigation assistance data to cover many different indoor areas including, for example, floors of buildings, wings of hospitals, terminals at an airport, portions of a university campus, areas of a large shopping mall, just to name a few examples. Also, memory resources at the MD 12 and data transmission resources may make receipt of indoor navigation assistance data for all areas served by the LS 16 impractical or infeasible. A request for indoor navigation assistance data from the MD 12 may then indicate a rough or course estimate of a location of the MD 12. The MD 12 may then be provided with indoor navigation assistance data covering areas including and/or proximate to the rough or course estimate of the location of the MD 12 which may reduce the memory requirements of the MD 12 and use of data transmission resources while still providing the MD 12 with valuable navigation and other positioning assistance data.

In a particular implementation, the ALN 14 may comprise devices positioned and configured to transmit or receive signals to assist in positioning operations such as, for example, local transceivers or base station transceivers. Signals transmitted and received by the ALN 14 to assist in positioning operations for the MD 12 and other mobile devices may be designed primarily to support communication of audio, video, data and control information as part of normal communications operations but may provide the additional benefit of supporting positioning by having measurable attributes such as signal strength, signal angle of arrival, signal timing, or other signal characteristics.

In certain implementations, the MD 12 and the LS 16 may support the Secure User Plane Location (SUPL) location solution defined by the Open Mobile Alliance (OMA). In this case, the LS 16 may comprise a home SUPL Location Platform (H-SLP) or a discovered SUPL Location Platform (D-SLP). The LS 16 may be an H-SLP if provided for the MD 12 by a home wireless network operator for the user of the MD 12 or by some other preferred location provider for the user of the MD 12, and may comprise a location server for which the MD 12 is provisioned to receive location services while in a home area (e.g., home network coverage area) or while unable to obtain location services from some other location server if not in a home area. The LS 16 may be a D-SLP if not provided by a home operator or preferred location provider for the user of the MD 12 and may support location services in some area that is not a home area for the MD 12 such as a particular building, a venue, a city, a state or some foreign country for a user and may have unique data (e.g., unique positioning assistance data that can be transmitted to the MD 12) to support location services in this area. A D-SLP may support better location services (e.g., may enable more accurate and reliable location) than an H-SLP inside the area served by the D-SLP. It may be an advantage for the MD 12 to discover a D-SLP while in certain environments, such as inside a venue, in order to obtain improved location services.

SUPL is a location solution based on interaction between a SUPL Enabled Terminal (SET) and a SUPL Location Platform (SLP) using TCP/IP as a transport mechanism (e.g., with TCP/IP packets transmitted between the LS 16 and the MD 12 via the ALN 14). When SUPL is supported, SUPL messages, defined according to the SUPL User Plane Location Protocol (ULP) defined by OMA, may be exchanged between a SET and an SLP to set up and manage SUPL location sessions and to transfer positioning assistance data, location parameters (e.g., a location estimate and/or measurements for use in computing a location estimate) and SUPL related positioning capabilities. A SUPL session may employ one or more positioning protocols that may convey at least a portion of positioning assistance data transferred from an SLP to a SET and some or all of the location measurement and/or location estimate information transferred from the SET to the SLP. Certain SUPL messages (e.g., a SUPL POS message) may carry one or more embedded messages defined according to a positioning protocol as a means of invoking and supporting positioning within a SUPL session. Examples of positioning protocols supported by SUPL include the Radio Resource Location Services (LCS) Protocol (RRLP), the Radio Resource Control Protocol (RRC), the LTE Positioning Protocol (LPP), the IS-801 protocol and the LPP Extensions (LPPe) protocol. Typically, LPPe may extend LPP such that an LPP message may contain an embedded LPPe message. RRLP, RRC and LPP are defined by 3GPP, IS-801 is defined by 3GPP2, and LPPe is defined by OMA, all in publicly available documents.

Referring now to other elements in the communication system 10, Access/location Network Database (ALN DB) 22 may be a computer system or server that stores data such as map data, location-related information (e.g., positioning assistance data including base station almanac data for the ALN 14 and/or assistance data for A-GNSS), information on points of interest, and/or other data that may be used by a location service. This information may be derived from a third party service, via measurement data generated by mobile devices such as the MD 12 and sent to the LS 16 using crowdsourcing and thereafter relayed to the ALN DB 22, and/or from the Map Database (Map DB) 20. The map DB 20 may be a computer system or server that stores maps, building layouts, floor plans and other geographic information for the indoor area 26 which may be provided by an owner of the indoor area 26. The LBS AS 18 may comprise an application, program, server computer, or service that uses location information to provide location-related services to the MD 12, a user of the MD 12, an owner of the indoor area 26 and/or an operator of the ALN 14 or the LS 16. Examples of such location-related services may include provision of map data or directions to an application (App) on the MD 12, provision of statistical information on the locations and movement of all MDs in the indoor area 26 to the owner of the indoor area 26 and/or provision to the user of the MD 12 of data applicable to the location of the MD 12 in the indoor area 26 such as nearby fire exits, nearby parking spaces in a car park, discounts on items nearby to the user in a shopping mall, information on exhibits nearby to the user in a museum. The LBS AS 18 may use information obtained from the map DB 20 (e.g., floor plan information for the indoor area 26) as well as location information (e.g., the current location of the MD 12) obtained from the LS 16 or from the MD 12 to provide such location-related services.

Figure 2:
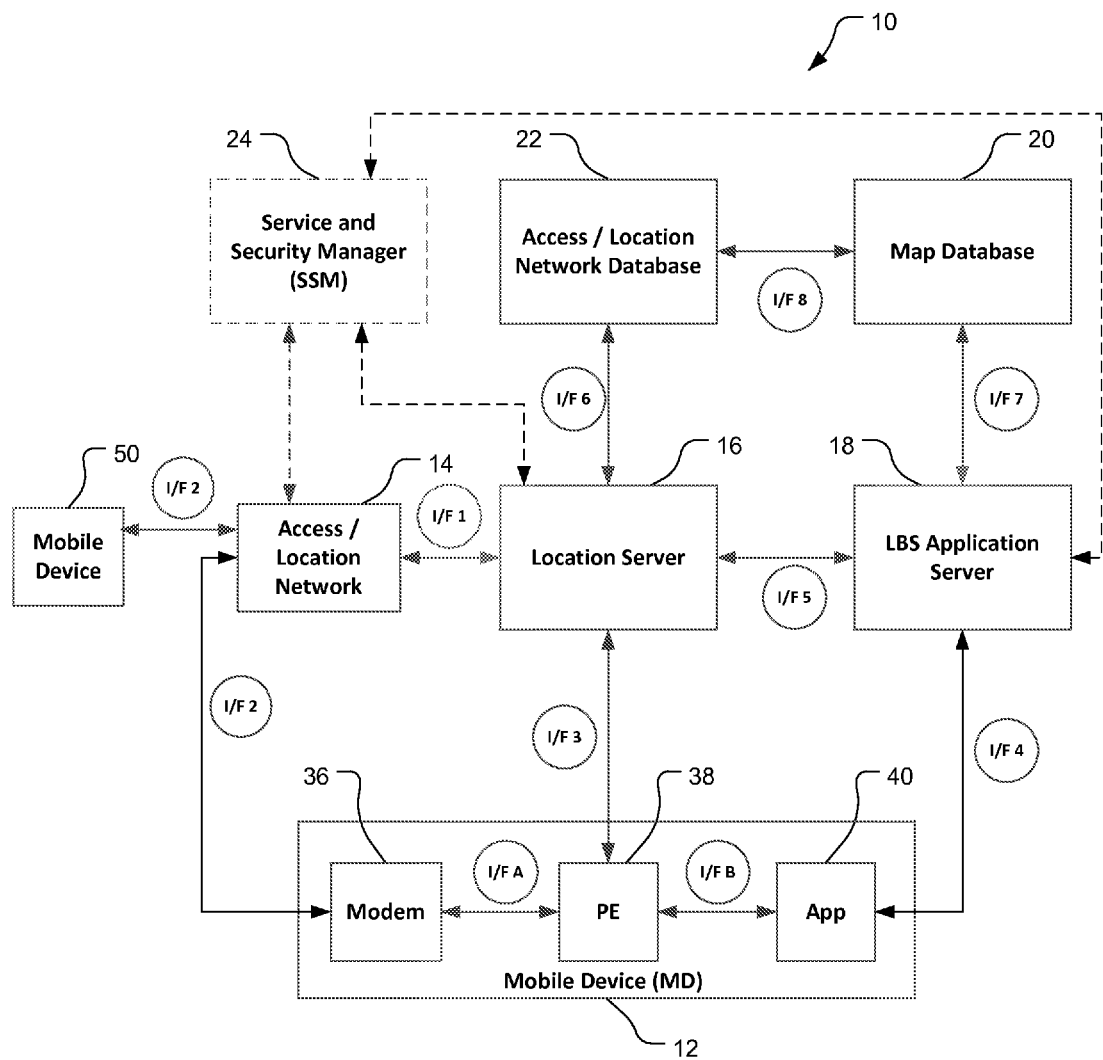
FIG. 2 is a block diagram of the system shown in FIG. 1 showing components of the mobile device shown in FIG. 1, and with communication interfaces labeled.

Referring now to FIG. 2, the components of the communication system 10 (also referred to here as the system 10) are configured to communicate with each other over respective interfaces (I/Fs). In particular, the components of the system 10 are configured to communicate, respectively, via interfaces (I/Fs) 1, 2, 3, 4, 5, 6, 7, and 8. Further, a modem 36 and a positioning engine (PE) 38 of the MD 12 are configured to communicate via an interface A, and the PE 38 and an application (App) 40 of the MD 12 are configured to communicate via an interface B, wherein both interfaces A and B may be internal to the MD 12 (e.g., may be Application Programming Interfaces (APIs)). The system 10 is an example of an architecture for ILA privacy and security. Trust relationships may exist (i.e., communications may be trustworthy) on I/F A and I/F B internal to the MD 12, and on I/Fs 1, 5, 6, 7, 8 on the network side once mutual authentication over each of these network interfaces has been performed between the pair of entities at each end of each interface (e.g., between the LS 16 and the LBS AS 18 in the case of I/F 5). Trust relationships may be absent on I/Fs 2, 3, 4 such that data and identification information received over these interfaces should be independently verified.

Interfaces 1, 5, 6, 7, and 8 may comprise logical or physical interfaces. In the case of a physical interface n (where n is a number in the range 1, 5, 6, 7 and 8), the two entities joined by I/F n may comprise physically separate entities and may be linked wirelessly, by a wireline connection (e.g., a cable or LAN) or via one or more intermediate entities such as a network or local area network (e.g., the ALN 14). In the case of a logical interface n, the two entities joined by I/F n may be different parts (e.g., different programs or processes) within the same physical entity. As an example, the LS 16 and the LBS AS 18 may be physically separate entities if I/F 5 is physical or may be parts of the same entity if I/F 5 is logical. Interfaces 2, 3 and 4 to the MD 12 may comprise physical OTA interfaces.

In supporting location of the MD 12 and location services related to the MD 12, interface 1 may enable the ALN 14 to provide access network measurements made of signals transmitted from the MD 12 (and/or measurements provided to the ALN 14 by the MD 12 that were made by the MD 12 of signals transmitted by the ALN 14) to the LS 16 to enable the LS 16 to locate the MD 12. Further, with I/F 1, the LS 16 may configure the ALN 14 to make (or obtain) particular measurements of (or related to) the MD 12 and provide them to the LS 16 (e.g., measurements or information related to detection of the MD 12 and/or the timing, strength and/or direction of arrival of signals received from the MD 12). With interface 2, the ALN 14 may transfer to the MD 12, for support of location service by the MD 12, positioning assistance data which the ALN 14 may have been configured with or may have obtained from the LS 16. Transfer of assistance data over I/F 2 from the ALN 14 to the MD 12 may occur point to point and/or may make use of broadcast messages transmitted from APs or Femtocells in the ALN 14 to multiple devices (including but not limited to the MD 12). Positioning assistance data transferred may provide descriptions or characteristics of one or more transmitters (e.g., access points) in or outside of the ALN 14 whose signals may be measured by the MD 12 to estimate the location of the MD 12. With I/F 2, the ALN 14 may also transfer to the MD 12 measurements made by the ALN 14 of signals received from the MD 12. In addition, with I/F 2, the MD 12 may transfer, to the ALN 14, location-related measurements of signals received by the MD 12 from the ALN 14, and the ALN 14 may make measurements of signals received from the MD 12. Interface 2 may be supported by an IEEE 802.11 WiFi protocol when the ALN 14 contains WiFi APs, by LTE when the ALN 14 contains LTE eNode Bs or Home eNode Bs, or by other radio access technologies such as WCDMA, cdma2000 and Bluetooth. With interface 3, as part of the primary function of a system for providing positioning services, the LS 16 may transfer location-related positioning assistance data to the MD 12 and the MD 12 may transfer positioning measurements, location estimates, and/or crowd-sourced measurements to the LS 16. The various interactions and transfers on I/F 3 may occur according to the SUPL ULP protocol in some embodiments. In further embodiments, SUPL ULP used on I/F 3 may employ LPP and/or LPP/LPPe as positioning protocols as defined and allowed by the SUPL location solution defined by OMA in SUPL versions 2.0, 2.1 and 3.0. Signaling used on I/F 3 may be transferred via the ALN 14 using I/Fs 1 and 2 in some implementations. With interface 4, the LBS AS 18 may send, to the MD 12, a location request, map data and/or location-related content such as navigation and direction finding data. In addition, on I/F 4, the MD 12 may send, to the LBS AS 18, a location response and/or a location report (e.g., in response to a location request from the LBS AS 18) and may also or instead send a request to the LBS AS 18 for map data and/or other location-related content. Signaling used on I/F 4 may be transferred via the ALN 14 using I/Fs 1 and 2 in some implementations (and using an interface between the LBS AS 18 and the ALN 14 that is not shown in FIG. 2).

With interface 5 in the system 10 in FIG. 2, the LBS AS 18 may send, to the LS 16, a location request (e.g., related to the MD 12) and/or a configuration request related to reporting the presence and/or location of the MD 12. Further on I/F 5, the LS 16 may send, to the LBS AS 18, a location response and/or location report (e.g., in response to a location request and/or configuration request received earlier from the LBS AS 18). To support the interactions on I/F 5, the Mobile Location Protocol (MLP) defined by OMA in publicly available documents may be used in some embodiments. MLP may also be used in some embodiments to support interactions on interface 4. With interface 6, the ALN DB 22 may transfer, to the LS 16, map data and/or access network related data (e.g., access network almanac data and BSA data for the ALN 14 that may contain the locations and/or transmission characteristics of APs and/or base stations and/or femtocells in the ALN 14). Further on I/F 6, the LS 16 may transfer, to the ALN DB 22, location-related measurement data (e.g., signal strength and/or round trip time measurements together with the location or an estimate of the location at which the measurements were made) which may concern access points and/or base stations in the ALN 14 and may have been obtained, at least in part, by the LS 16 from the ALN 14 and/or via crowdsourcing from one or more mobile devices such as the MD 12. The ALN DB 22 may use the received location-related measurement data to derive, update and/or validate location assistance data that it may have such as BSA data for the ALN 14. Similarly, with interface 7, the LBS AS 18 may request and obtain map data (e.g., building floor plans, location of points of interest in the indoor area 26) from the map DB 20. With interface 8, the ALN DB 22 may request and obtain map data (e.g., building floor plans) from the map DB 20. Each of interfaces 1 through 8 may also provide support for security including, for example, the ability of two entities communicating via an interface n (where n is any number 1 through 8) to identify and authenticate one another.

In the system 10, the LS 16 may primarily support positioning of the MD 12 whereas the LBS AS 18 may primarily support services that use as input location information for the MD 12 (e.g., current location, current velocity, current heading, location history) and may then provide additional services dependent on this (e.g., navigation assistance, direction finding, information of interest related to a particular location etc.) to the MD 12 and/or to other entities such as a venue owner for the indoor area 26 or some other external client. The functional partitioning of the LS 16 and the LBS AS 18 may be convenient to enable different providers (e.g., which may include different vendors, network operators, location providers, and/or venue owners) to provide their own specialized support for location services that may depend, at least in part, on data, resources, equipment and expertise uniquely available to each such provider and not available to other providers. With such a functional split, the LBS AS 18 may need to rely on the MD 12 and/or on the LS 16 to supply location-related information for the MD 12 (e.g., estimates or approximations of the location of the MD 12, indications of reliability or uncertainty in such estimates or approximations, indications of certain location-related events for the MD 12 such as the MD 12 entering or leaving the indoor area 26). The MD 12 may rely on the LBS AS 18 (and not on the LS 16) for services dependent on location such as navigation and direction finding assistance. The LS 16 (and possibly the MD 12) may rely on the LBS AS 18 for instructions and configuration details indicating when and under what circumstances location information for the MD 12 is to be obtained and provided to the LBS AS 18. The MD 12 may further rely on the LS 16 for assistance in obtaining its location (e.g., for transfer of location assistance data and/or computation of a location estimate). The LS 16 may rely on the ALN 14 for location-related measurements and/or location estimates for the MD 12 and the ALN 14 may rely on the LS 16 for instructions and configuration details indicating when and how to report location measurements and/or location estimates for the MD 12.

In particular implementations, a presence and location of the MD 12 in the indoor area 26 may be detected, measured or tracked using a mobile based positioning (MBP) approach and/or a network based positioning (NBP) approach. In an MBP approach, for example, the MD 12 may obtain location-related measurements (e.g., measurements of GNSS satellites and/or APs or Femtocells in the ALN 14) for use in detecting a presence or estimating a location of the MD 12. The MD 12 may then determine a location itself for the MD 12 from these measurements or may transfer the measurements to a network server (e.g., the LS 16) to determine a location for the MD 12.

In an NBP approach, receivers at stationary network elements (e.g., APs and/or Femtocells in the ALN 14) may acquire signals transmitted by the MD 12 for detection of a presence of the MD 12 in the indoor area 26 and estimating or tracking a location of the MD 12 in the indoor area 26. The LS 16 may employ NBP and/or MBP depending on capabilities of the MD 12, the ALN 14 and the LS 16. The LBS AS 18 may also query the MD 12 for the location of the MD 12 if the LS 16 and/or the ALN 14 do not support NBP or if the MD 12 may provide an estimate of its location more accurately. Also, measurements obtained using MBP and NBP approaches may be combined (e.g., at the LS 16) to reduce measurement errors and improve accuracy of position estimates for the MD 12.

Referring now to the MD 12 in the system 10 in FIG. 2, the MD 12 may comprise a separate modem 36, a Positioning Engine (PE) 38, and an application (App) 40. The modem 36 may be used to support wireless (or wireline) communication between the MD 12 and one or more fixed transceivers in networks providing communications and/or location services to the MD 12 such as the ALN 14. The modem 36 may support wireless communication according to GSM, WCDMA, LTE, cdma2000, WiFi, Bluetooth and/or other wireless standards and may be supported on a separate piece of hardware in the MD 12 (e.g., a silicon chip or chipset). The PE 38 may support positioning of the MD 12 and may support location solutions such as SUPL and positioning protocols such as LPP and LPPe. The PE 38 may be supported on hardware separate from the modem 36 (e.g., on a different silicon chip) or may be supported using the hardware used to support the modem 36 (e.g., on the same silicon chip or chip set). In the latter case, the PE 38 may be supported using firmware or software separate from that used to support other functions of the modem 36. The App 40 may provide location-based services to the user of the MD 12 and may receive location content (e.g., maps, directions) from the LBS AS 18. Referring to I/Fs 1 to 8 described previously herein, the modem 36 may support I/F 2 and be the endpoint for messages and signals received from the ALN 14 or sent to the ALN 14. The PE 38 may support I/F 3 and may be the end point for messages (e.g., SUPL ULP messages and positioning protocol messages) sent to and received from the LS 16. The App 40 may support I/F 4 and may be the end point for messages sent to and received from the LBS 18. The modem 36 and the PE 38 may communicate using internal interface A in the MD 12. I/F A may be used (i) to transfer messages and information received from the ALN 14 by the modem 36 that are related to positioning to the PE 38, (ii) to transfer measurements of signals received from the ALN 14 and made by the modem 36 to the PE 38 and/or (iii) to receive information at the modem 36 from the PE 38 related to positioning support—such as messages and information generated by the PE 38 that are to be sent by the modem 36 to the ALN 14. I/F B may be used by the App 40 to request and obtain location information from the PE 38 (e.g., the current location of the MD 12) which may be used by the App 40 to provide location-related services to the user of the MD 12 (e.g., to show the current location of the MD 12 on a map received by the App 40 from the LBS 18) and/or may be sent to the LBS AS 18 (e.g., if requested by the LBS AS 18). I/F B may also be used by the PE 38 to obtain information from the App 40—e.g., an address for the LS 16 which may have been received by the App 40 from the LBS AS 18.

It may be important when using the system 10 as described above in association with FIG. 1 and FIG. 2 to ensure that the same device (e.g., the MD 12) is being used for each of I/Fs 2, 3 and 4 and that the device is the device that the device claims to be across each of these interfaces. In particular, each of I/Fs 2, 3 and 4 may support mutual authentication of the pair of entities at each end of each interface. Thus for example, I/F 2 may enable the MD 12 (or the modem 36 or the PE 38) to determine the address or identity (ID) of an AP or Femtocell in the ALN 14 with which the MD 12 (or the modem 36) is in communication and may similarly allow an AP or Femtocell in the ALN 14 that is in communication with the MD 12 (or the modem 36) to determine an address or identity for the MD 12. The address or identity may be carried in messages or signals transmitted from the ALN 14 and from the MD 12 (or the modem 36) and may comprise a MAC address in the case of a WiFi, a cell global identity in the case of a Femtocell in the ALN 14, or a device or user identity in the case of the MD 12. Similarly, I/F 3 may enable the LS 16 to provide its address or identity to the MD 12 (or to the PE 38) and may enable the MD 12 (or the PE 38) to provide an address or identity for the MD 12 to the LS 16. I/F 3 may enable the address or identity provided by either end to be authenticated, meaning that each end can be sure that the provided address or identity is valid and not spoofed from some other entity, device or user. Similar again, I/F 4 may allow the MD 12 (or the App 40) and the LBS AS 18 to exchange their respective addresses or identities and may enable each end to authenticate the received address or identity. Discrepancies, however, may arise when the identities or addresses related to an MD that are exchanged across one interface are not the same as (or do not correspond to the same MD as) the identities or addresses that are exchanged across another interface. The discrepancies may concern attempts by the user of one MD to masquerade as the user of a different MD by spoofing an identity for this different MD in order to obtain unauthorized location services or provide invalid and misleading location information to other entities. The discrepancies may also concern accidental errors in MD identification where two different MDs may use the same identity.

As a first example of how spoofing may occur with WiFi access with the three separate interfaces 2, 3 and 4 shown in FIG. 2, the App 40 in the MD 12 might be designed or programmed by the user of the MD 12 to track the location of the user of another MD, here MD 50 shown in FIG. 2. The App 40 in the MD 12 might then provide the WiFi MAC address that is assigned to the MD 50 to the LBS AS 18, instead of the MAC address that is assigned to the MD 12, and may request that the LBS AS 18 track and provide the location of the MD 12 to the App 40. The LBS 18 may be unaware that the provided MAC address belongs to the MD 50 rather than the MD 12. For example, the LBS AS 18 may be able to authenticate the identity of the App 40 which may not be the same as a MAC address. Having authenticated the App 40, the LBS AS 18 may assume that the MAC address provided by the App 40 is trustworthy and may send a request to the LS 16 for the location of the MD 12 and may provide the MAC address (for the MD 50) received from the App 40. The LS 16 may trust the information received from the LBS 18 (e.g., because the LBS AS 18 is considered trustworthy) and may pass on the location request to the ALN 14 along with the MAC address (of the MD 50). The ALN 14 may likewise trust the received information from the LS 16 (e.g., because the LS 16 is considered trustworthy) and may be able to detect the MAC address (of the MD 50) from signaling received from the MD 50 (e.g., if the MD 50 is in the indoor area 26). The ALN 14 may further be able to verify that this detected MAC address belongs to the MD that is sending the MAC address (in this case the MD 50) or may just assume that the MAC address belongs to the MD that is sending the MAC address.

The ALN 14 may not be able to receive and authenticate any other address or identity for the MD 50 so may not know that the MAC address really belongs to the MD 50 and not to the MD 12. Subsequently, the ALN 14 may obtain a location or series of locations for the MD 50 (e.g., by measuring RSSI or RTT using signals received from the MD 50) and may return the location or locations or just the signal measurements to the LS 16 which may compute a location or locations if only signal measurements are provided. The LS 16 may then transfer the location or locations to the LBS AS 18 which may in turn return the location or locations to the App 40 on the MD 12. The user of the MD 12 may then end up being able to track the location of the user of the MD 50. Although, one address or identity may have been authenticated across each of I/Fs 2 and 4 in this example, the App 40 in the MD 12 is still able to obtain unauthorized locations for the MD 50 without knowledge of network entities such as the ALN 14, the LS 16 and the LBS 18.

As a second example of how spoofing may occur with WiFi access with the three separate interfaces 2, 3 and 4 in FIG. 2, the user of the MD 12 may wish to provide false and misleading location information to a location client—e.g., may wish to provide the location of the MD 12 to a location client who wishes to obtain the location of another MD such as the MD 50 in FIG. 2. In this case, the user of the MD 12 may reconfigure the MAC address of the MD 12 to correspond to the MAC address assigned to the MD 50. If the MD 12 now enters the indoor area 26 where the MD 50 may be known from previous visits of the MD 50 and sends the MAC address of the MD 50 to the ALN 14, the ALN 14 and the LS 16 may be duped into believing that the MD 50 has entered the indoor area 26 rather than the MD 12. For example, the modem 36, the PE 38 and the App 40 on the MD 12 may each send the MAC address of the MD 50 to the ALN 14, the LS 16 and the LBS AS 18, respectively, over interfaces 2, 3 and 4, respectively. Receiving the same MAC address on all three interfaces may lead the ALN 14, the LS 16 and the LBS AS 18 to assume that the MD 50 has been detected—e.g., if the MAC address of the MD 50 had been received and stored (e.g., by the LS 16 and/or the LBS 18) following a previous visit of the MD 50 to the indoor area 26. An external client who sends a request to the LS 16 for the location of the MD 50 and identifies the MD 50 using the MAC address of the MD 50 which has been spoofed by the user of the MD 12 may now receive the location of the MD 12 instead of the location of the MD 50 which may cause problems for the external client and/for the user of the MD 50. In this example, it is possible that the MD 50 may also be in the indoor area 26 and that an App on the MD 50 may interact with the LBS AS 18 over interface 4 which may confirm the presence of the MD 50 in the indoor area 26—e.g., via authentication of the App on the MD 50 by the LBS AS 18. In this case, if the ALN 14 and the LS 16 continue to identify the MD 50 using the MAC address of the MD 50, then the spoofing in this example may still succeed. For example, the LBS AS 18 may confirm to the LS 16 that the MD 50 is present in the indoor area 26 by providing the MAC address of the MD 50 (which may also be provided to the LBS AS 18 by the App on the MD 50). Since the same MAC address is being spoofed by the MD 12, the LS 16 and the ALN 14 may still provide the location of the MD 12 rather than the MD 50 to an external client.

The above examples have been provided with reference to components of the system 10, but are not applicable to the system 10 when the system 10 is configured as discussed below. The above examples show how user privacy may be compromised (e.g., in the first example where a user of the MD 12 is able to obtain unauthorized location of a user of the MD 50) and how security may be compromised (e.g., in the second example where the user of the MD 12 is able to cause the location of the MD 12 to be sent to an external client who has requested the location of the MD 50). To help safeguard security and privacy in the system 10, one or more MD identities in addition to a MAC address may be supported on each of the interfaces. For example, I/F 4 may use an individual App ID or a user ID which may be sent by the App 40 to the LBS AS 18 over I/F 4 to identify the App 40 in FIG. 2; I/F 3 may use an International Mobile Subscriber Identity (IMSI), a PE ID (e.g., an ID assigned by the vendor or provider of the PE 38 to the PE 38), or an IP address which may be sent by the PE 38 to the LS 16 over I/F 3 to identify the MD 12 or the PE 38 to the LS 16; and I/F 2 may use an IP address which may be sent by the MD 12 or the modem 36 (e.g., in some or all signaling messages sent by the modem 36) to the ALN 14 over I/F 2 to identify the MD 12 to the ALN 14.

To further safeguard security and privacy in the system 10, mobile device verification may be implemented by the system 10 using a common MD identity (ID). A common MD ID may be provided by the MD 12 on I/F 2, I/F 4 and I/F 3 if used. In a preferred implementation, the common MD ID is not a MAC address normally associated with an MD in the case of WiFi access since, as shown in the previous examples, use of a common MAC address that is normally associated with an MD may allow spoofing. In some embodiments, the common MD ID may be a MAC address that is not normally associated with an MD, an IP address (e.g., which may be assigned by a venue such as by the ALN 14) or may be some other venue-assigned ID. The common MD ID may associate other MD identities that may also be provided on these interfaces (such as a MAC address, an IP address if not the common MD ID, a PE ID, an App ID, or a user ID) and may be used to verify that the same MD is being used on I/F 2, I/F 4 and I/F 3 if used. If the common MD ID is also confidential (e.g., not disclosed or made available publicly and not sent frequently on radio interfaces where it may be detected by other parties), the common MD ID may not be susceptible to spoofing (as in the first and second examples above). For example, a common MD ID may be owned by a venue (e.g., by the owner or operator of a venue in the indoor area 26) and may be temporarily and uniquely assigned to a particular MD (e.g., to the MD 12) by the venue. The venue may further assign different common MD IDs to other MDs. In this case, the association of a particular common MD ID to a particular MD (e.g., the MD 12) may not be known by other entities, making it difficult or impossible for another entity (e.g., another MD) to spoof the common MD ID.

A venue-assigned ID (VID) may be provided as the common MD ID by a venue (e.g., by the owner or operator of a venue occupying the indoor area 26) to an MD (e.g., the MD 12) for use in verifying by the venue side (e.g., by the ALN 14, the LS 16 and the LBS AS 18) that the same MD (e.g., the MD 12) is being used on each MD interface (i.e., I/F 2, I/F 4, and I/F 3, if used). The VID may be associated with a venue and may be assigned by an entity located at the venue (e.g., within the indoor area 26) or may be assigned by an entity that is not physically located at the venue. The VID may be assigned and transferred to the MD 12 on I/F 2, I/F 3, or I/F 4 and may subsequently be provided by the MD 12 to the venue (e.g., to the ALN 14, the LS 16 and/or the LBS AS 18) using the same interfaces to authenticate the identity of the MD 12. The VID provided to the MD 12 would not be known to another MD or to another user provided that the VID provision is secure (e.g., ciphered). The VID may be, for example, a temporary MAC address owned by a venue and used by an MD only while associated with the venue (e.g., in or near the venue, such as in communication range of a network such as the ALN 14 at the venue). Use of a temporary MAC address as a VID may further safeguard user privacy since inclusion of the temporarily-assigned MAC address (rather than the normal MAC address of the MD 12) in messages and signals sent by the modem 36 in the MD 12 to the ALN 14 will not identify the presence of the MD 12 to other parties (e.g., other MDs) who may only know the association of the normal MAC address of the MD 12 to the user of the MD 12. For example, the VID may be provided by the LBS AS 18 over I/F 4 to the App 40 on the MD 12 and/or may be provided by the LS 16 to the PE 38 over I/F 3 using SUPL. As another example, the VID may be provided by the ALN 14 to the modem 36 using I/F 2.

Figure 3:
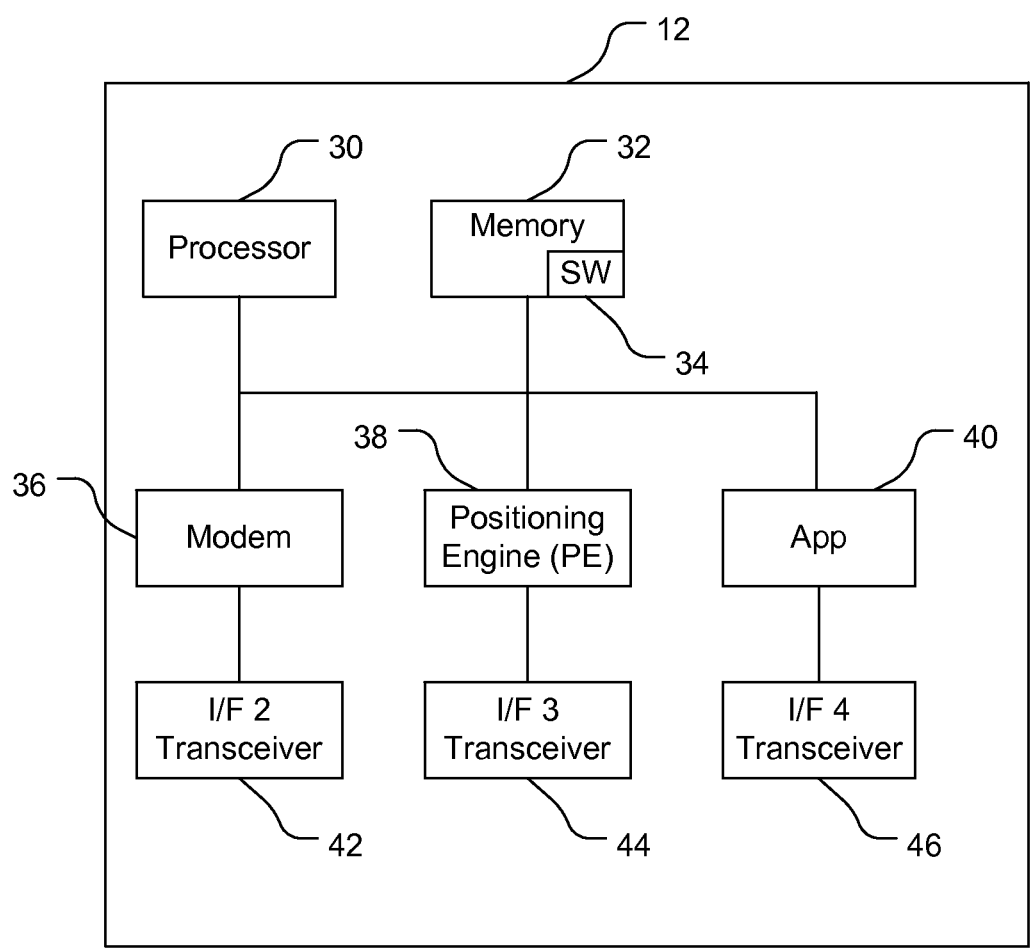
FIG. 3 is a block diagram of a mobile device shown in FIG. 1.

Referring now to FIG. 3, the MD 12 may comprise a computer system including a processor 30, memory 32 including software and/or firmware 34 (although referred to herein as the software 34), the modem 36, the positioning engine (PE) 38, the App 40, an I/F 2 transceiver 42, an I/F 3 transceiver 44, and an I/F 4 transceiver 46. The various components of the MD 12 may be connected in the manner shown in FIG. 3 (e.g., using a common bus to interconnect the processor 30, the memory 32, the modem 36, the PE 38 and the App 40) or in other ways—e.g., if the App 40 is running as software 34 in processor 30). The processor 30 is preferably an intelligent hardware device, e.g., a central processing unit (CPU) such as those made by ARM®, Intel® Corporation, or AMD®, a microcontroller, an application specific integrated circuit (ASIC), etc. The processor 30 could comprise multiple separate physical entities that can be distributed in the MD 12. The memory 32 includes random access memory (RAM) and read-only memory (ROM). The memory 32 is a non-transitory processor-readable storage medium that stores the software 34 which is processor-readable, processor-executable software code containing processor-readable instructions that are configured to, when executed, cause the processor 30 to perform various functions described herein (although the description, including claims, may refer only to the processor 30 performing or being configured to perform one or more of the functions). Alternatively, the software 34 may not be directly executable by the processor 30 but configured to cause the processor 30, e.g., when compiled and executed, to perform the functions.

The modem 36 is configured to modulate and demodulate signals to and from the ALN 14 and supports the I/F 2 transceiver 42 to send and receive signals to and from the ALN 14. Further, the modem 36 may support some or all of the I/F 3 transceiver 44 and/or the I/F 4 transceiver 46.

The PE 38 supports positioning (i.e., is configured for position determination) of the MD 12 and providing position information to the App 40. The PE 38 may be configured to perform mobile-based positioning (MBP) in which the PE 38 may determine a location estimate for the MD 12 itself and/or may provide location measurements determined by the PE 38 or by the modem 36 to a remote device in the system 10 (e.g., the LS 16) to determine the position of the MD 12. The PE 38 may support interaction with the LS 16 over I/F 3 and may support the SUPL location solution and positioning protocols such as LPP, LPPe, RRLP, RRC and/or IS-801. The PE 38 may be enabled to receive assistance data from the LS 16, to send location-related measurements and/or location estimates for the MD 12 to the LS 16 and may support authentication of the LS 16 by the PE 38 and authentication of the MD 12 (or the PE 38) by the LS 16. The PE 38 may be part of the modem 36 (e.g., may be a process or program running on the modem 36) or may be supported by the software 34 stored in memory 32 running on processor 30.

The App 40 is what a user of the MD 12 may interact with in order to obtain location-related services (e.g., guidance using maps provided by the LBS AS 16). The App 40 may be implemented by the processor 30 executing the software 34 in the memory 32 and/or by hardware. The App 40 may instead be supported in the PE 38 or the modem 36 (e.g., as a separate program or process running inside the modem 36 or the PE 38).

The transceivers 42, 44, 46 are communicatively coupled to, and configured to send and receive signals to and from the ALN 14, the LS 16, and the LBS AS 18, respectively. The I/F 3 transceiver 44 is configured to convey signals between the PE 38 and the LS 16 and the I/F 4 transceiver 46 is configured to convey signals between the App 40 and the LBS AS 18. Either or both of the transceivers 44, 46 may be configured to send signals to the LS 16 or the LBS AS 18, respectively, via the ALN 14. The transceivers 42, 44, 46 may be configured to communicate wirelessly over the air using the Bluetooth® short-range wireless protocol, IEEE 802.11x WiFi, GSM, WCDMA, LTE, cdma2000 and/or another appropriate radio access protocol. The transceivers 42, 44, 46 may be implemented, at least partially, by the processor 30 and the software 34 and one or more components may be shared by multiple ones of the transceivers 42, 44, 46. The transceivers 42, 44 and 46 may make use of one or more common antennas for transmission and reception (not shown in FIG. 3). Thus, the transceivers 42, 44, 46 may not be three physically separate entities. For example, the transceivers 42, 44, 46 may be one or more physical entities. Additionally, the MD 12 may contain transceivers (not shown) for acquiring and measuring GNSS signals and/or signals from base stations, APs, and femtocells, that are not part of the ALN 14, to assist with positioning of the MD 12.

Figure 4:
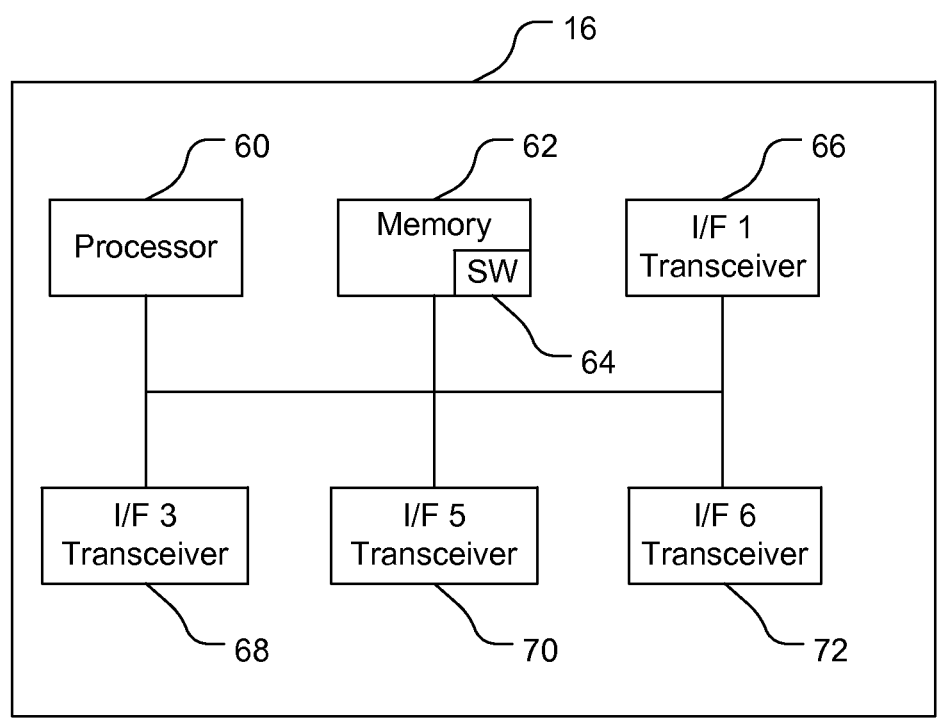
FIG. 4 is a block diagram of a location server shown in FIG. 1.

Referring now to FIG. 4, with further reference to FIG. 1 and FIG. 2, the LS 16 may comprise a computer system including a processor 60, memory 62 including software and/or firmware 64 (although referred to herein as the software 64), an I/F 1 transceiver 66, an I/F 3 transceiver 68, an I/F 5 transceiver 70, and an I/F 6 transceiver 72. The processor 60 is preferably an intelligent hardware device, e.g., a central processing unit (CPU) such as those made by ARM®, Intel® Corporation, or AMD®, a microcontroller, an application specific integrated circuit (ASIC), etc. The processor 60 could comprise multiple separate physical entities that can be distributed in the LS 16. The memory 62 includes random access memory (RAM) and read-only memory (ROM). The memory 62 is a non-transitory processor-readable storage medium that stores the software 64 which is processor-readable, processor-executable software code containing processor-readable instructions that are configured to, when executed, cause the processor 60 to perform various functions described herein (although the description, including the claims, may refer only to the processor 60 performing or being configured to perform one or more of the functions). Alternatively, the software 64 may not be directly executable by the processor 60 but configured to cause the processor 60, e.g., when compiled and executed, to perform the functions.

The transceivers 66, 68, 70, 72 are configured to send and receive signals to and from the ALN 14, the MD 12, the LBS AS 18, and the ALN database 22, respectively. The I/F 3 transceiver 68 is configured to convey signals, in particular, between the PE 38 of the MD 12 and the LS 16. The transceivers 66, 68, 70, 72 may be configured to communicate by wireline means using IP or other transport protocols with other entities in the system 10 (e.g., the ALN 14, the LBS AS 18 and the ALN DB 22) either directly or via routers, bridges, the Internet and/or via other intermediate entities. Communication of I/F 3 transceiver 68 with the PE 38 may be via the ALN 14 or via some other wireless network (e.g., a wireless LAN or wireless wide area network). The transceivers 66, 68, 70, 72 may be implemented, at least partially, by the processor 60 and the software 64 and one or more components may be shared by multiple ones of the transceivers 66, 68, 70, 72. In some implementations, one or more of the transceivers 66, 68, 70, 72 may be implemented using processors and memory separate from the processor 60 and the memory 62 and may also in part or in whole be implemented in an entity physically separate from the LS 16—e.g., a communications node.

Figure 5:
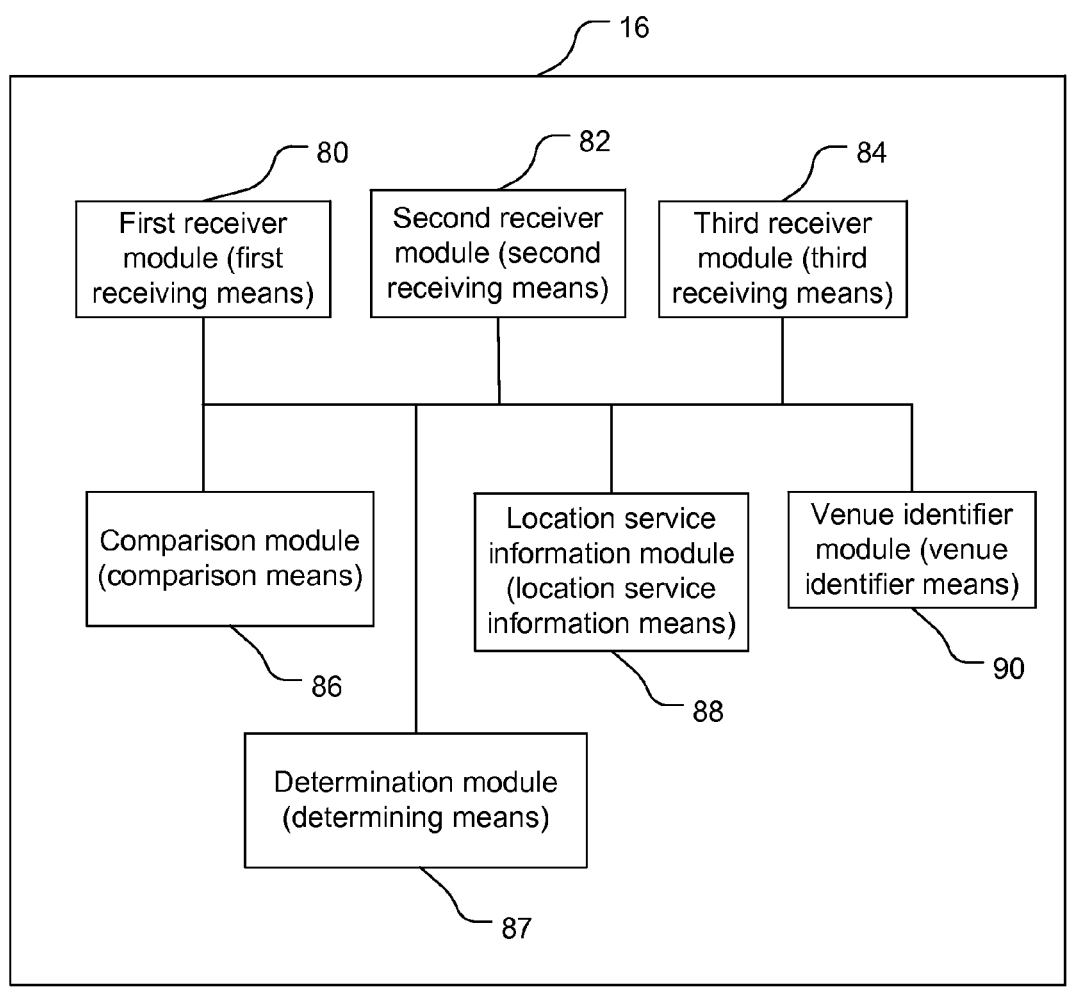
FIG. 5 is a functional block diagram of the location server shown in FIG. 4.

Referring now to FIG. 5, the LS 16 may include a first receiver module (first receiving means) 80, a second receiver module (second receiving means) 82, a third receiver module (third receiving means) 84, a comparison module (comparison means) 86, a determination module (determining means) 87, a location service information module (location service information means) 88, and a venue identifier module (venue identifier means) 90. The modules 80, 82, 84, 86, 87, 88, 90 are communicatively coupled to each other and may be functional modules implemented by the processor 60 and the software 64 stored in the memory 62. Thus, reference to any of the modules 80, 82, 84, 86, 87, 88, 90 performing or being configured to perform a function may be shorthand for the processor 60 performing or being configured to perform the function in accordance with the software 64 and/or hardware of the processor 60 (although the description, including claims, may refer only to the processor 60 performing or being configured to perform one or more of the functions). Alternatively, the software 64 may not be directly executable by the processor 60 but configured to cause the processor 60, e.g., when compiled and executed, to perform the functions. Similarly, reference to the processor 60 performing a receiving, comparing, location service information providing, or venue identifier assigning or providing function may be equivalent to the first receiver module 80, the second receiver module 82, the third receiver module 84, the comparison module 86, the determination module 87, the location service information module 88, and/or the venue identifier module 90, respectively, performing the function. The venue identifier module 90 is an optional module such that the LS 16 may or may not contain the venue identifier module 90.

The receiver modules 80, 82, 84 are configured to receive information over the interfaces I/F 5, I/F 1, and I/F 3, respectively. The first receiver module 80 is configured to receive information from the LBS AS 18 and is preferably implemented by the I/F 5 transceiver 70. The second receiver module 82 is configured to receive information from the ALN 14 and is preferably implemented by the I/F 1 transceiver 66. The third receiver module 84 is configured to receive information from the MD 12 (in particular, the PE 38) and is preferably implemented by the I/F 5 transceiver 68.

The comparison module 86 is configured to make a comparison of the information received by the first receiver module 80 and information received by the second receiver module 82 and/or the third receiver module 84. The comparison module 86 can determine whether identifying information received by the first receiver module 80 and identifying information received by the second receiver module 82 and/or the third receiver module 84 match. The identifying information may be associated with the MD 12 and may be, e.g., an Internet Protocol (IP) address, a MAC address, a Venue ID (VID) or another form of information such as a custom identifier. The identifying information may not directly identify the MD 12, but may be used to determine the identity of the MD 12. The comparison module 86 may be further configured to provide an indication, e.g., to the determination module 87, of whether the comparison indicates that the identifying information received by two or more of the modules 80, 82 and/or 84 match.

The determination module 87 may determine whether a first mobile device corresponding to a first identifying information received from module 80, a second mobile device corresponding to a second identifying information received from module 82, and/or a third mobile device corresponding to a third identifying information received from module 84 are the same mobile device based at least in part on whether the first identification, the second identification and/or the third identification match one another. For example, the determination module 87 may determine that the first mobile device is the second mobile device, by determining that the first identifying information matches the second identifying information. The determination module 87 may also analyze other information associated with the identifying information such as when the identifying information was sent and/or received to help determine whether the first and second mobile devices are one and the same mobile device. The determination module 87 may be configured to send an indication to the location service information module 88 that the first mobile device, the second mobile device and/or the third mobile device are the same mobile device, i.e., that the sources of the identifying information received by the LS 16 are the same entity.

The location service information module 88 is configured to respond to the indication from the determination module 87 that the sources of the identifying information received by the LS 16 are the same entity. The module 88 is configured to respond by sending location information regarding the identified mobile device (e.g., the MD 12) toward the LBS AS 18 such that the LBS AS 18 can provide a location-based service to the entity, e.g., to the App 40 on the MD 12.

The venue identifier module 90 is configured to assign a venue-assigned identifier (VID) to the MD 12. The VID is called a venue-assigned identifier because the VID is associated with a particular venue, e.g., a venue within the indoor area 26 (FIG. 1) even though the VID may be assigned by an entity that is not physically at the venue. The module 90 may produce the VID using any of a variety of techniques, or a combination of any number of such techniques. For example, the module 90 may generate the VID or a portion thereof using a random-number generator, pseudorandom-number generator, an incrementing counter, etc., and/or may select the VID or a portion thereof from an available list or set of VIDs. Thus, for example, the module 90 may generate a VID with one portion being from a stored set and one portion being determined by a counter. The module 90 assigns the VID to the MD 12 in association with a venue with which the MD 12 is, preferably presently, associated. The module 90 may assign the VID to the MD 12 for the duration of the MD's association with the venue, e.g., the duration that the MD 12 is at and/or in and/or or near the venue, e.g., the building 20. For example, the module 90 may provide both the VID and duration and/or geographic area to the MD 12 (or to the PE 38 in the MD 12). When the provided duration has expired and/or when the MD 12 has left the provided geographic area, the MD 12 (or the PE 38) may stop using (e.g., may discard) the provided VID. Alternatively, the MD 12 (or the PE 38) may cease using (e.g., discard) the provided VID some time after no longer receiving signals from the ALN 14. Alternatively, the MD 12 may keep the provided VID (e.g., in secure memory) and reuse the VID on subsequent visits to the venue in the indoor area 26 and the module 90 may then indicate to the MD 12 (or to the PE 38) whether use of the VID is still allowed on a subsequent visit or whether the VID will be replaced by a new VID assigned by module 90. The module 90 provides the VID to the MD 12 over I/F 3 using the I/F 3 transceiver 68 or over I/F 2 (via the ALN 14 over I/F 1) using the I/F 1 transceiver 66. The module 90 provides the VID to the MD 12 securely, e.g., as a ciphered signal, so that the VID is not known to a user or MD other than the MD 12. Thus, the module 90 may be configured to encrypt the VID into an encrypted VID, send the encrypted VID to the MD 12, and the MD 12 may be configured to decrypt the encrypted VID, and to provide the VID, either unencrypted or newly encrypted, to the LS 16. In some implementations, encryption of the VID may be supported via encryption of other information on I/F 2, I/F 3 or I/F 4. For example, if the PE 38 and the LS 16 (e.g., the I/F 3 transceiver 68) support the SUPL location solution, then the VID may be transferred to the MD 12 within a SUPL session using encryption already supported for other communication on the SUPL session. Similarly, if the VID is transferred to the MD 12 (e.g., to the modem 36) on I/F 2 via the ALN 14, the transfer over I/F 2 may employ ciphering already in used for other communication on I/F 2 between the ALN 14 and the MD 12 (or the modem 36). Similarly too, if the VID is transferred to the MD 12 (e.g., to the App 40 on the MD 12) via the LBS AS 18 using I/F 4, the VID may be ciphered using ciphering supported on I/F 4 for other communication between the LBS AS 18 and the App 40. Thus, in some implementations, the module 90 does not need to encrypt the VID.

The VID may take a variety of forms, each of which may be used to guard against providing sensitive information to an entity that is spoofing the MD 12. For example, the VID may be a temporary MAC address associated with a venue (e.g., a venue for the indoor area 26) and used by the MD 12 only while at and/or in and/or near the venue. The VID is preferably easy to provide using the secure user plane location (SUPL) protocol. The VID is unique within the venue and may not be unique outside the venue. The VID may be a simple parameter, e.g., a bit string, an octet string, a string of decimal digits, a string of hexadecimal digits or may assume some other form.

Figure 6:
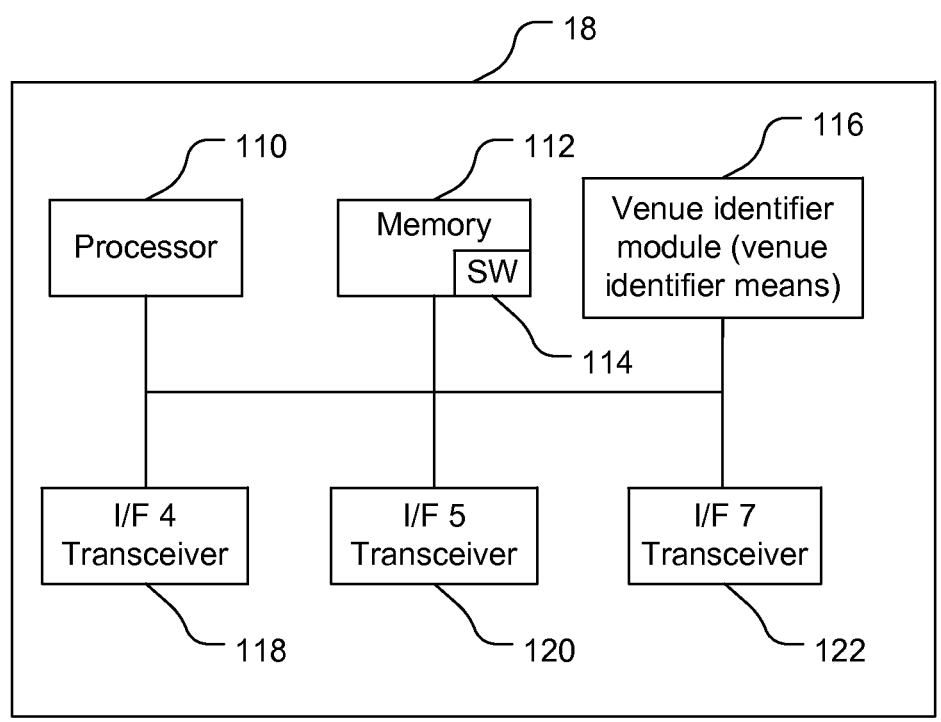
FIG. 6 is a block diagram of a location-based services application server shown in FIG. 1.

Referring now to FIG. 6, with further reference to FIG. 1 and FIG. 2, the LBS AS 18 comprises a computer system including a processor 110, memory 112 including software and/or firmware 114 (although referred to herein as the software 114), a venue identifier module (venue identifier means) 116, an I/F 4 transceiver 118, an I/F 5 transceiver 120, and an I/F 7 transceiver 122. The processor 110 is preferably an intelligent hardware device, e.g., a central processing unit (CPU) such as those made by ARM®, Intel® Corporation, or AMD®, a microcontroller, an application specific integrated circuit (ASIC), etc. The processor 110 could comprise multiple separate physical entities that can be distributed in the LBS AS 18. The memory 112 includes random access memory (RAM) and read-only memory (ROM). The memory 112 is a non-transitory processor-readable storage medium that stores the software 114 which is processor-readable, processor-executable software code containing processor-readable instructions that are configured to, when executed, cause the processor 110 to perform various functions described herein (although the description, including the claims, may refer only to the processor 110 performing or being configured to perform one or more of the functions). Alternatively, the software 114 may not be directly executable by the processor 110 but configured to cause the processor 110, e.g., when compiled and executed, to perform the functions.

The transceivers 118, 120, 122 are configured to send and receive signals to and from the MD 12 (e.g., the App 40 in the MD 12), the LS 16, and the map DB 20, respectively. The transceivers 118, 120, 122 may be configured to communicate by wireline means using IP or other transport protocols with other entities in the system 10 (e.g., the LS 16, the map DB 20) either directly or via routers, bridges, the Internet and/or via other intermediate entities. Communication of the I/F 4 transceiver 118 with the MD 12 (or with the App 40 in the MD 12) may be via the ALN 14 or via some other wireless network (e.g., a wireless LAN or wireless wide area network). The transceivers 118, 120, 122 may be implemented, at least partially, by the processor 110 and the software 114 and one or more components may be shared by multiple ones of the transceivers 118, 120, 122.

The venue identifier module 116 may be similar to the venue identifier module 90 discussed above with respect to FIG. 5. The VID provided by the module 116, however, would be provided to the MD 12 via I/F 4 using the I/F 4 transceiver 118. The venue identifier module 116 is an optional module such that the LBS AS 18 may or may not contain the venue identifier module 116. The module 116 may be a functional module implemented by the processor 110 and the software 114 stored in the memory 112. Thus, reference to the module 116 performing or being configured to perform a function may be shorthand for the processor 110 performing or being configured to perform the function in accordance with the software 114 (and/or firmware, and/or hardware of the processor 110). Similarly, reference to the processor 110 performing a VID assigning or VID producing function may be equivalent to the venue identifier module 116 performing the function.

Common Mobile Device Identity Use

Figure 7:
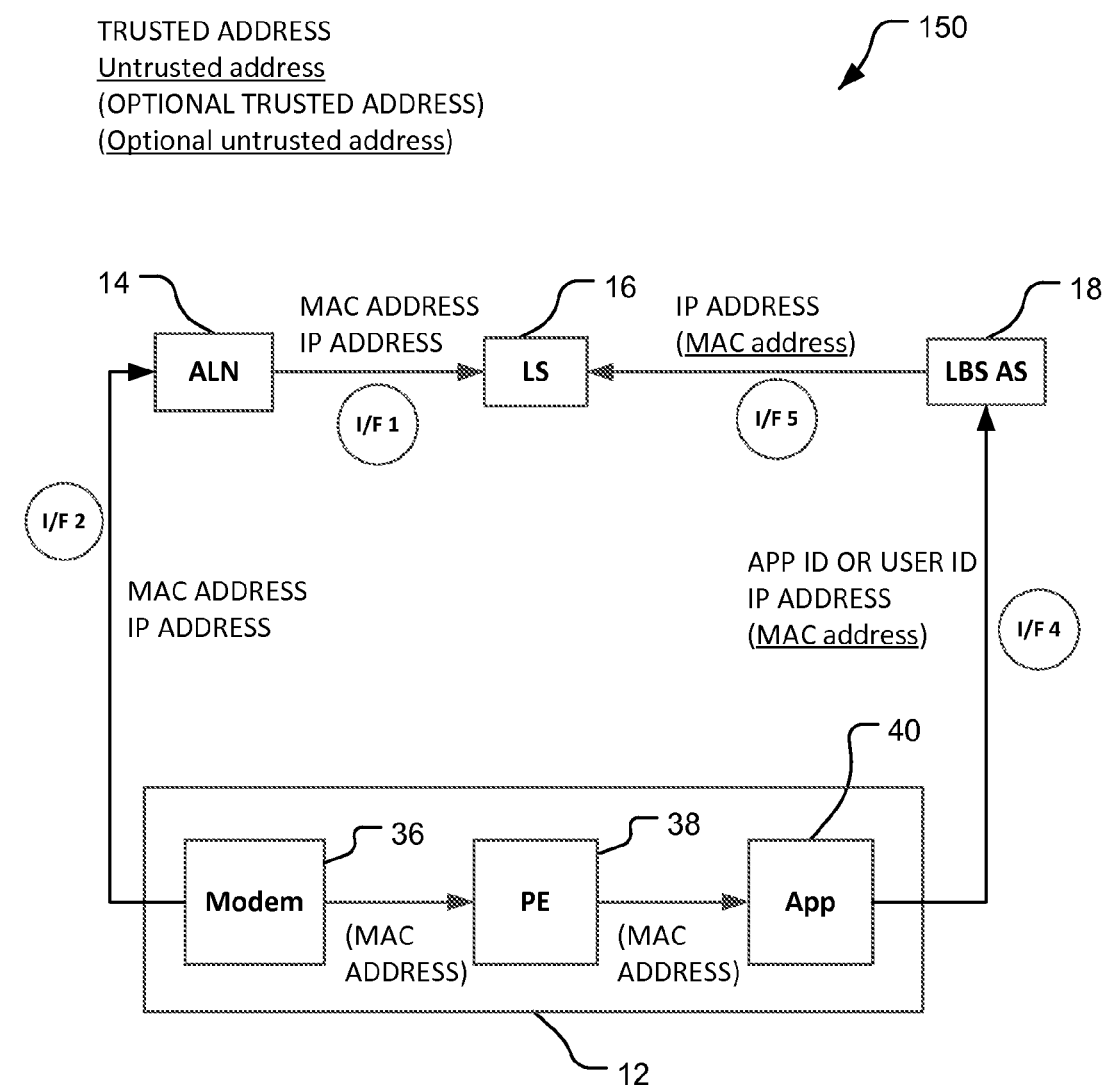
FIGS. 7-14 are block diagrams showing support, usage and signaling of trusted addresses, untrusted addresses, and optional addresses in examples of the system shown in FIGS. 1 and 2.

Referring now to FIG. 7, with further reference to FIGS. 1-6, an example of use of a common MD ID using an implementation 150 of the system 10 to verify the MD 12 for Network Based Positioning (NBP) is shown. As used herein, the MD ID may not directly identify the MD 12, but is associated with the MD 12. In this example, the IP address used by the MD 12 and, optionally, the MAC address used by the MD 12 are used to verify that the MD 12 has not been spoofed when a request for location services is received by the LBS AS 18 allegedly from the MD 12. In this example, the common MD ID is the IP address used by the MD 12 optionally augmented by the MAC address of the MD 12. In this example, the MD 12 (e.g., the processor 30 or the modem 36), sends a MAC address and an IP address associated with the MD 12 to the ALN 14 over I/F 2 using the I/F 2 transceiver 42, and the ALN 14 sends the MAC address and the IP address to the LS 16 on I/F 1. The LS 16 receives the MAC address and the IP address from the ALN 14 over I/F 1 through the first receiver module 80, including the I/F 1 transceiver 66. The sending of the IP address and MAC address by the MD 12 to the ALN 14 over I/F 2 may be part of a targeted communication to provide the MD ID or may be part of normal communication with the ALN 14 over I/F 2 by the MD 12 and not performed specifically to send the common MD ID of the MD 12. A normal communication is a communication in accordance with a communication protocol for communication of audio and/or video and/or data and/or control information, etc., independent of a specific desire to transfer the common MD ID. For example, most or all signals (e.g., IEEE 802.11 frames in the case that the ALN 14 contains WiFi APs and the MD 12 supports WiFi communication) sent over I/F 2 by the MD 12 may contain the WiFi MAC address of the MD 12 and most or all messages sent over I/F 2 by the MD 12 that are intended for destination entities other than the ALN 14 may be transferred within IP packets that each contain an IP header that includes the IP address of the MD 12. The IP address of the MD 12 included in each IP header may be needed to ensure that the MD 12 can receive responses from entities (such as the ALN 14 and the LS 16) to which the MD 12 sends messages and may thus correspond to an IP address assigned to the MD 12 (e.g., by the ALN 14 or by an IP network accessible from the ALN 14) and not to an IP address assigned to some other MD. Similarly, the MAC address included by the MD 12 in messages (e.g., IEEE 802.11 frames) transmitted by the MD 12 to the ALN 14 may correspond to a MAC address used by the MD 12 in order to ensure that the MD 12 can correctly receive responses from the ALN 14. Consequently, both the IP address and MAC address may be trusted by the ALN 14 and by the LS 16 as being addresses used by and associated with the MD 12.

Further, the MD 12 (or the App 40 in the MD 12) may send an App ID or user ID, and the IP address and optionally the MAC address associated with the MD 12 to the LBS AS 18 over I/F 4 using the I/F 4 transceiver 46 and the LBS AS 18 receives the App ID or user ID and the IP address and optionally the MAC address through the I/F 4 transceiver 118. When the IP address and optionally the MAC address are sent by the App 40 to the LBS AS 18 over I/F 4, the App 40 may have previously received one or both addresses from the PE 38 (e.g., in response to a request for one or both addresses from the App 40 to the PE 38) or the App 40 may have obtained one or both addresses from an operating system (not shown) for the MD 12. The PE 38 may in turn obtain one or both addresses from the modem 36 in some implementations. In this example, the MD 12 may use the ALN 14 to access the LBS AS 18, including to send the App ID or user ID and the IP address and optionally the MAC address to the LBS AS 18. Thus, while FIG. 7 shows the App ID or user ID and IP address and optionally the MAC address being sent from the MD 12 (or the App 40) directly to the LBS AS 18 over I/F 4, the implementation of this communication from the MD 12 to the LBS AS 18 may include sending information over I/F 2 to the ALN 14 with the ALN 14 then forwarding the information to the LBS AS 18 as part of normal ALN 14 communications support (e.g., using an IP router in the ALN 14 that is connected directly or indirectly to the LBS AS 18 but that is not shown in FIG. 7 or in FIG. 2). Sending of the App ID or user ID by the MD 12 (or by the App 40) to the LBS AS 18 over I/F 4 may be deliberate and performed in order to identify the MD 12, the user of the MD 12 or the App 40 to the LBS AS 18 and enable the LBS AS 18 to authenticate this identity. Sending of the IP address of the MD 12 to the LBS AS 18 over I/F 4 may be part of normal communication over I/F 4. For example, all messages sent by the MD 12 (or by the App 40) over I/F 4 to the LBS AS 18 may be transferred using IP and may be contained in a series of IP packets that contain the IP address of the MD 12 in an IP header in each IP packet in order to conform to IP protocol requirements and enable the MD 12 (or the App 40) to correctly receive responses from the LBS AS 18. Consequently, the LBS AS 18 can consider the received IP address to be assigned to the MD 12. If the MAC address of the MD 12 is also transferred to the LBS AS 18 over I/F 4 as part of message content and not as part of any protocol used over I/F 2 (such as IEEE 802.11 WiFi signaling), then the LBS AS 18 may not be able to trust the received MAC address because its correct inclusion would not be necessary for correct communication protocol operation (unlike correct inclusion of the IP address). The LBS AS 18 then sends to the LS 16, over I/F 5 using the I/F 5 transceiver 120, the IP address that was received from the MD 12 and, optionally, the MAC address received over I/F 4. The LS 16 receives the IP address and MAC address over I/F 5 through the second receiver module 82, including the I/F 5 transceiver 70. Since the LBS AS 18 trusts the IP address but not the MAC address received over I/F 4, the LS 16 may likewise trust the IP address but not the MAC address received over I/F 5 (e.g., may be configured with this trust association).

The LS 16 can now determine whether (e.g., verify that) the IP address that the LS 16 received over I/F 1 from the ALN 14 and the IP address that the LS 16 received over I/F 5 from the LBS AS 18 come from the same source. For example, the comparison module 86 can compare the two IP addresses to determine whether they match. If the two received IP addresses match (i.e., are the same), the LS 16 may assume that the same MD sent both addresses on I/F 2 and I/F 4 because, as previously described, the IP addresses received over I/F 2 and I/F 4 can be trusted to be associated with the sending MD since they form part of normal communication by this MD. In addition, the LS 16 may trust the MAC address received from the ALN 14 over I/F 1 if the two received IP addresses match and may place additional trust in this MAC address if the same MAC address is also received from the LBS AS 18 over I/F 5. The LS 16 could then use the received MAC address to identify the sending MD as the MD 12 if preferred. In any case, because the LS 16 has verified that the same MD (in this case the MD 12) is in communication with the ALN 14 over I/F 2 and in communication with the LBS AS 18 over I/F 4, the LS 16 may provide location services to the MD 12 (or to the App 40 on the MD 12) or to the LBS AS 18. For example, the LS 16 may request location-related measurements from the ALN 14 for the MD 12 over I/F 1 and the ALN 14 may subsequently return the identity of any APs in the ALN 14 that detect signals from the MD 12 and measurements of RSSI and/or RTT (and/or of other quantities) using these signals. The LS 16 may identify the MD 12 to the ALN 14 using the IP address and/or MAC address for the MD 12 previously received and verified from the ALN 14. The LS 16 may then employ NBP to compute a location for the MD 12 using these measurements and known locations for APs in the ALN 14 or may compute a series of locations for the MD 12 at different times and may send the computed location or locations to the LBS AS 18 over I/F 5. The LBS AS 18 may then send the location or locations to an external client (e.g., if permitted by the MD 12 or by the App 40), may use the location or locations internally (e.g., to help compute statistics on users in the indoor area 26) and/or may return the location or locations to the MD 12 (e.g., to the App 40 on the MD 12). The LS 16 can take other action based on the comparison of the IP addresses, e.g., enabling the LBS AS 18 to provide a location service (e.g., location determination, directions, etc.) to the MD 12, or denying such information and/or providing an alert to the LBS AS 18 (and/or to the SSM 24 when the SSM 24 is present) if the comparison shows that the received IP addresses (or MAC addresses) are not the same and hence that the same MD did not provide both IP addresses (or both MAC addresses). In this example, it may be difficult for an MD to spoof the IP addresses sent on I/F 2 and I/F 4 and the MAC address sent on I/F 2 because the transfer of these addresses on these interfaces is part of normal communication and hence the addresses must be associated (at least temporarily) with the MD 12.

In some implementations, the MD 12 may have more than one IP address—e.g., an IP address assigned to the MD 12 by the ALN 14 (or by an IP network accessible from the ALN 14) and one or more other IP addresses assigned to the MD 12 by other networks (e.g., by a wireless network other than the ALN 14). If the MD 12 sends communication to entities on the venue side (e.g., to the ALN 14, the LS 16, the LBS AS 18) through the same access network (e.g., through the ALN 14), then the MD 12 can include the same IP address in all communication (e.g., an IP address assigned by the ALN 14) and the examples in FIG. 7 and in subsequent figures can occur as described. In case the MD 12 uses different IP addresses when communicating with different venue entities—e.g., sends one IP address to the ALN 14 and a different IP address to the LS 16 and/or to the LBS AS 18—then the verification of a common IP address by the LS 16 in these examples may not be possible. In that case, the examples described later in FIGS. 9-14 may remain valid via use of a common MD ID that is a VID, although the IP address verification portion of these examples may be skipped. For example, in each of FIGS. 9-14, the LS 16 may match the VID received from the MD 12 over different interfaces and, based on a successful match, may conclude that the same MD (i.e., the MD 12) is being used on each interface even when a successful match of received IP addresses on different interfaces does not occur. For example, the LS 16 may be aware that in the indoor area 26, it is possible for an MD (such as the MD 12) to acquire more than one IP address (e.g., if more than one wireless access network has coverage in the indoor area 26) and therefore more than one IP address may be used for communication by the MD 12. In this circumstance, the LS 16 may be willing to skip verification of the received IP addresses if a VID received on different interfaces can be matched. In indoor areas where only one access network is available (e.g., the ALN 14), however, the LS 16 may require that the same IP address be received from an MD over all interfaces (e.g., I/F 2, I/F 3 and I/F 4) as described in FIGS. 7-14 as one condition for verifying the same MD is being used for all applicable interfaces.

Figure 8:
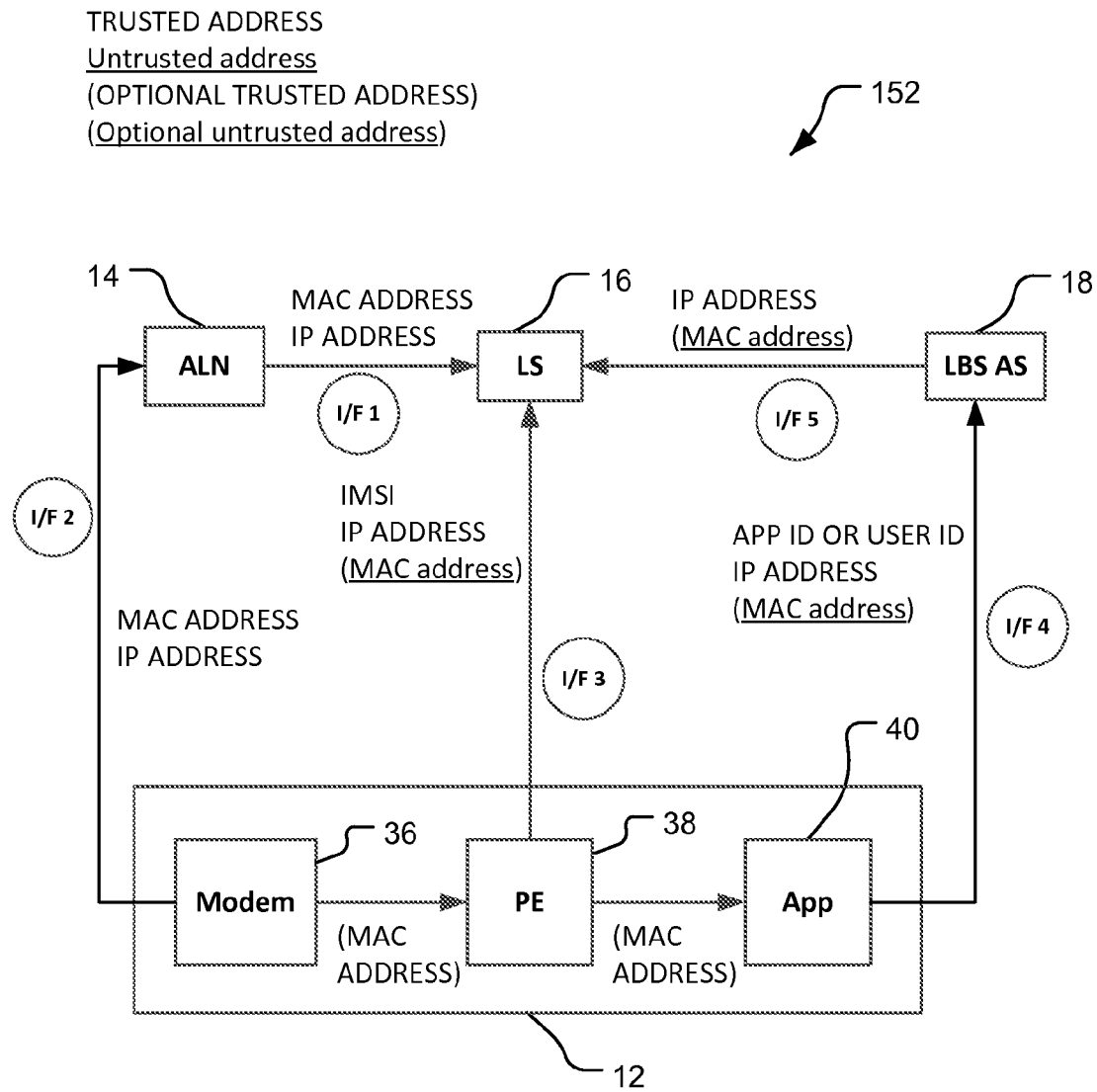

Referring now to FIG. 8, with further reference to FIGS. 1-7, an example of use of a common MD ID using an implementation 152 of the system 10 to verify the MD 12 for MBP is shown. This example is similar to the example shown in FIG. 7 and described above, except that the MD 12 (here the PE 38) also sends the IP address and an IMSI (International Mobile Subscriber Identity) to the LS 16 over I/F 3 using the I/F 3 transceiver 44. The information sent over I/F 3 to the LS 16 may form part of a location session between the MD 12 (or the PE 38) and the LS 16—e.g., using the SUPL location solution. In this example, the common MD ID for the MD 12 is again an IP address associated with the MD 12 and optionally a MAC address for the MD 12. In this example, the MD 12 may use the ALN 14 to access the LS 16, including to send the IMSI for the MD 12, the IP address associated with the MD 12, and optionally the MAC address for the MD 12, to the LS 16 over I/F 3. Thus, while FIG. 8 shows the IMSI and the IP address being sent from the MD 12 directly to the LS 16 over I/F 3, the implementation of this communication from the MD 12 to the LS 16 may include sending information over I/F 2 to the ALN 14 with the ALN 14 then forwarding this information (e.g., using an IP router in the ALN 14) to the LS 16 similar to the MD 12 sending information to the LBS AS 18 via the ALN 14 as discussed above. The IP address received by the LS 16 from the MD 12 over I/F 3 may be trusted if the LS 16 is able to receive the IP packets sent by the MD 12 (e.g., via the ALN 14) since the IP address of the MD 12 may be a mandatory part of such IP packets (e.g., part of the IP header of each IP packet) and thus not easily capable of being spoofed. The optional MAC address received by the LS 16 from the MD 12 over I/F 3 may, however, not be trusted as the MAC address may just be part of message content and not associated with a communications protocol visible to the LS 16. The IMSI sent by the MD 12 to the LS 16 over I/F 3 may be trusted if the LS 16 is able to authenticate the IMSI. For example, if the SUPL ULP protocol is used over I/F 3 by the MD 12 and the LS 16, the LS 16 may employ SUPL authentication procedures to verify the IMSI. In some implementations, the MD 12 may not send an IMSI but some other MD identity such as a Mobile Subscriber Integrated Services Digital Network Number (MSISDN) which may be authenticated by the LS 16 instead of an IMSI. The LS 16 can determine whether the same MD provided the IP addresses that the LS 16 received over each of I/F 1, I/F 5, and I/F 3 by comparing the three IP addresses to determine whether they indicate that they came from the same source, e.g., that they match. If the three received IP addresses match and if any MAC addresses received over I/F 1, I/F 5 and/or I/F 3 by the LS 16 also match, then the LS 16 can assume that the same MD sent all the addresses. The LS 16 may also be able to identify the sending MD as being the MD 12 from the MAC address received (if a MAC address is received by the LS 16) or from any verified IMSI (or MSISDN) received by the LS 16 from the MD 12 over I/F 3. The LS 16 may then use NPB to provide location services related to the MD 12 to the LBS AS 18 and/or to the MD 12 via the LBS AS 18 as described in association with FIG. 7. In addition or alternatively, the LS 16 may employ MBP (e.g., using the SUPL solution) over I/F 3 to provide location services to the MD 12 such as providing location assistance data to the MD 12, determining a location of the MD 12 and providing the location to the MD 12. The LS 16 may further obtain the location or a series of locations for the MD 12 using MBP over I/F 3 and provide the location or locations to the LBS AS 18 after which the LBS AS 18, as in FIG. 7, (i) may return the location or locations to an external client or to the MD 12, (ii) may retain the location or locations to help gather data on users in the indoor area 26, and/or (iii) may provide location-related content to the MD 12 (or to the App 40) over I/F 4 such as map data and directions.

Figure 9:
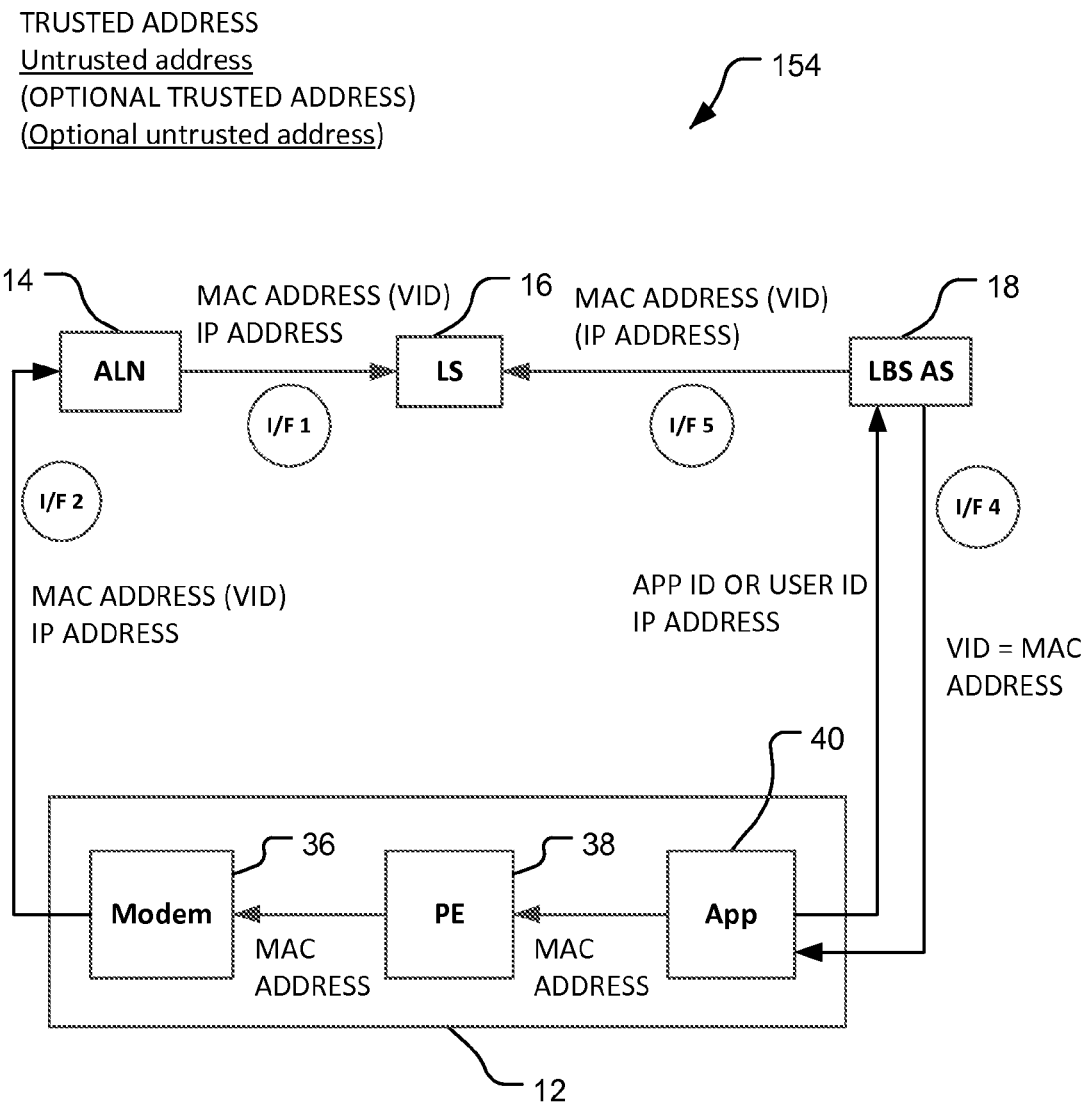

Referring now to FIG. 9, with further reference to FIGS. 1-8, another example of use of a common MD ID using an implementation 154 of the system 10 to verify the MD 12 for NBP is shown. In this example, the LBS AS 18, in particular the venue identifier module 116, is configured to reassign a MAC address to the MD 12 and to send the reassigned MAC address as a venue-assigned identifier (VID) to the MD 12. In this example, the common MD ID is a VID and the VID is the MAC address assigned to the MD 12 by the LBS AS 18. The VID (here, MAC address) may be assigned temporarily to the MD 12 by the LBS AS 18 while the MD 12 is in a venue supported by the LBS AS 18—e.g., while the MD 12 is in the indoor area 26—and may replace the normal MAC address of the MD 12 for the period of assignment. The period of assignment, or assignment period, may be finite (e.g., 10 minutes, or equal to a period during which the MD 12 is in the indoor area 26, etc.) or open-ended (i.e., indefinite), e.g., if VIDs are not reused by the assigning entity, here the LBS AS 18, although an open-ended assignment could be terminated, e.g., by a follow-up communication to the MD 12 from the LBS AS 18. The VID may also be obtained by the LBS AS 18 from some entity in a venue—e.g., from a Service and Security Manager (SSM 24) described later. The VID may be unique to the MD 12 for the period of assignment to the MD 12 and thus not assigned to any other MD while assigned to the MD 12. After the VID has been assigned, the MD 12 may include the VID (here the new MAC address) in a communication (e.g., IEEE 802.11 frames) that the MD 12 sends to the ALN 14 over I/F 2. To start the VID assignment, the LBS AS 18 may receive an App ID (e.g., for the App 40) or a user ID from the MD 12 (or from the App 40) over I/F 4 and may authenticate this ID—e.g., may verify that the ID belongs to the MD 12 or to the App 40 and that the ID belongs to an App or user that is entitled to receive location-related services from the venue supported by the LBS AS 18 in the indoor area 26. In order to ensure that the MD 12 and the user of the MD 12 and not some other MD and user receive location-related services, the LBS AS 18 may send the VID containing a venue-assigned MAC address to the MD 12 (or to the App 40) over I/F 4. Specifically, the venue identifier module 116 may send the VID via the I/F 4 transceiver 118 over I/F 4 to the App 40 of the MD 12 that receives the VID through the I/F 4 transceiver 46. In this case, I/F 4 may be a secure connection which may be established between the LBS AS 18 and the MD 12 just after or just before the LBS AS 18 has verified the App ID or user ID sent by the MD 12 (or by the App 40) and may employ ciphering to prevent other users and MDs from being able to intercept and discover the VID sent on I/F 4 to the MD 12 (or the App 40). The App 40 may provide the VID (here the MAC address) to the PE 38 via I/F B, and the PE 38 may provide the VID to the modem 36 via I/F A. In some implementations, the App 40 may provide the received VID (here the MAC address) to the modem 36 in other ways—e.g., via an operating system for the MD 12. The modem 36 may use the provided MAC address in the VID for all communication over I/F 2 as described earlier and may thus provide the VID (here the MAC address) and the IP address of the MD 12 to the ALN 14 over I/F 2 using the I/F 2 transceiver 42. The ALN 14 transfers the received VID (here the MAC address) and the received IP address over I/F 1 to the LS 16 that receives the VID and the IP address using the I/F 1 transceiver 66. Further, the LBS AS 18, in particular the venue identifier module 116, may send the VID (here the assigned MAC address) over I/F 5 using the I/F 5 transceiver 120 to the LS 16, that receives the VID using the I/F 5 transceiver 70. The LS 16 may verify that the same VID (here, the same MAC address) is received from the LBS AS 18 over I/F 5 and from the ALN 14 over I/F 1 —e.g., may perform a comparison using comparison module 86. Since the VID (here the MAC address) was assigned by the venue (e.g., by the LBS AS 18) and was transferred securely to the MD 12 over I/F 4, the LS 16 may assume that the same MD is being used over I/F 2 and over I/F 4 if the same VID is received by the LS 16 over I/F 1 and I/F 5. The LS 16 may then provide location services associated with the MD 12 to the LBS AS 18 using NBP as described in association with FIG. 7. Further, the LBS AS 18 may use location information (e.g., location estimates) for the MD 12 received from the LS 16 to provide location services to the MD 12 (or to the App 40), to an authorized external client, and/or to a venue owner or operator. In case the LS 16 does not determine a match between the VID received from the LBS AS 18 and the VID (here the MAC address) received from the ALN 14, the LS 16 may assume that the same MD is not being used over I/F 2 and I/F 4 and may withhold provision of location services.

Figure 10:
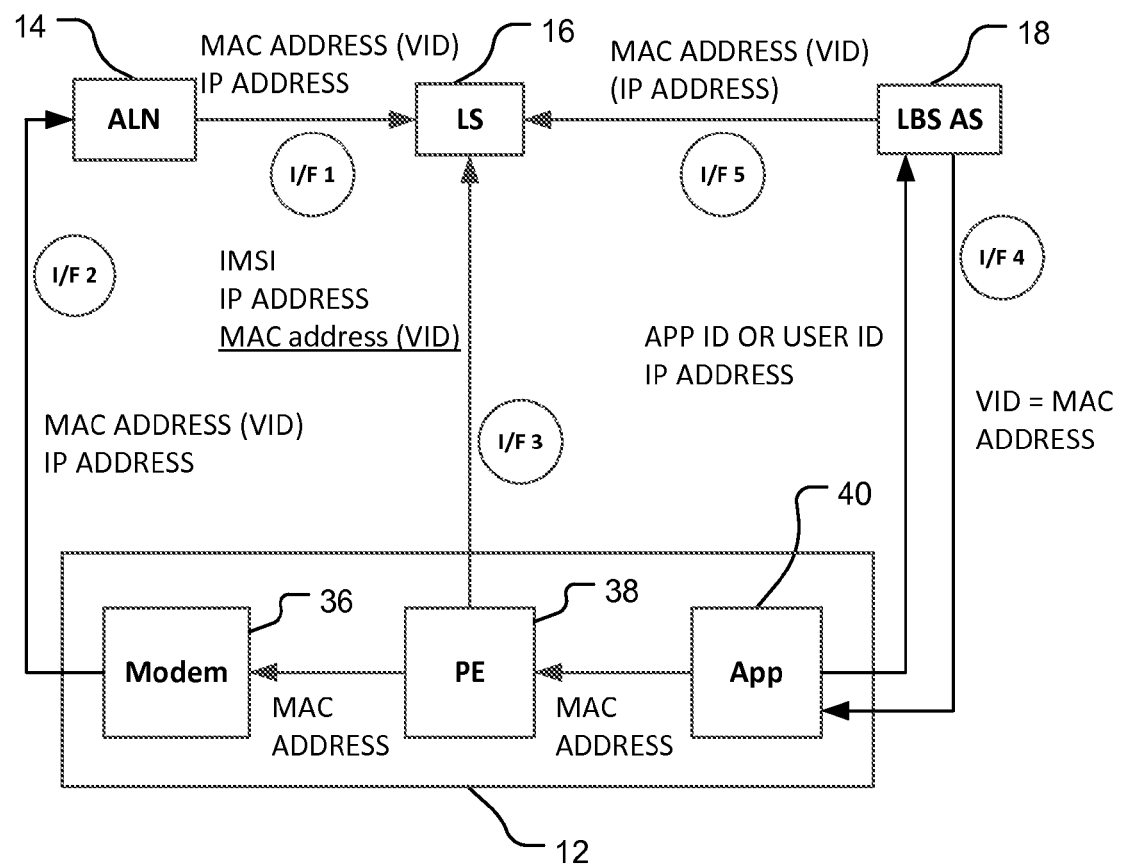

Referring now to FIG. 10, with further reference to FIGS. 1-6 and 9, another example of use of a common MD ID using an implementation 156 of the system 10 to verify the MD 12 for MBP is shown. In this example, the common MD ID is a VID that comprises a new MAC address assigned by a venue (e.g., by the LBS AS 18) to the MD 12. This example is similar to the example shown in FIG. 9 and described above, except that the MD 12 (here the PE 38) also sends the VID (comprising the MAC address assigned to the MD 12 by the LBS AS 18 over I/F 4), the IP address associated with the MD 12, and an IMSI for the MD 12 to the LS 16 over I/F 3 using the I/F 3 transceiver 44. The information sent over I/F 3 may form part of a location session between the MD 12 (or the PE 38) and the LS 16—e.g., using the SUPL location solution. In this example, the MD 12 may use the ALN 14 to access the LS 16, including to send the IMSI, the VID, and the IP address to the LS 16. Thus, while FIG. 10 shows the IMSI, the VID, and the IP address being sent from the MD 12 directly to the LS 16 over I/F 3, the implementation of this communication from the MD 12 to the LS 16 may include sending this information over I/F 2 to the ALN 14 with the ALN 14 then forwarding the information (e.g., using an IP router in the ALN 14) to the LS 16 similarly to the MD 12 (or the App 40) sending information to the LBS AS 18 via I/F 2 via the ALN 14 as discussed above. The IP address associated with the MD 12 that is sent by the MD 12 (e.g., by the PE 38) to the LS 16 (e.g., via the ALN 14) may be trusted by the LS 16 because the LS 16 may be able to receive the IP packets sent by the MD 12 which contain the IP address of the MD 12 (e.g., in an IP header in each IP packet) included for the purposes of normal communication including being able to receive responses (e.g., from the LS 16 over I/F 3). Hence, the likelihood of the IP address being false (e.g., spoofed from another MD) may be very low. Similarly, the IMSI for the MD 12 (or possibly another ID for the MD 12 such as an MSISDN) that is sent by the MD 12 (e.g., the PE 38) to the LS 16 over I/F 3 may be trusted by the LS 16 if the LS 16 is able to authenticate the IMSI—e.g., using authentication supported by the SUPL location solution. However, the VID (here, the MAC address) sent by the MD 12 to the LS 16 on I/F 3 may not be considered trustworthy by the LS 16 as the VID (here the MAC address) may not be part of any communication transport protocol intercepted and supported by the LS 16 and thus could possibly be spoofed on I/F 3. The LS 16 can determine whether the same MD has sent the information received by the LS 16 over I/F 1, I/F 3 and I/F 5 as before by matching the IP address (e.g., 3 separate IP addresses) received over each of these 3 interfaces and by matching the VID (e.g., 3 separate VIDs each comprising the MAC address assigned to the MD 12)—e.g., using comparison module 86. If the same IP address is received over all 3 interfaces (I/F 1, I/F 3 and I/F 5) and if the same VID is received over all 3 interfaces (or just over any 2 interfaces if not received over all 3 interfaces), then the LS 16 may consider that the same MD is sending the information that was received and therefore the received information may be trusted. Further, the LS 16 may identify the MD 12 from any IMSI received and authenticated over I/F 3 or by associating the VID that was received to an application or user—e.g., if the LBS AS 18 has provided this association in data accessible to the LS 16. The LS 16 may then provide location services to the MD 12 or associated with the MD 12 as described for FIG. 8—e.g., may send location assistance data to the MD 12, may compute and send a location of the MD 12 to the MD 12 and/or may send a location or series of locations for the MD 12 to the LBS AS 18. The LS 16 may further use NBP (e.g., measurements obtained for the MD 12 by the ALN 14) to locate the MD 12 and/or may use MBP (e.g., location measurements or a location estimate received from the MD 12 over I/F 3) to locate the MD 12. The LBS AS 18 may provide the location of the MD 12 (e.g., received from the LS 16) to the MD 12, may provide location-related content to the MD 12 (e.g., navigation data, maps, directions), may provide the location of the MD 12 to authorized external clients and/or may use location information for the MD 12 to help compile statistical data for the MD 12 or for all users in indoor area 26.

Figure 11:
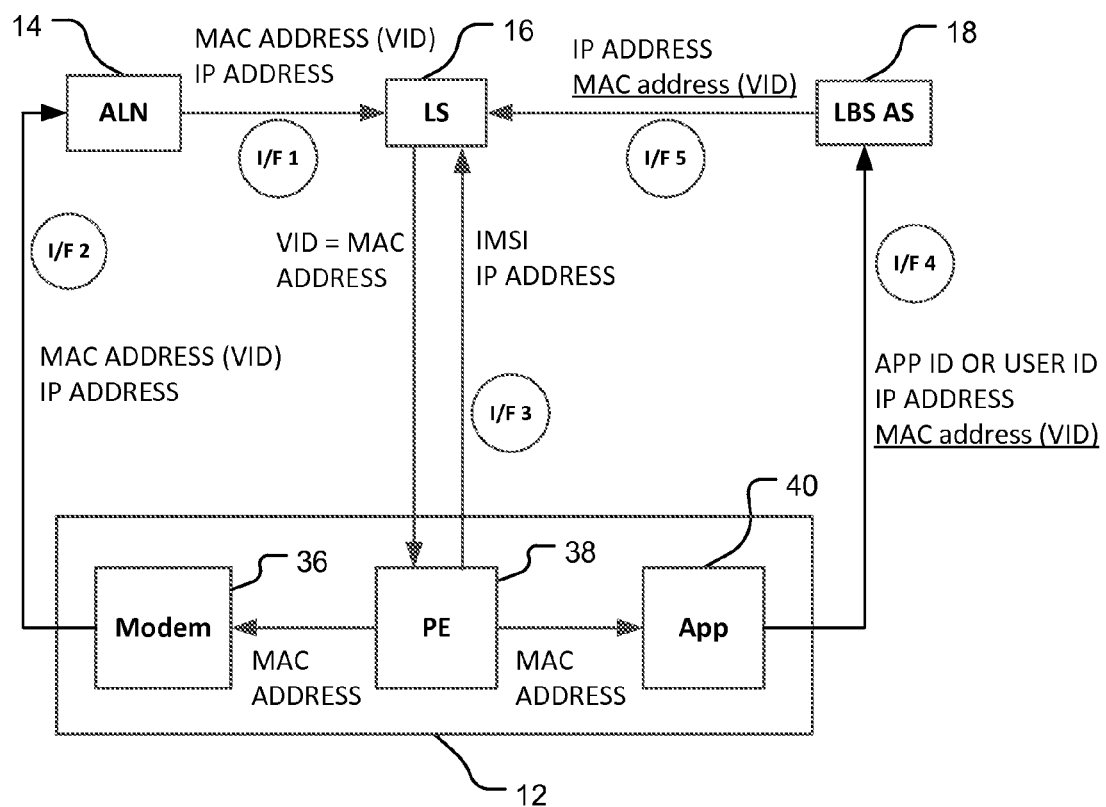

Referring now to FIG. 11, with further reference to FIGS. 1-6 and FIGS. 9-10, another example of use of a common MD ID using an implementation 158 of the system 10 to verify the MD 12 for MBP is shown. In this example, the common MD ID is a VID that comprises a new MAC address assigned by a venue (e.g., by the LS 16) to the MD 12. In this example, the LS 16, in particular the venue identifier module 90, is configured to reassign a new MAC address to the MD 12 and to send the reassigned MAC address as a venue-assigned identifier (VID) to the MD 12 over I/F 3. As in FIGS. 9 and 10, the VID may be unique to the MD 12 for the period of assignment to the MD 12 and thus not assigned to any other MD while assigned to the MD 12. The venue identifier module 90 sends the VID via the I/F 3 transceiver 68 over I/F 3 to the MD 12, in particular to the PE 38, that receives the VID through the I/F 3 transceiver 44. In this case, I/F 3 may be a secure connection such that the VID is provided to the MD 12 in a trustworthy manner. For example, the MD 12 (e.g., the PE 38) may access the LS 16 to obtain location services (e.g., obtain the location of the MD 12 or obtain location assistance data from the LS 16 such as BSA data for the ALN 14 or GNSS satellite data). Alternatively, the LS 16 may access the MD 12 (e.g., the PE 38) in order to locate the MD 12 and provide the location of the MD 12 to an authorized external client such as the LBS AS 18. As part of the access between the MD 12 (e.g., the PE 38) and the LS 16, the LS 16 may authenticate the identity of the MD 12 (e.g., an IMSI or MSISDN for the MD 12) and/or the MD 12 (e.g., the PE 38) may authenticate the identity of the LS 16 (e.g., may verify that the LS 16 belongs to a venue for the indoor area 26 and that the MD 12 is authorized—e.g., by a home wireless network operator—to provide location services to the MD 12). Preferably following any authentication, the LS 16 may send a VID comprising a new MAC address to the MD 12 (e.g., to the PE 38) as shown in FIG. 11. As an example, the SUPL location solution may be supported by the LS 16 and the MD 12 and may be used for mutual authentication and transfer of the VID from the LS 16 to the MD 12. Communication on I/F 3 between the LS 16 and the MD 12 (e.g., the PE 38) may be transferred via the ALN 14 (e.g., using I/F 2 and I/F 1) and may further be transferred via the modem 36 in the MD 12. Following receipt of the VID from the LS 16, the PE 38 may provide the VID (here the MAC address) to the modem 36 via I/F A. The modem 36 may then use the received MAC address (rather than any MAC address normally used by the MD 12) for all communication with the ALN 14. Thus, the modem 36 may send one or more signals or messages, to the ALN 14, that may be intercepted by APs in the ALN 14 and that contain the new MAC address (here the VID) and the IP address of the MD 12, over I/F 2 using the I/F 2 transceiver 42. The ALN 14 may transfer the received MAC address (i.e., the VID) and the received IP address over I/F 1 to the LS 16 that receives the VID and the IP address using the I/F 1 transceiver 66. The ALN 14 and the LS 16 may consider both the received MAC address (i.e., the VID) and received IP address to be trustworthy as they may have been received as part of normal communication protocols (e.g., an IEEE 802.11 protocol in the case of the MAC address and the IP protocol in the case of the IP address) used on I/F 2 and thus would be unlikely to be false (e.g., spoofed from another MD). Further, the PE 38 may send the new MAC address (i.e., the VID) to the App 40 via I/F B and the App 40 may send an App ID or User ID, the IP address for the MD 12, and the MAC address (i.e., the VID) over I/F 4, using the I/F 4 transceiver 46, to the LBS AS 18. The LBS AS 18 receives the App ID or User ID, the IP address, and the MAC address (VID) using the I/F 4 transceiver 118 and may then send the MAC address (i.e., the VID) and the IP address, using the I/F 5 transceiver 120, over I/F 5 to the LS 16. All communication on I/F 4 between the LBS AS 18 and the MD 12 (e.g., the App 40) may be transferred via the ALN 14 (e.g., using I/F 2 and an interface between the ALN 14 and the LBS AS 18 that is not shown in FIG. 11 or in FIG. 2) and may further be transferred via the modem 36 in the MD 12. The LBS AS 18 may verify (e.g., authenticate) the App ID or user ID received from the App 40 over I/F 4 after which (or before which) a secure (e.g., ciphered) connection may be established between the App 40 and the LBS AS 18. The MAC address (i.e., the VID) that is transferred from the App 40 to the LBS AS 18 over I/F 4 may then be sent using this secure connection and thus may not be seen (e.g., intercepted) by other MDs. However, because the MAC address may not form part of a communication protocol visible to the LBS AS 18, the LBS AS 18 may not consider the MAC address to be trustworthy. However, the LBS AS 18 may consider the IP address received from the MD 12 to be trustworthy if the communication protocol (e.g., IP) within which the IP address is contained is visible to the LBS AS 18 as described earlier, since the included IP address may then be used to support other communication with the MD 12 (e.g., responses from the LBS AS 18) and may thus be correct and not susceptible to spoofing.

As described above and as shown in FIG. 11, the LS 16 may receive a MAC address and IP address from the ALN 14 over I/F 1 that are considered trustworthy and an IP address that is considered trustworthy and a MAC address that is not considered trustworthy from the LBS AS 18 over I/F 5. The LS 16 may also receive an IP address from the MD 12 (e.g., the PE 38) over I/F 3 that is considered trustworthy and may then send a VID comprising a MAC address to the MD 12 (e.g., the PE 38) over I/F 3. The LS 16 can make a determination as to whether the same MD is being used on I/F 2, I/F 3, and I/F 4. As in the previous example for FIG. 10, this may be done by comparing the IP addresses received by the LS 16 on I/F 1, I/F 3 and I/F 5 and by comparing the MAC addresses (here, VIDs) received by the LS 16 on I/F 1 and I/F 5 and sent by the LS 16 on I/F 3. The comparison may be performed by comparison module 86. If the IP addresses all match and the MAC addresses (here, VIDs) all match, then the LS 16 may consider that the same MD is being used across each of interfaces 2, 3 and 4. Further, the LS 16 may identify this MD as being the MD 12 in some implementations using the IMSI (or some other MD ID such as an MSISDN). The LS 16 may then provide location services to or associated with the MD 12 using NBP and/or MBP as described for FIG. 10 and/or may provide location information (e.g., one or more locations) for the MD 12 to the LBS AS 18. The LBS AS 18 may further provide location services to the MD 12 and/or an authorized external client as described for FIG. 10. If the IP addresses and the MAC addresses (here, VIDs) do not all match, then the LS 16 may consider that the same MD is not being used across each of interfaces 2, 3 and 4 and may withhold provision of location services.

Figure 12:
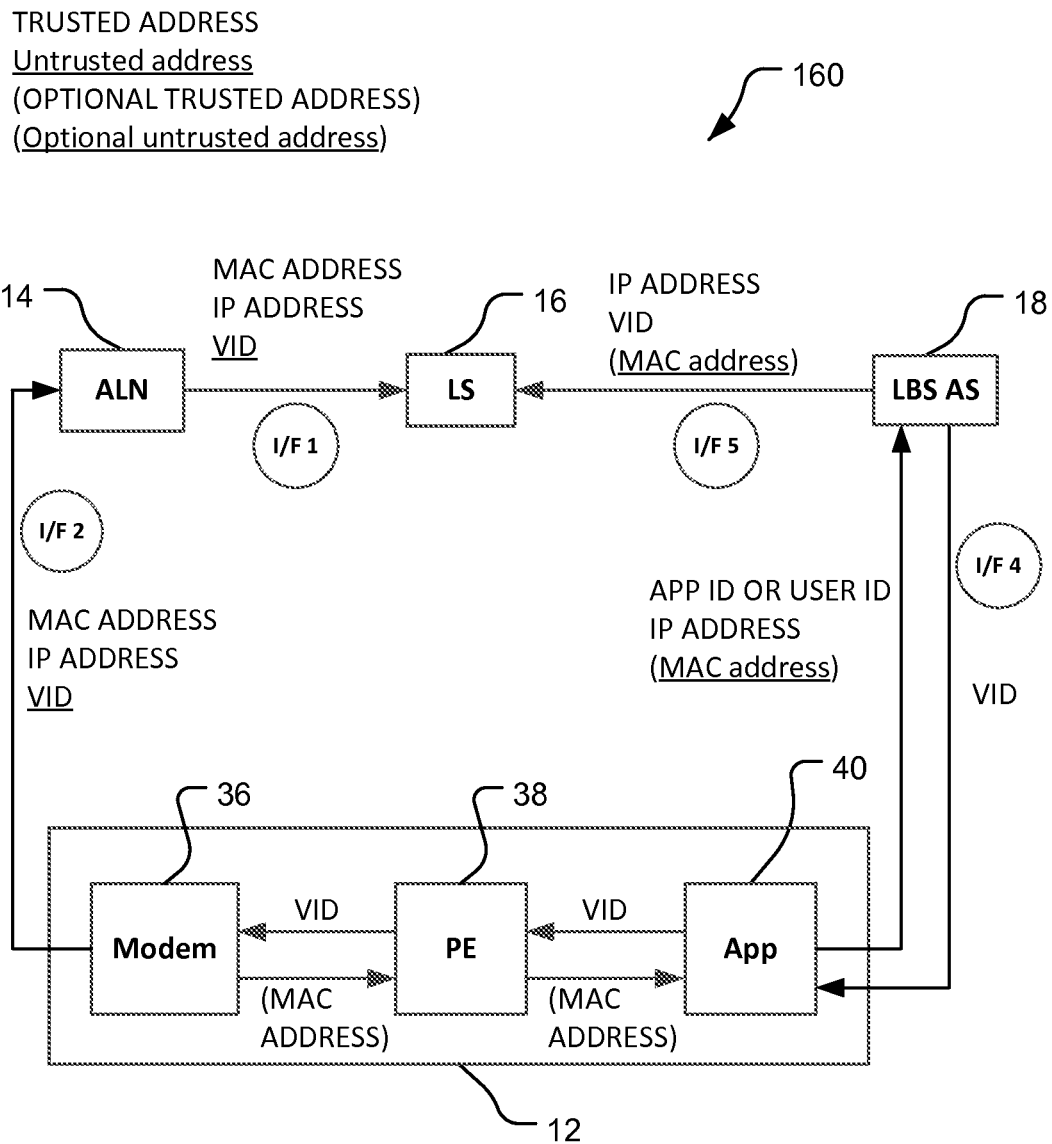

Referring now to FIG. 12, with further reference to FIGS. 1-7 and 9, another example of use of a common MD ID using an implementation 160 of the system 10 to verify the MD 12 for NBP is shown. In this example, the common MD ID is a VID that is typically not a MAC address and may be a string of characters, decimal digits, hexadecimal digits, a binary string, an octet string or some other value. The VID may be assigned by the LBS AS 18 or may be obtained by the LBS AS 18 from some entity in a venue—e.g., from a Service and Security Manager (SSM 24) described later. In this example, the LBS AS 18, in particular the venue identifier module 116, may be configured to assign the non-MAC address VID to the MD 12 and to send the VID to the MD 12 over I/F 4. To determine the VID to assign, the venue identifier module 116 may produce the VID (e.g., using a random number generator, etc.), select the VID from a stored set of VIDs, or obtain the VID in another manner (e.g., from the SSM 24). The VID may be unique to the MD 12 for the period of assignment to the MD 12 and thus not assigned to any other MD while assigned to the MD 12. To start the VID assignment, the LBS AS 18 may receive an App ID (e.g., for the App 40) or a user ID from the MD 12 (or from the App 40) over I/F 4 and may authenticate this ID—e.g., may verify the ID is assigned to the App 40 or to the MD 12 and identifies an App or user entitled to receive location-related services from the venue supported by the LBS AS 18 in the indoor area 26. In order to help ensure that the MD 12 and the user of the MD 12 and not some other MD or user receive location-related services, the LBS AS 18 may send the VID to the MD 12 (or to the App 40) over I/F 4. Specifically, the venue identifier module 116 may send the VID via the I/F 4 transceiver 118 over I/F 4 to the App 40 of the MD 12 that receives the VID through the I/F 4 transceiver 46. In this case, I/F 4 may be a secure connection which may be established between the LBS AS 18 and the MD 12 after (or before) the LBS AS 18 has verified the App ID or user ID sent by the MD 12 (or by the App 40) and may employ ciphering to prevent other users and MDs from being able to intercept and discover the VID sent on I/F 4. As before, communication on I/F 4 between the LBS AS 18 and the MD 12 (e.g., the App 40) may be transferred via the ALN 14 (e.g., using I/F 2 and an interface between the ALN 14 and the LBS AS 18 that is not shown in FIG. 12 or in FIG. 2) and may further be transferred via the modem 36 in the MD 12. The App 40 may provide the VID to the PE 38 via I/F B, and the PE 38 may provide the VID to the modem 36 via I/F A. In some implementations, the App 40 may provide the received VID (here, the MAC address) to the modem 36 in other ways—e.g., via an operating system for the MD 12. The modem 36 may provide the VID, the MAC address for the MD 12, and the IP address of the MD 12, to the ALN 14 over I/F 2 using the I/F 2 transceiver 42. The ALN 14 may transfer the received VID, the MAC address, and the IP address over I/F 1 to the LS 16 that receives the VID and the IP address using the I/F 1 transceiver 66. The modem 36 may also provide the MAC address for the MD 12 to the PE 38 via I/F A, and the PE 38 may provide the received MAC address to the App 40 via I/F B. The App 40 may send the IP address of the MD 12, and possibly the MAC address received from the PE 38, via the I/F 4 transceiver 46 over I/F 4 to the LBS AS 18 when in communication with the LBS AS 18 (e.g., at the same time that the App 40 sends the user ID or App ID to the LBS AS 18 and receives the VID from the LBS AS 18 as described earlier). Further, the LBS AS 18 may send the received IP address, the MAC address (if received from the App 40), and the VID assigned to the MD 12 over I/F 5 using the I/F 5 transceiver 120 to the LS 16, that receives the IP address, the MAC address (if sent), and the VID using the I/F 5 transceiver 70. The ALN 14 and the LS 16 may consider the IP address and MAC address received from the MD 12 over I/F 2 as trustworthy if they are included within an access protocol or transport protocol (e.g., an IEEE 802.11 protocol in the case of a MAC address and IP in the case of an IP address) that is visible to (e.g., intercepted by) the ALN 14. Likewise, the LBS AS 18 and the LS 16 may consider an IP address received from the MD 12 over I/F 4 as trustworthy if included within a transport protocol visible to (e.g., intercepted by) the LBS AS 18. Further, the LS 16 may consider a VID received from the LBS AS 18 as trustworthy due to being assigned by the LBS AS 18. However, a MAC address transferred by the MD 12 to the LBS AS 18 and then transferred to the LS 16 and any VID transferred by the MD 12 to the ALN 14 and then to the LS 16 may not be considered trustworthy (initially) due to being included inside other messages and not being included for communication purposes and hence being susceptible to spoofing.

As described above and as shown in FIG. 12, the LS 16 may receive, over I/F 1 from the ALN 14, a MAC address and IP address that are considered trustworthy and a VID that is not considered trustworthy, and may receive, over I/F 5 from the LBS AS 18, an IP address and VID that are considered trustworthy and a MAC address that is not considered trustworthy. The LS 16 can make a determination as to whether the same MD is being used on I/F 2 and I/F 4. As in the previous examples, this may be done by comparing the two IP addresses, two MAC addresses (if received), and two VIDs received by the LS 16 on I/F 1 and I/F 5. The comparison may be performed by comparison module 86. As a MAC address can be spoofed on I/F 4, the MAC address comparison may not be reliable. However, the IP address comparison may be reliable if the MD 12 uses the ALN 14 to access the LBS AS 18. The VID comparison may also be reliable because the venue (i.e., the LS 16 or the LBS AS 18 associated with the venue) assigned the VID. If the two IP addresses, the two MAC addresses (if received) and the two VIDs all match, then the LS 16 may consider that the same MD is being used across each of interfaces 2 and 4. Further, the LS 16 may identify this MD as being the MD 12 in some implementation using the MAC address or VID received from the ALN 14 or from the LBS AS 18 (e.g., if a lookup table is available to the LS 16 that associates the MD identity to the MAC address or VID). The LS 16 may then provide location services to or associated with the MD 12 using NBP as described for FIG. 7 and FIG. 9 and/or may provide location information (e.g., one or more locations) for the MD 12 to the LBS AS 18. The LBS AS 18 may further provide location services to the MD 12 and/or an authorized external client as described for FIG. 7 and FIG. 9.

Figure 13:
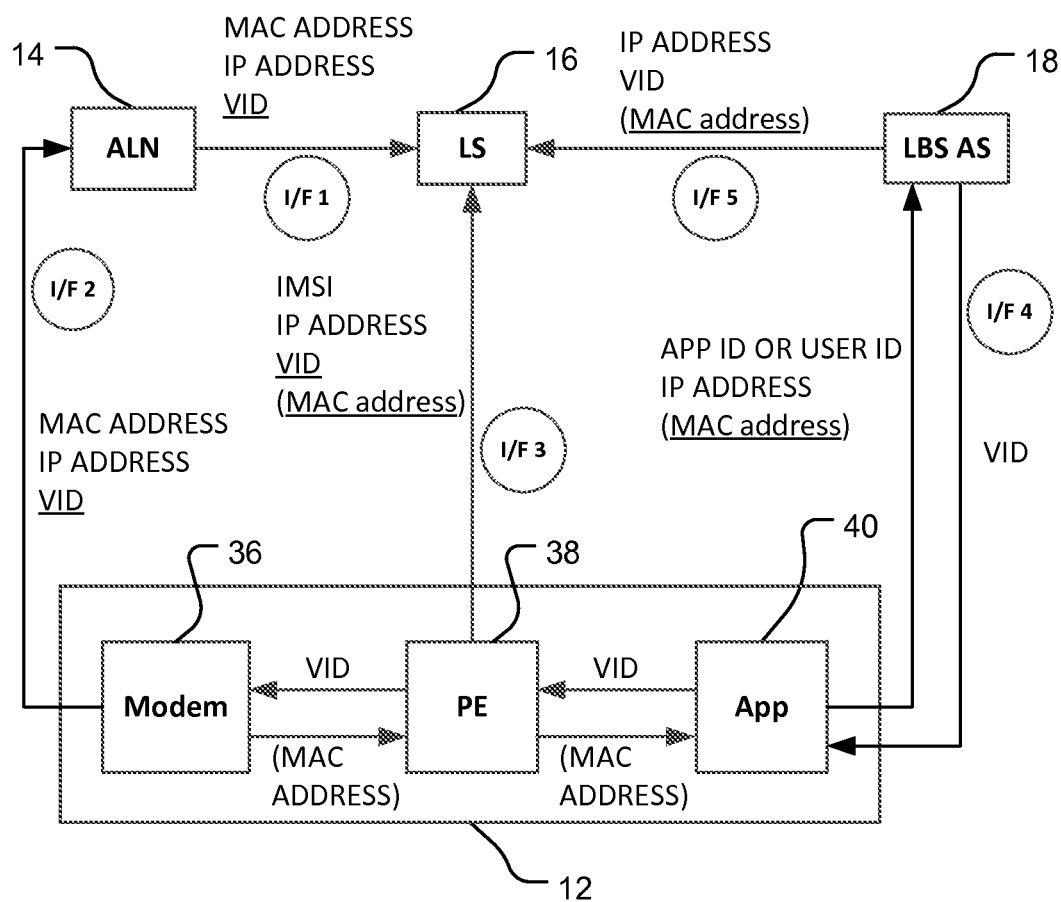

Referring now to FIG. 13, with further reference to FIGS. 1-6 and 12, another example of use of a common MD ID using an implementation 162 of the system 10 to verify the MD 12 for MBP is shown. In this example, the common MD ID is a VID that is typically not a MAC address and may be a string of characters, decimal digits, hexadecimal digits, a binary string, an octet string or some other value. The VID may be assigned by the LBS AS 18 or may be obtained by the LBS AS 18 from some entity in a venue—e.g., from a Service and Security Manager (SSM 24) described later. This example is similar to the example shown in FIG. 12 and described above, except that the MD 12 (here, the PE 38) also sends the VID, the IP address of the MD 12, an IMSI or some other identification for the MD 12 such as an MSISDN, and possibly the MAC address of the MD 12 to the LS 16 over I/F 3 using the I/F 3 transceiver 44. The IP address associated with the MD 12 that is sent by the MD 12 (e.g., by the PE 38) to the LS 16 (e.g., via the ALN 14) may be trusted by the LS 16 because the LS 16 may be able to receive the IP packets sent by the MD 12 which contain the IP address of the MD 12 included for the purposes of normal communication including being able to receive responses (e.g., from the LS 16 over I/F 3). Hence, the likelihood of the IP address being false (e.g., spoofed from another MD) may be low. Similarly, the IMSI for the MD 12 (or possibly another ID for the MD 12 such as MSISDN) that is sent by the MD 12 (e.g., the PE 38) to the LS 16 over I/F 3 may be trusted by the LS 16 if the LS 16 is able to authenticate the IMSI—e.g., using authentication supported by the SUPL location solution. However, the VID and, if included, the MAC address sent by the MD 12 to the LS 16 on I/F 3, may not be considered trustworthy by the LS 16 as the VID and the MAC address may not be part of any communication transport protocol intercepted and supported by the LS 16 and thus could possibly be spoofed on I/F 3. The LS 16 can make a determination as to whether the same MD provided the three VIDs, the three IP addresses, and possibly the two or three MAC addresses, that the LS 16 received over I/F 1, I/F 5, and I/F 3 by comparing the three VIDs, the three IP addresses, and (if provided on I/F 3 and/or I/F 5) the two or three MAC addresses, to determine whether the received information indicate the same source, e.g., that the three VIDs, the three IP addresses, and if provided, the two or three MAC addresses, match (i.e., the 3 VIDs match, the 3 IP addresses match, and the 2 or 3 MAC addresses match). Further, the LS 16 may identify the MD 12 from any IMSI received and authenticated over I/F 3 or by associating the VID that was received to an application or user—e.g., if the LBS AS 18 has provided this association in data accessible to the LS 16. A MAC address can be spoofed on I/F 3 and/or I/F 4, so MAC address comparison by itself may not be reliable. An IP address comparison may be reliable unless the MD 12 does not use the ALN 14 to access the LBS AS 18 and/or the LS 16 (e.g., if the MD 12 uses some other access network to access the LBS AS 18 and/or the LS 16 and uses a different IP address—e.g., assigned by the different access network—for such access). A VID comparison may always be reliable because the venue (e.g., the LBS AS 18) assigned the VID uniquely to the MD 12 in a manner not visible to other MDs. Based on verifying the same MD (or the MD 12) for each of interfaces 2, 3 and 4, the LS 16 can take appropriate action, as discussed above (e.g., in association with FIG. 10) to provide location services to the MD 12, the LBS AS 18, and/or an external client, and the LBS AS 18 can provide appropriate location services to the MD 12, an external client, and/or the venue, based on the determination.

Figure 14:
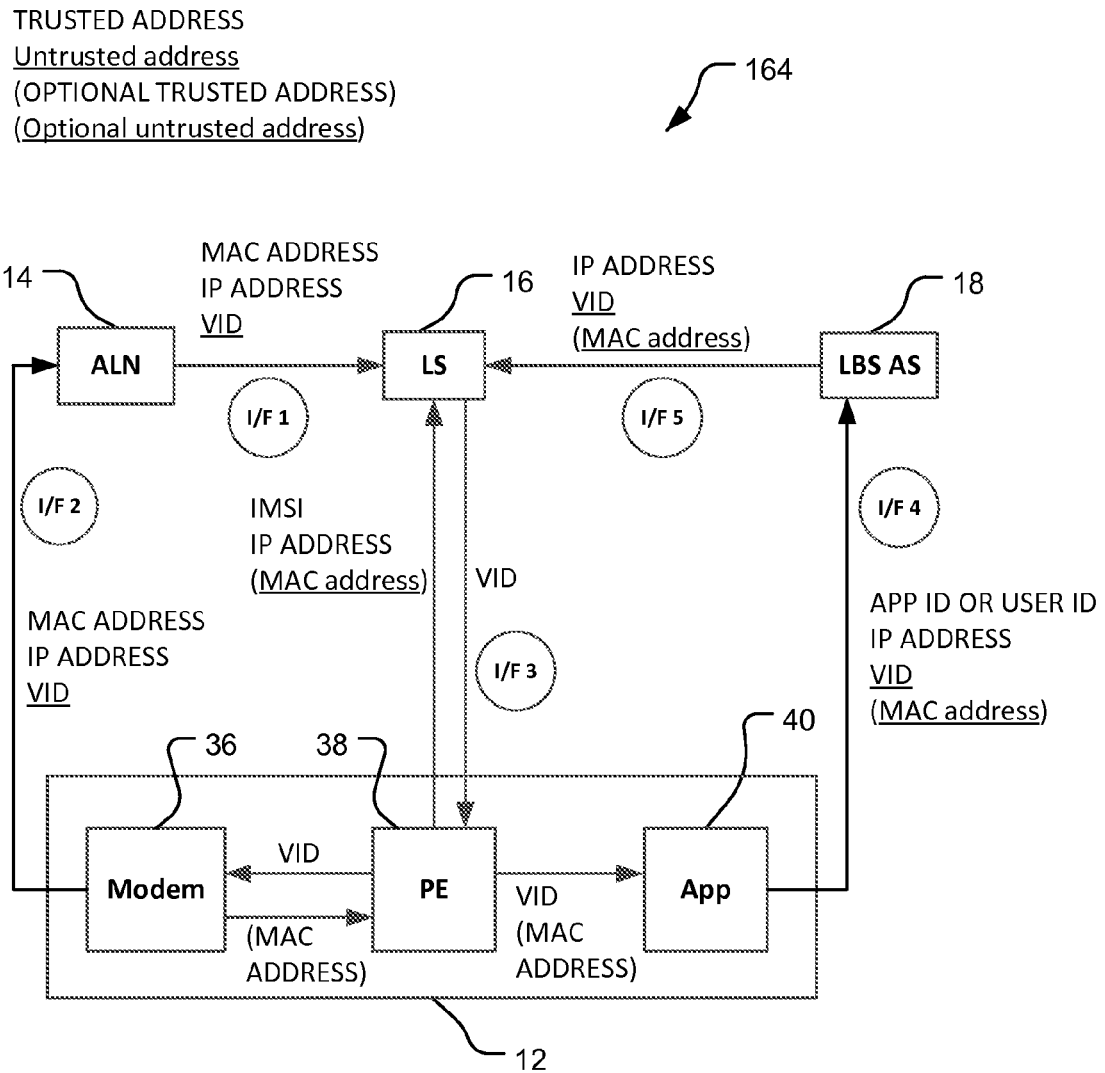

Referring now to FIG. 14, with further reference to FIGS. 1-6, another example of use of a common MD ID using an implementation 164 of the system 10 to verify the MD 12 for MBP is shown. In this example, the common MD ID is a VID that is typically not a MAC address and may be a string of characters, decimal digits, hexadecimal digits, a binary string, an octet string or some other value. The VID may be assigned by the LS 16 or may be obtained by the LS 16 from some entity in a venue —e.g., from a Service and Security Manager (SSM 24) described later. In this example, the LS 16, in particular the venue identifier module 90, is configured to assign a non-MAC address VID to the MD 12 and to send the VID to the MD 12 over I/F 3. The venue identifier module 90 sends the VID via the I/F 3 transceiver 68 over I/F 3 to the MD 12, in particular to the PE 38, that receives the VID through the I/F 3 transceiver 44. In this case, I/F 3 may be a secure connection such that the VID is provided to the MD 12 in a trustworthy manner. For example, the MD 12 (e.g., the PE 38) may access the LS 16 to obtain location services (e.g., obtain the location of the MD 12 or obtain location assistance data from the LS 16 such as BSA data for the ALN 14 or GNSS satellite data). Alternatively, the LS 16 may access the MD 12 (e.g., the PE 38) in order to locate the MD 12 and provide the location of the MD 12 to an authorized external client such as the LBS AS 18. As part of the access between the MD 12 (e.g., the PE 38) and the LS 16, the LS 16 may authenticate the identity of the MD 12 (e.g., an IMSI or MSISDN for the MD 12) and/or the MD 12 (e.g., the PE 38) may authenticate the identity of the LS 16 (e.g., may verify that the LS 16 belongs to a venue for the indoor area 26 and/or that the MD 12 is authorized to receive location services from the LS 16—e.g., by a home wireless network operator). Following any authentication, the LS 16 may send a VID as shown in FIG. 14. In addition, the MD 12 may send the IP address of the MD 12 and possibly a MAC address for the MD 12 (e.g., received by the PE 38 from the modem 36 over I/F A) to the LS 16. As an example, the SUPL location solution may be supported by the LS 16 and the MD 12 and may be used for mutual authentication and transfer of the VID from the LS 16 to the MD 12 and transfer of the MAC and IP addresses from the MD 12 to the LS 16. Communication on I/F 3 between the LS 16 and the MD 12 (e.g., the PE 38) may be transferred via the ALN 14 (e.g., using I/F 2 and I/F 1) and may further be transferred via the modem 36 in the MD 12. The LS 16 may consider the IP address received from the MD 12 to be trustworthy (e.g., if the IP address forms part of normal communication between the MD 12 and the LS 16) but may not consider the received MAC address to be trustworthy if included inside a transport protocol message. Following receipt of the VID from the LS 16, the PE 38 may provide the VID to the modem 36 via I/F A, and to the App 40 via I/F B. The modem 36 may send one or more signals or messages to the ALN 14 or that may be intercepted by APs in the ALN 14 that contain the VID, the MAC address of the MD 12, and the IP address of the MD 12, over I/F 2 using the I/F 2 transceiver 42. The ALN 14 may transfer the received VID, the received MAC address, and the received IP address over I/F 1 to the LS 16 that receives the VID, the MAC address, and the IP address using the I/F 1 transceiver 66. The ALN 14 and the LS 16 may consider both the received MAC address and the received IP address to be trustworthy as they may have been received as part of communication protocols (e.g., an IEEE 802.11 protocol in the case of the MAC address and the IP protocol in the case of the IP address) and thus would be unlikely to be false (e.g., spoofed from another MD). However, the ALN 14 and the LS 16 may consider the received VID to be untrustworthy due to being received inside access and transport protocol messages and thus being susceptible to spoofing.

The modem 36 may send the MAC address of the MD 12 to the PE 38 and the PE 38 may forward the MAC address (and the VID) to the App 40 via I/F B. The App 40 may send the App ID for the App 40 or a User ID, the IP address for the MD 12, the VID, and (optionally) the MAC address for the MD 12 over I/F 4, using the I/F 4 transceiver 46, to the LBS AS 18. The LBS AS 18 receives the App ID or User ID, the IP address, the VID, and (if sent) the MAC address using the I/F 4 transceiver 118 and may then send the VID, the IP address, and (optionally) the MAC address, using the I/F 5 transceiver 120, over I/F 5 to the LS 16. Communication on I/F 4 between the LBS AS 18 and the MD 12 (e.g., the App 40) may be transferred via the ALN 14 (e.g., using I/F 2 and an interface between the ALN 14 and the LBS AS 18 not shown in FIG. 14 or in FIG. 2) and may further be transferred via the modem 36 in the MD 12. The LBS AS 18 may verify (e.g., authenticate) the App ID or user ID received from the App 40 over I/F 4 after which (or before which) a secure (e.g., ciphered) connection may be established between the App 40 and the LBS AS 18. The VID and MAC address (if sent) that are transferred from the App 40 to the LBS AS 18 over I/F 4 may be sent using this secure connection and thus may not be seen (e.g., intercepted) by other MDs. However, because the VID and MAC address (if sent) may not form part of a communication transport protocol visible to the LBS AS 18, the LBS AS 18 (and the LS 16) may not consider the received VID and the MAC address (if sent) to be trustworthy. However, the LBS AS 18 (and the LS 16) may consider the IP address received from the MD 12 to be trustworthy if the communication protocol (e.g., IP) within which the IP address is contained is visible to the LBS AS 18, since the included IP address may then be used to support other communication with the MD 12 (e.g., responses from the LBS AS 18) and may thus be correct and not susceptible to spoofing.

The LS 16 can now make a determination (by appropriate comparisons) as to whether the same MD is being used on I/F 2, I/F 3, and I/F 4, i.e., that the same MD provided the VIDs, the IP addresses, and (optionally) the MAC addresses that the LS 16 received (or sent in the case of a VID for I/F 3) over I/F 1, I/F 3, and I/F 5, and that the VIDs received over I/F 2 and I/F 5 correspond to the VID assigned by the LS 16 and provided to the MD 12 over I/F 3. As before, the LS 16 can make this determination by matching the IP address (e.g., three separate IP addresses) received over each of I/F 1, I/F 3 and I/F 5 and by matching the VIDs received over I/F 1 and I/F 5 with the VID sent over I/F 3 and by matching any MAC addresses received over I/F 1, I/F 3 and I/F 5 —e.g., using comparison module 86. If the same IP address is received over all interfaces (I/F 1, I/F 3 and I/F 5), the same VID is received over I/Fs 1 and 5 as is sent over I/F 3 and if the same MAC address is received over I/Fs 1, 3 and/or 4, then the LS 16 may consider that the same MD is sending the information that was received and therefore the received information may be trusted. The MAC address comparison may not be fully reliable as the MAC address could be spoofed on I/F 3 or I/F 4. The IP address comparison may be reliable unless the MD 12 does not use the ALN 14 to access the LBS AS 18 over I/F 4 or the LS 16 over I/F 3 (e.g., uses a different access network with an IP address different to that used for the ALN 14 access over I/F 2). The VID comparison may always be reliable because the venue (e.g., the LS 16) assigned the VID and transferred the VID to the MD 12 in a secure manner.

Having verified that the same MD is sending information over I/Fs 2, 3 and 4, the LS 16 may identify the MD 12 from any IMSI or MSISDN received. The LS 16 may also provide location services to the MD 12 or associated with the MD 12 as described before (e.g., for FIG. 8 and FIG. 11). Thus, for example, the LS 16 may send location assistance data to the MD 12, may compute and send a location of the MD 12 to the MD 12 and/or may send a location or series of locations for the MD 12 to the LBS AS 18. The LS 16 may further use NBP (e.g., measurements obtained for the MD 12 by the ALN 14) to locate the MD 12 and/or may use MBP (e.g., location measurements or a location estimate received from the MD 12 over I/F 3) to locate the MD 12. The LBS AS 18 may provide the location of the MD 12 (e.g., received from the LS 16) to the MD 12, may provide location-related content to the MD 12 (e.g., navigation data, maps, directions), may provide the location of MS 12 to authorized external clients and/or may use location information for the MD 12 to compile statistical data for the MD 12 or all users in indoor area 16.

Mobile Device Identification

A venue-assigned user ID or App ID sent over I/F 4 by an MD (e.g., by an application in the MD), as in the previous examples described in association with FIGS. 7-14, may be used (e.g., by an LBS AS such as the LBS AS 18) to identify either a particular application (e.g., the App 40) in a particular MD (e.g., the MD 12) or a particular user of an MD (e.g., the user of the MD 12). The user ID or App ID may be assigned when a user or an application (e.g., the App 40) first registers for service with the LBS AS 18 and establishes service and privacy preferences. This may be accomplished using authentication algorithms using known methods.

Mobile device identification on I/F 2 (e.g., identification of the MD 12 by the ALN 14) or on I/F 3 (e.g., identification of the MD 12 by the LS 16) may be performed using a MAC address, an IP address, or a VID that is sent by an MD (e.g., the MD 12) to an ALN (e.g., the ALN 14) or LS (e.g., the LS 16). The ALN 14 or the LS 16 may identify the sending MD (e.g., the MD 12) by associating the received address or VID with information for the MD obtained previously by the ALN 14 or the LS 16 (e.g., with a VID assigned by the LS 16 or the LBS AS 18 to the MD 12 or with a MAC address or IP address known to belong to the MD 12).

A location service may be withheld by the LS 16 in the absence of a request for such service and/or permission to provide the service. For example, the LS 16 may withhold location support for the MD 12 (e.g., if there is an MD-initiated location request over I/F 3 from the MD 12 to the LS 16) until a configuration request is received for the MD 12 from the LBS AS 18. As another example, if a service and security manager (SSM 24) is supported (as discussed below), then the LS 16 may query the SSM 24 regarding permission to support MD location requests and withhold location service information in the absence of permission.

Venue Assistance Data Protection

Venue assistance data (i.e., data to assist with mobile device location determination such as BSA data) may be protected in a variety of ways, e.g., to help prevent venue assistance data being passed accidentally or deliberately from an MD (e.g., the MD 12) that received the assistance data from an LS (e.g., the LS 16) to some unauthorized third party such as another venue or another location service provider not associated with the venue to which the data belongs. For example, sensitive venue assistance data may be provided only to an MD (e.g., to the MD 12 via I/F 2 or I/F 3) after an application (e.g., the App 40) that is trusted by the venue makes a service request to the LBS AS 18 that is authenticated by the LBS AS 18 and the LBS AS 18 then configures or provides the LS 16 with the MD ID (e.g., a MAC address or a VID for the MD 12). In this case, the LS 16 may use receipt of the configured/provided MD ID as a trigger to permit sensitive assistance data to be provided to the identified the MD 12. As another example, the PE 38 may send a PE provider ID (e.g., configured in the PE 38 by the provider for the PE 38) to the LS 16, e.g., using SUPL, that can be authenticated by the LS 16. If the PE provider ID is associated with a trusted PE provider (e.g., as indicated in a database stored in the memory 62 of the LS 16), then the LS 16 may provide sensitive assistance data to the PE 38. In this case, the PE 38 would be configured not to release the sensitive assistance data to applications or users and to discard the sensitive assistance data in response to the MD 12 leaving the venue (e.g., disconnecting from the ALN 14 or the LS 16) or after a threshold amount of time has elapsed. As another example, IDs of APs of the ALN 14 (e.g., MAC addresses in the case of WiFi APs) may be reassigned. The IDs, such as MAC addresses, may be reassigned intermittently (e.g., periodically, aperiodically, a combination of aperiodically and periodically, etc.). The reassignment of the IDs may help prevent reuse of previously-provided sensitive assistance data by an unauthorized third party since after the IDs are reassigned, any assistance data that referred to the previous IDs would no longer be valid. In addition, other data about venue APs in the ALN 14 that may have been provided by MDs to unauthorized third parties via crowdsourcing may also no longer be applicable once AP IDs have been reassigned.

In an implementation, reassigning AP IDs (e.g., MAC addresses of WiFi APs or cell identifiers for Femtocells) may be supported using elements in the system 10 described in association with FIG. 1 and FIG. 2. Referring to FIG. 2, to reduce overhead of AP ID reassignment in a venue, fixed internal AP IDs can be used in the ALN DB 22 and in signaling messages used on I/F 6 between the ALN DB 22 and the LS 16. The LS 16 may convert between internal AP IDs sent or received on I/F 6 and external AP IDs (e.g., MAC addresses) used for assistance data and measurement reports sent or received on I/F 1 and/or I/F 3. The reassignment of AP IDs may then not affect data and signaling from the perspective of ALN DB 22—e.g., may not affect AP BSA data stored in the ALN DB 22, transfer of assistance data (e.g., BSA data) from ALN DB 22 to the LS 16 or transfer of measurement data for APs obtained by MDs (e.g., the MD 12) and crowdsourced to the LS 16 and subsequently transferred from the LS 16 to ALN DB 22. The AP ID conversion in the LS 16 may use an AP ID mapping table (e.g., mapping a fixed internal ID for each AP to an external ID), and may not be a significant burden because the LS 16 may translate anyway between different protocols and data formats used on different interfaces for the LS 16 and may add AP ID mapping to this already existing protocol or data format translation. As one example, the LS 16 may translate between assistance data formats (e.g., for BSA data) received over I/F 6 from ALN DB 22 and assistance data formats relayed over I/F 1 to the ALN 14 or over I/F 3 to the MD 12. As a second example, crowd-sourced measurement data (e.g., for APs in the ALN 14 or APs in networks other than the ALN 14) may be received by the LS 16 according to one format over I/F 3 from MDs such as the MD 12 and may be converted to a different format by the LS 16 and then forwarded over I/F 6 to ALN DB 22. If the LS 16 keeps a record of which MDs have been sent assistance data containing external AP IDs, then the LS 16 may update these MDs with new external AP IDs if the external IDs have been reassigned by the LS 16. In some implementations, the ALN 14 may manage the AP ID reassignment, e.g., with a report sent to the LS 16 indicating reassigned AP IDs. Alternatively, the LS 16 may manage the AP ID reassignment. Alternatively still, the ALN DB 22 may manage the AP ID reassignment with the ALN DB 22 replacing old AP assistance data with new assistance data (containing reassigned AP IDs) sent to the LS 16 if AP IDs are reassigned. In this case, the LS 16 translation of AP addresses may be avoided. In any case, measurement reports from MDs that reference previous external AP IDs may be recognized and with the previous IDs replaced by the new IDs (e.g., by the LS 16 or by the ALN DB 22) provided that any new set of AP IDs is non-overlapping with the previous set of AP IDs.

Service Authorization and Privacy Support

The LBS AS 18 can support service authorization and privacy on behalf of MD users (e.g., the user of the MD 12). Allowed services and privacy can be negotiated between a user and the LBS AS 18 when the user registers for service (e.g., when the App 40 registers for service with the LBS AS 18 over I/F 4 after a user of the MD 12 invokes the App 40 for the first time) and/or when the user requests service via the App 40 after entering a venue (e.g., when the user enters the coverage area of the ALN 14). The LS 16 can then fulfill (e.g., respond to) any location requests from the LBS AS 18 for the MD 12 and may assume that the LBS AS 18 will safeguard user privacy. The LBS AS 18 can also configure access restrictions for the MD 12 directly in the ALN 14, such as whether the MD 12 is allowed Internet access, which venue intranet entities the MD 12 is allowed to access, etc. Other capabilities of the LBS AS 18 are possible, such as recording of and billing for the ALN 14 usage by the MD 12 and location services provided to the MD 12 by the LS 16 and the LBS AS 18.

Providing Location-Based Services

Figure 15:
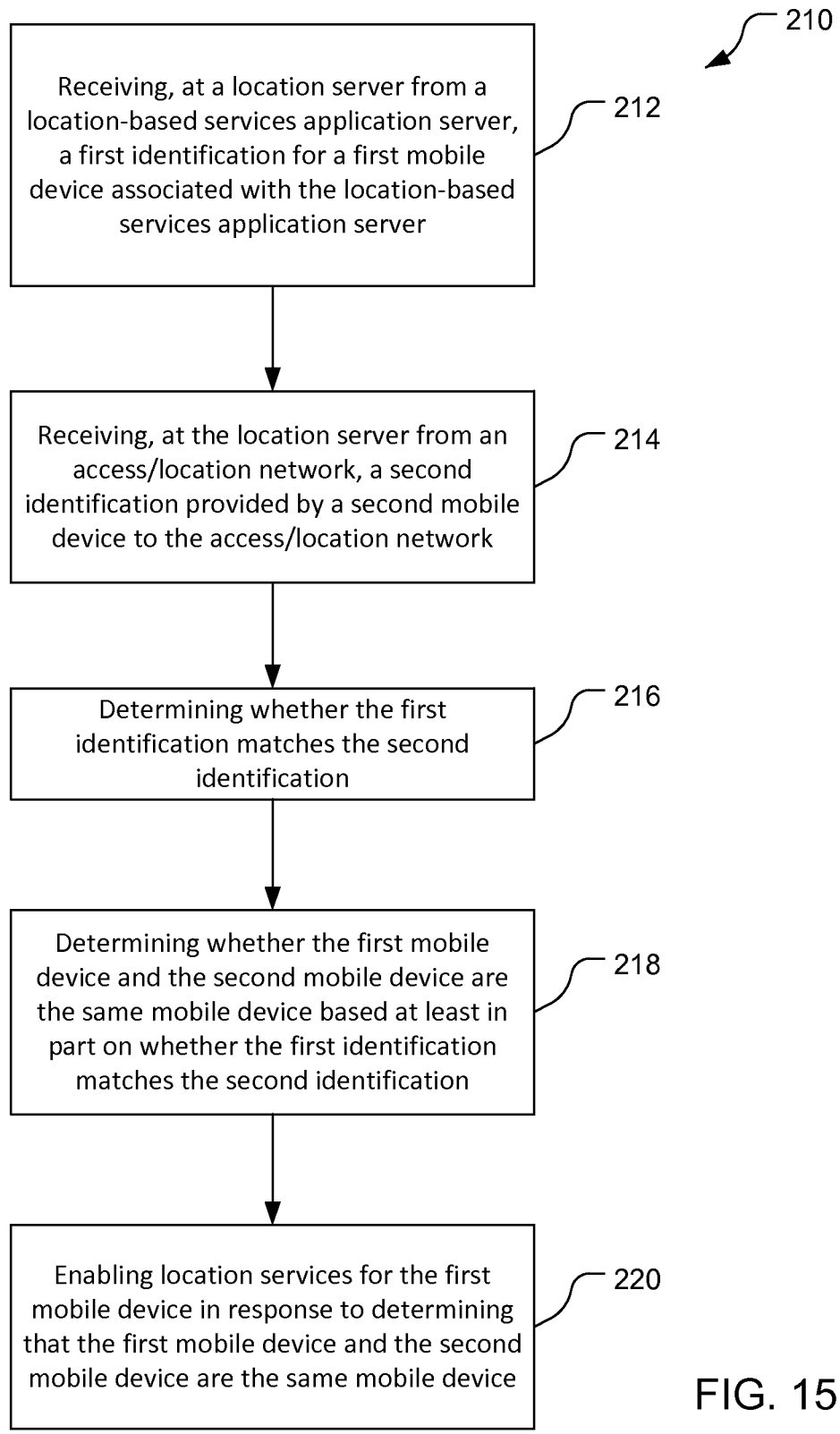
FIGS. 15-16 are block flow diagrams of processes of providing location-based services.

Referring to FIG. 15, with further reference to FIGS. 1-14, a process 210 of providing location-based services includes the stages shown. The process 210 is, however, an example only and not limiting. The process 210 can be altered, e.g., by having stages added, removed, rearranged, combined, performed concurrently, and/or having single stages split into multiple stages. For example, stage 312 discussed below with respect to FIG. 16 could be added to the process 210. Further, stages 320, 322 discussed below with respect to FIG. 16 could be added to the process 210.

The process 210 has a common mobile device identifier (MD ID) provided by the MD 12, via the interfaces I/F 2 and I/F 4, to the LS 16. The common MD ID associates other MD identifiers that may also be provided that facilitates verification that the same MD is being used on interface I/F 2 and interface I/F 4 (and interface I/F 3, if used). The common MD ID should not be able to be spoofed, e.g., because the MD ID is confidential and is difficult to be intercepted, and possibly not interceptable, by other entities and/or the MD ID is owned by a venue and unlikely to be, and possibly not capable of being, copied. Thus, common information associated with the MD 12 is provided through different interfaces to the LS 16, and the LS 16 determines whether the information is indicative of a single source, e.g., the common information matches. The LS 16 responds to verifying that the information is indicative of a single source by providing, and/or approving the LBS AS to provide, location service information, e.g., a location of the MD 12 or location-assistance information that can be used, e.g., by the MD 12, to determine the location of the MD 12.

At stage 212, the process 210 includes receiving, at a location server from a location-based services application server, a first identification for a first mobile device associated with the location-based services application server. For example, the LS 16 receives, as provided by the LBS AS 18, the IP address and the MAC address of the MD 12 as discussed above with respect to FIGS. 7-14 (with the MAC address being optional in FIGS. 7-8 and 12-14, and the IP address being optional in FIGS. 9-10), and the VID as discussed with respect to FIGS. 12-14.

At stage 214, the process 210 includes receiving, at the location server from an access/location network, a second identification provided by a second mobile device to the access/location network. For example, the LS 16 receives, from the ALN 14, the IP address and the MAC address of the MD 12 as discussed above with respect to FIGS. 7-14, and the VID as discussed with respect to FIGS. 12-14.

At stage 216, the process 210 includes determining whether the first identification matches the second identification. For example, the LS 16, in particular the comparison module 86, makes a comparison of the information received from the LBS AS 18 and the ALN 14, and possibly information resident at the LS 16 (e.g., a VID produced or selected by the venue identifier module 90). Based on this comparison, the comparison module 86 determines whether the first identification and the second identification (e.g., the respective IP addresses, MAC addresses, and/or VIDs) match.

At stage 218, the process 210 includes determining whether the first mobile device and the second mobile device are the same mobile device based at least in part on whether the first identification matches the second identification. For example, the LS 16, in particular the determination module 87, makes a determination as to whether the MD 12 was the source of the information received from both the LBS AS 18 and the ALN 14. This determination may include the determination that the first identification and the second identification match. This may constitute the entirety of the determination, or the determination may be based on other information as well, such as (i) when the first identification and the second identification were received and/or (ii) authentication of MD 12 by the ALN 14 and/or LBS AS 18 with authentication results being conveyed to the LS 16.

At stage 220, the process 210 includes enabling location services for the first mobile device in response to determining that the first mobile device and the second mobile device are the same mobile device. For example, the LS 16, in particular the location service information module 88, in response to the first and second mobile devices being one and the same, may be enabled to send and may send a location of the MD 12 to the LBS AS 18 for provision to the MD 12 or for use in determining and providing another location-based service to the MD 12. Also or alternatively, the LS 16 may be enabled to and may provide or instruct the LBS AS 18 to provide location-assistance information that the MD 12 can use to determine the location of the MD 12.

Figure 16:
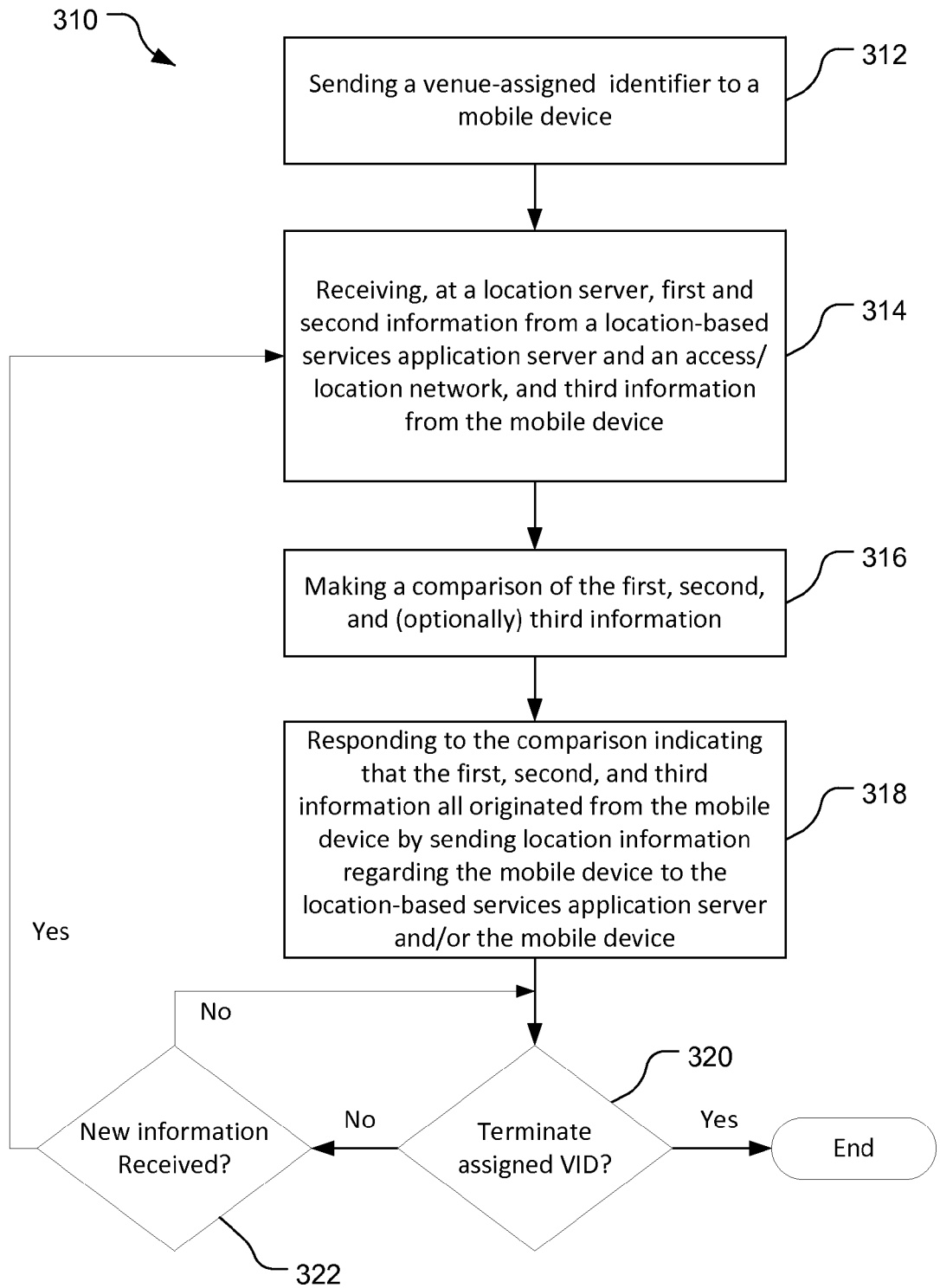

Referring to FIG. 16, with further reference to FIGS. 1-15, a process 310 of providing location-based services includes the stages shown. The process 310 is, however, an example only and not limiting. The process 310 can be altered, e.g., by having stages added, removed, rearranged, combined, performed concurrently, and/or having single stages split into multiple stages. For example, stages 312, 320, 322 are optional.

At stage 312, the process 310 includes sending a venue-assigned identifier to a mobile device. For example, the LBS AS 18 (i.e., the venue identifier module 116) or the LS 16 (i.e., the venue identifier module 90) may produce or select and send the VID to the MD 12. The VID may be a MAC address or a non-MAC address identifier.

At stage 314, the process 310 includes receiving, at a location server, first and second information from a location-based services application server and an access/location network, and third information from the mobile device. For example, this stage is similar to stages 212, 214 discussed above except that, optionally, third information may be received by the location server from the mobile device. For example, the MD 12 may send an IMSI, an IP address, a MAC address, or the VID (preferably only if the VID is sent by the LBS AS 18 to the MD 12), or combinations of these pieces of information.

At stage 316, the process 210 includes making a comparison of the first information and the second information. This stage is similar to stage 216 discussed above, except that information from three sources external to the LS 16 are compared.

At stage 318, the process 210 includes responding to the comparison indicating that the first, second, and third information all originated from the mobile device by sending location information regarding the mobile device to the location-based services application server and/or the mobile device. For example, this stage is similar to stage 218 discussed above with respect to the process 210 except that the location information may be provided by the LS 16 to the LBS AS 18 and/or the MD 12.

At stage 320, the process 310 includes determining whether to terminate the assigned VID. For example, if the MD 12 ceases communication with the ALN 14, the LS 16, or the LBS AS 18, e.g., by being turned off, leaving a range of the ALN 14, the LS 16, or the LBS AS 18, or otherwise being disconnected from the ALN 14, the LS 16, or the LBS AS 18, then the process 310 terminates. Also or alternatively, the assigned VID may have a temporal limit such that if a temporal threshold is exceeded (e.g., a timer expires), then the process 310 terminates. If the process 310 terminates, then a VID will be assigned if the process 310 begins again, e.g., if the MD 12 re-enters the venue or re-establishes communication with the ALN 14, the LS 16, or the LBS 18. If the assigned VID is not to be terminated, then the process 310 proceeds to stage 322.

At stage 322, the process 310 includes determining whether new first, second, or third information is received. If so, then the process 310 returns to stage 314, and otherwise returns to stage 320.

Figure 17:
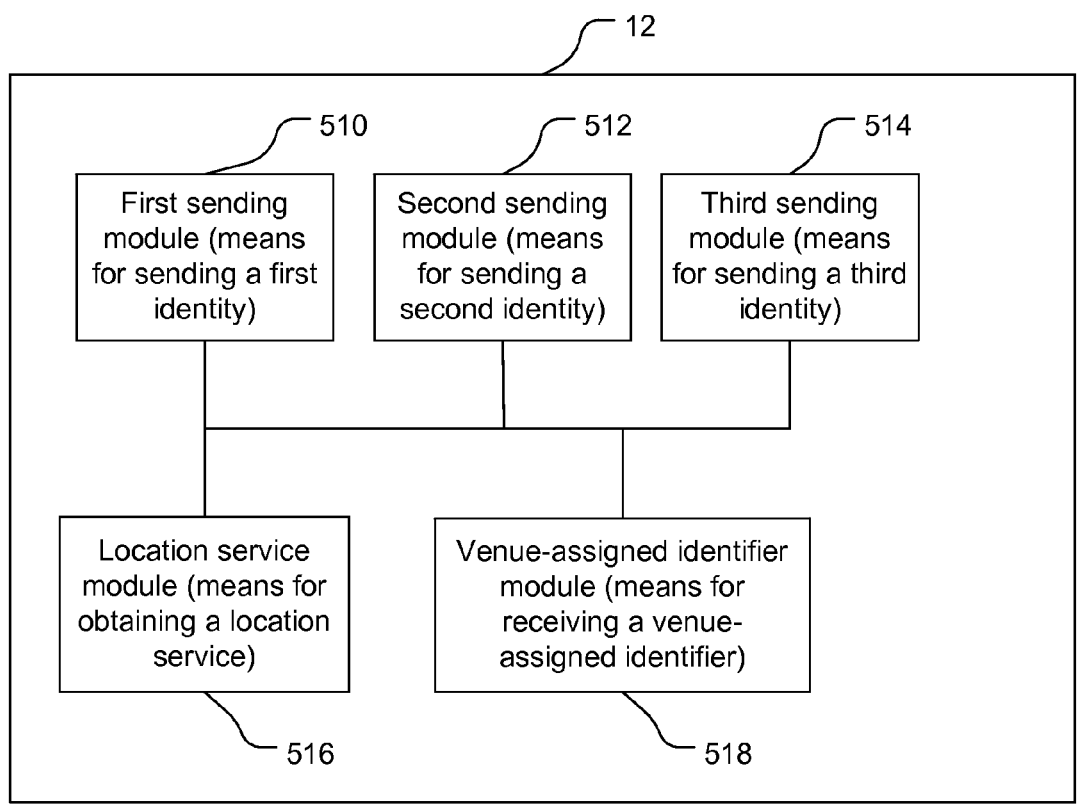
FIG. 17 is a functional block diagram of the mobile device shown in FIG. 1.

Referring now to FIG. 17, with further reference to FIGS. 1-3, the MD 12 may include a first sending module (means for sending a first identity) 510, a second sending module (means for sending a second identity) 512, a third sending module (means for sending a third identity) 514, a location service module (means for obtaining a location service) 516, and a venue-assigned identifier module (means for receiving a venue-assigned identifier) 518. The modules 510, 512, 514, 516, 518 are communicatively coupled to each other and may be functional modules implemented by the processor 30, the software 34 stored in the memory 32, the modem 36, the PE 38, the App 40, and/or one or more of the transceivers 42, 44, 46, as appropriate. Thus, reference to any of the modules 510, 512, 514, 516, or 518 performing or being configured to perform a function may be shorthand for the processor 30 performing or being configured to perform the function in accordance with the software 34 and/or hardware of the processor 30, the modem 36, the PE 38, the App 40, and/or one or more of the transceivers 42, 44, 46 performing or being configured to perform the function. Similarly, reference to the processor 30 performing a receiving, sending, or obtaining function may be equivalent to the first sending module 510, the second sending module 512, the third sending module 514, the location service module 516, and/or the venue-assigned identifier module 518, respectively, performing the function.

The first, second, and third sending modules 510, 512, 514 are configured to obtain (possibly produce) and send first, second, and third identities for the MD 12 toward the LBS AS 18, the ALN 14, and the LS 16, respectively. The first, second, and third identities may include a common identity for the mobile device 12. The common identity may be, e.g., a MAC address, an IP address and/or a VID, and may be obtained from the memory 32 or from a device other than the MD 12, e.g., from the LBS AS 18 via the venue-assigned identifier module 518. The venue-assigned identifier module 518 may be configured to receive a VID from the LS 16, the ALN 14 or the LBS AS 18 and the first, second and/or third sending modules 510, 512 and/or 514, respectively, may be configured to include the VID in the first, second and/or third identity, respectively.

The location service module 516 may be configured to obtain a location service from the ALN 14, the LS 16 and/or the LBS AS 18. Obtaining the location service may be receiving location assistance data from the ALN 14, the LS 16 and/or the LBS AS 18, or receiving a location estimate for the MD 12 from the ALN 14, the LS 16 and/or the LBS AS 18.

Figure 18:
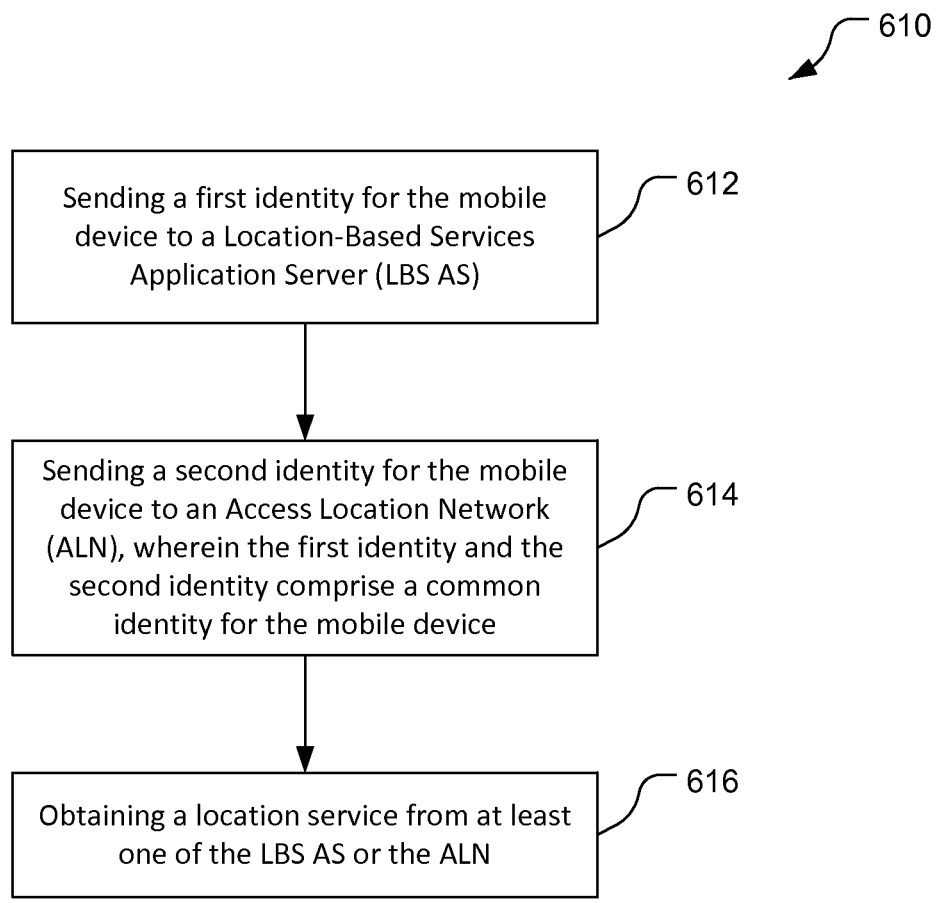
FIG. 18 is a block flow diagram of a process of obtaining location-based services at the mobile device shown in FIG. 17.

Referring to FIG. 18, with further reference to FIGS. 1-17, a process 610 of obtaining location-based services at a mobile device (e.g. MD 12) includes the stages shown. The process 610 is, however, an example only and not limiting. The process 610 can be altered, e.g., by having stages added, removed, rearranged, combined, performed concurrently, and/or having single stages split into multiple stages.

At stage 612, the process 610 includes sending a first identity for the mobile device to a Location-Based Services Application Server (LBS AS). For example, the first sending module 510 of the MD 12 sends an identity to the LBS AS 18. The first identity may be a MAC address, an IP address, a venue-assigned identifier (VID), etc.

At stage 614, the process 610 includes sending a second identity for the mobile device to an Access/location Network (ALN), wherein the first identity and the second identity comprise a common identity for the mobile device. For example, the second sending module 512 of the MD 12 sends an identity to the ALN 14. The second identity may be a MAC address, an IP address, a venue-assigned identifier (VID), etc. The first and second identities include a common (preferably identical) portion.

At stage 616, the process 610 includes obtaining a location service from at least one of the LBS AS or the ALN. For example, the location service module 516 receives location assistance data from the LBS AS 18 and/or the ALN 14, and/or the location service module 516 receives a location estimate for the MD 12 from the LBS AS 18 and/or the ALN 14.

The process 610 may further include sending a third identity for the mobile device to a location server, wherein the third identity includes the common identity for the mobile device. For example, the third sending module 514 can obtain and send the third identity to the LS 16. As with the first and second identities, the third entity may be a MAC address, an IP address, a VID or other information used as an identity. The process 610 may further include obtaining a location service from the location server, such as the location service module 516 receiving location assistance data and/or a location estimate for the MD 12 from the LS 16. The LS 16 may be a SUPL SLP and receiving the location assistance data and/or the location estimate for the MD 12 from the LS 16 may comprise using a SUPL session between the LS 16 and the MD 12.

The first, second, and/or third identity may be obtained from the memory 32, obtained from an entity external to the MD 12, produced by the MD 12, etc. For example, the process 610 may further include receiving a VID from the LBS AS or from a location server, wherein the VID is temporarily unique to the mobile device, and wherein the first identity, the second identity and/or the third identity include the VID. For example, the venue-assigned identifier module 518 may receive the VID from the LS 16. The VID may be, e.g., a MAC address.

Use of the Service and Security Manager

Figure 19:
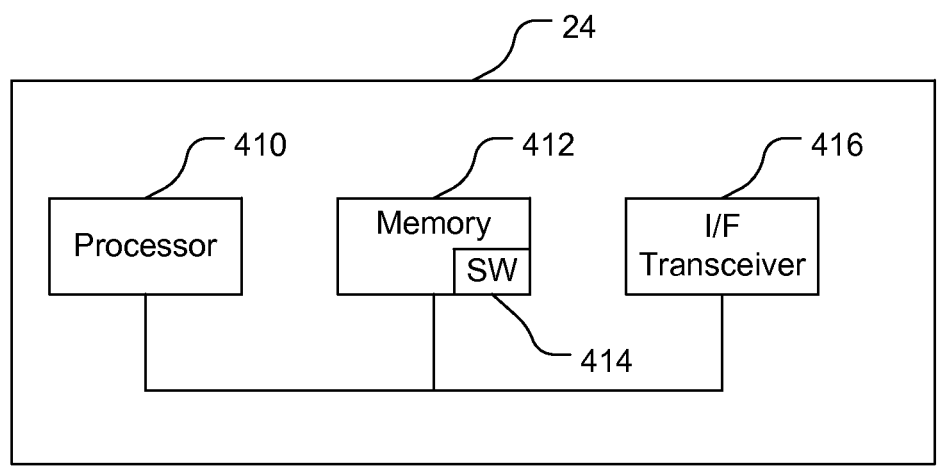
FIG. 19 is a block diagram of a service and security manager shown in FIG. 1.

Referring again to FIGS. 1-2, and to FIG. 19, the SSM 24 includes a computer system including a processor 410, memory 412 including software 414, and an I/F transceiver 416. The processor 410 is preferably an intelligent hardware device, e.g., a central processing unit (CPU) such as those made by ARM®, Intel® Corporation, or AMD®, a microcontroller, an application specific integrated circuit (ASIC), etc. The processor 410 could comprise multiple separate physical entities that can be distributed in the SSM 24. The memory 412 includes random access memory (RAM) and read-only memory (ROM). The memory 412 is a non-transitory processor-readable storage medium that stores the software 414 which is processor-readable, processor-executable software code containing processor-readable instructions that are configured to, when executed, cause the processor 410 to perform various functions described herein (although the description, including the claims, may refer only to the processor 410 performing or being configured to perform one or more of the functions). Alternatively, the software 414 may not be directly executable by the processor 410 but configured to cause the processor 410, e.g., when compiled and executed, to perform the functions. The SSM 24 is configured to communicate bi-directionally with the LS 16, the LBS AS 18 and/or the ALN 14. The I/F transceiver 416 may be one or more physical entities, e.g., one for each interface for communicating with the ALN 14, the LS 16, and the LBS AS 18, a single transceiver, or multiple transceivers with one or more shared components. The SSM 24 could be a logical entity in one of the ALN 14, the LS 16, or the LBS AS 18. Alternatively, the SSM 24 could be distributed in more than one of the ALN 14, the LS 16, and the LBS AS 18. If the SSM 24 is external to the ALN 14, the LS 16, and the LBS AS 18, as shown, three interfaces provide the communication between the SSM 24 and the ALN 14, the LS 16, and the LBS AS 18.

The SSM 24 has multiple potential roles. The SSM 24 can be a focal point for authorizing location and connectivity service to an MD, such as the MD 12, from the ALN 14, the LS 16, and the LBS AS 18. Thus, one or more requests for providing one or more corresponding location services may be sent to the SSM 24 and the SSM 24 may respond to each of the requests by authorizing or denying the requested location service (e.g., by sending an authorization indication or a denial indication to the requesting entity). The SSM 24 can enable a venue owner or service provider to support or make use of multiple ALNs, LSs, and/or LBS ASs. The SSM 24 can coordinate and share information across the multiple ALNs, LSs, and/or LBS ASs. Multiple LBS ASs may be used, for example, when there are multiple application providers with different LBS ASs. For example, each application provider may provide one or more Apps for an MD, such as the MD 12, and may also provide an LBS AS to support service requests from these Apps over I/F 4. In that case, each App (e.g., the App 40) may interact only with the LBS AS 18 for the provider of the App and not with an LBS AS for some other App provider. Multiple LSs could be used, for example, when there are several location providers. Multiple ALNs could be used, for example, with multiple venues or when a single venue uses different types of APs (e.g., WiFi APs and Bluetooth® APs).

Communications in the system 10 including the SSM 24 may include various requests and responses. For example, the ALN 14 can send an access control request to the SSM 24, e.g., requesting to provide communication services (e.g., access to the Internet or access to other entities in the system 10) to a mobile device (e.g., the MD 12) that has initiated communication with the ALN 14. The SSM 24 can respond to the ALN 14 with an access control response that either grants or denies permission for the ALN 14 to provide communication services to that mobile device. The MD 12 (or an App on the MD 12 such as the App 40) may send information to the LBS AS 18 enabling an authentication by the LBS AS 18 of the user of the MD 12 or an App (e.g., the App 40) on the MD 12 and may include in this information the App ID or user ID to be authenticated. Similarly, the LBS AS 18 may send information to the MD 12 (or to an App such as the App 40 on the MD 12) enabling the MD 12 (or the App) to authenticate the LBS AS 18. The authentication communications between the MD 12 (or the App) and the LBS AS 18 will either authenticate the MD 12 and/or the LBS AS 18 or not, with the latter case resulting in location services being denied by the LBS AS 18 to the MD 12 and/or not requested from the LBS AS 18 by the MD 12. The MD 12 may also, or alternatively, send one or more MD IDs to the LBS AS 18—e.g., a MAC address, IP address and/or VID. The LBS AS 18 may send a service authorization request to the SSM 24 to obtain authorization for providing location services for the MD 12 and may include in the service authorization request one or more IDs for the MD 12 such as a MAC address, user ID or App ID. In response to the service authorization request, the SSM 24 may send a service authorization response to the LBS AS 18 either granting or denying permission for the LBS AS 18 to provide location services to the MD 12 and possibly indicating which location services may be provided. The SSM 24 can record (e.g., in the memory 412) which mobile devices and/or applications are registered for service, e.g., in each LBS AS 18 and/or in which venue. The MD 12 may send MD authentication information and/or one or more MD IDs (e.g., an IMSI, IP address, MAC address, VID) to the LS 16 to enable the LS 16 to identify the MD 12 (e.g., determine whether the MD 12 is being used on each of I/Fs 2, 3 and 4 as described earlier herein) and/or to enable the LS 16 to authenticate the MD 12. The LS 16 may similarly send LS authentication information to the MD 12 to enable the MD 12 to authenticate the LS 16. The LS 16 may also send a location authorization request to the SSM to obtain authorization to provide location services for the MD 12, e.g., directly to the MD 12 or to the LBS AS 18. The LS 16 may include in the location authorization request one or more IDs for the MD 12 such as a MAC address, IMSI or MSISDN. The SSM 24 may respond to the location authorization request by sending a location authorization response to the LS 16 either granting or denying permission for the LS 16 to provide location services for the MD 12 and possibly indicating which location services may be provided. The LS 16 may send an MD search request to the ALN 14 instructing or requesting the ALN 14 to search for the particular the MD 12 (e.g., by detecting signals transmitted by the MD 12 containing an ID for the MD 12 such as a particular MAC address or IP address), e.g., with the MD search request including a MAC address and/or IP address of the MD 12. The ALN 14 may respond to this request by searching for the MD 12 and sending an MD detection response to the LS 16 indicating whether the ALN 14 has detected the MD 12 (e.g., has detected signals transmitted by the MD 12 containing a MAC address or IP address provided in the request from the LS 16). The ALN 14 and the MD 12 may exchange one or more IDs (e.g., MAC addresses) as part of the ALN 14 detecting the MD 12 and/or the MD 12 obtaining communication services from the ALN 14. The LBS AS 18 may send a location request to the LS 16 over I/F 5 to obtain four or more locations for the MD 12 and may include in the request one or more IDs for the MD 12 (e.g., an IP address, MAC address, and/or VID). The LS 16 may then verify that the same MD, e.g., the MD 12, is being used over I/Fs 4, 2 and possibly 3 as described previously herein and may then obtain one or more locations for the MD 12 via interaction with the MD 12 over I/F 3 (e.g., using SUPL) and/or by requesting a location or location measurements for the MD 12 from the ALN 14 over I/F 1. The LS 16 may then return one or more locations for the MD 12 to the LBS AS 18 over I/F 5.

The SSM 24 may also support other functions associated with providing location services to or associated with the MD 12 and/or associated with providing location services in a secure manner from the LS 16 and/or the LBS AS 18. For example, the SSM 24 may support (i) security wherein an identity for the MD 12 or the App 40 is verified, (ii) service authorization wherein communication services from the ALN 14 and/or location services from the LS 16 and/or the LBS AS 18 are authorized by the SSM 24, and/or (iii) privacy wherein the location of the MD 12 is not disclosed to unauthorized clients. The SSM 24 may also associate and verify different MD identities used on different I/Fs—e.g., as described earlier in association with FIGS. 7-14 wherein the comparison of different MD IDs received over I/Fs 2, 4 and possibly 3 is verified by the SSM 24 rather than by the LS 16. The SSM 24 may authorize interconnect services to the MD 12 from the ALN 14, location services to the MD 12 from the LS 16 and location content services to the MD 12 from the LBS AS 18. The SSM 24 may maintain user (e.g., subscription) records and may maintain the services that are authorized to the MD 12 (or the App 40) and the privacy requirements for the MD 12 (or the App 40). The SSM 24 may further maintain service usage records for the MD 12 or the App 40 (e.g., for billing of the user of the MD 12 and/or to collect statistics on certain or all users). The SSM 24 may act as a gateway to some external clients—e.g., may interface to Public Safety Answering Points (PSAPs) or to clients that perform lawful interception. The SSM 24 may authorize different location services for an MD (e.g., from the LS 16 and/or from the LBS AS 18) including specific types of assistance data that can be sent to the MD 12 from the LS 16 and/or specific types of location content (e.g., building maps, directions, venue information) that can be sent to the MD 12 by the LBS AS 18.

While many of the previous examples are based on an ALN 14 that comprises one or more WiFi APs, the methods exemplified by these examples may be applicable to an ALN 14 comprising other types of AP—for example, an ALN 14 comprising one or more Bluetooth APs, one or more femtocells, one or more small cells and/or a combination of one or more different types of AP. For the examples in which a WiFi MAC address is provided to the MD 12 as a VID and/or sent by the MD 12 to the ALN 14, the LS 16 and/or the LBS AS 18 to identify the MD 12 and wherein the ALN 14 comprises APs different from WiFi APs, the WiFi MAC address in these examples may be replaced by a different address or different identity for the MD 12. The different address or different identity may be associated with communication between the MD 12 and those APs in the ALN 14 that are not WiFi APs and/or may be an address or identity used by a communication protocol on I/F 2 between the MD 12 and one or more APs in the ALN 14 that are not WiFi APs. The different address or different identity may be a TCP/IP address, a UDP/IP address, a Bluetooth address, a provider address, a device address (e.g. an International Mobile Equipment Identity (IMEI)), a public user address, or some other address or identity.

Other Considerations

As used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C), or combinations with more than one feature (e.g., AA, AAB, ABBC, etc.).

As used herein, including in the claims, unless otherwise stated, a statement that a function or operation is "based on" an item or condition means that the function or operation is based on the stated item or condition and may be based on one or more items and/or conditions in addition to the stated item or condition.

A wireless communication network does not have all communications transmitted wirelessly, but is configured to have at least some communications transmitted wirelessly.

Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Further, more than one invention may be disclosed.

A wireless communication network does not have all communications transmitted wirelessly, but is configured to have at least some communications transmitted wirelessly.

Substantial variations to described configurations may be made in accordance with specific requirements. For example, customized hardware might also be used, and/or particular elements might be implemented in hardware, software (including portable software, such as applets, etc.), or both. Further, connection to other computing devices such as network input/output devices may be employed.

Common forms of physical and/or tangible computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, EPROM, a FLASH-EPROM, any other memory chip or cartridge, a carrier wave as described hereinafter, or any other medium from which a computer can read instructions and/or code.

The methods, systems, and devices discussed above are examples. Various configurations may omit, substitute, or add various procedures or components as appropriate. For instance, in alternative configurations, the methods may be performed in an order different from that described, and that various steps may be added, omitted, or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations provides a description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional stages or functions not included in the figure. Furthermore, examples of the methods may be implemented by hardware, software, firmware, middleware, microcode, hardware description languages, or any combination thereof. When implemented in software, firmware, middleware, or microcode, the program code or code segments to perform the tasks may be stored in a non-transitory computer-readable medium such as a storage medium. Processors may perform the described tasks.

Components, functional or otherwise, shown in the figures and/or discussed herein as being connected or communicating with each other are communicatively coupled. That is, they may be directly or indirectly connected to enable communication between them.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of operations may be undertaken before, during, or after the above elements are considered. Accordingly, the above description does not bound the scope of the claims.

A statement that a value exceeds (or is more than) a first threshold value is equivalent to a statement that the value meets or exceeds a second threshold value that is slightly greater than the first threshold value, e.g., the second threshold value being one value higher than the first threshold value in the resolution of a computing system. A statement that a value is less than (or within) a first threshold value is equivalent to a statement that the value is less than or equal to a second threshold value that is slightly lower than the first threshold value, e.g., the second threshold value being one value lower than the first threshold value in the resolution of a computing system.

The following are examples of methods and processor-readable storage media in accordance with respective portions of the description above.

1. A method of providing location-based services, the method comprising:
receiving, at a location server from a location-based services application server, a first identification for a first mobile device associated with the location-based services application server;
receiving, at the location server from an access/location network, a second identification for a second mobile device associated with the access/location network;
determining whether the first identification matches the second identification;
determining whether the first mobile device and the second mobile device are the same mobile device based at least in part on whether the first identification matches the second identification; and
enabling location services for the first mobile device in response to determining that the first mobile device and the second mobile device are the same mobile device.

2. The method of example 1 wherein the enabling location services comprises at least one of providing location assistance data to the first mobile device, providing a location estimate to the first mobile device, or providing a location estimate for the first mobile device to the location-based services application server.

3. The method of example 2 wherein the location estimate for the first mobile device is obtained using at least one of measurements for the first mobile device provided by the access/location network, a location estimate for the first mobile device provided by the first mobile device, or location measurements provided by the first mobile device.

4. The method of example 3 wherein the location server is a Secure User Plane Location (SUPL) Location Platform (SLP) and the location estimate for the first mobile device provided by the first mobile device or the location measurements provided by the first mobile device are obtained using a SUPL session between the location server and the first mobile device.

5. The method of example 1 wherein the first identification includes a first internet protocol address and the second identification includes a second internet protocol address, or the first identification includes a first Media Access Control (MAC) address and the second identification includes a second MAC address.

6. The method of example 1 further comprising sending a first venue-assigned identifier (VID) to the first mobile device from the location-based services application server, wherein the first VID is temporarily unique to the first mobile device, and wherein the first identification includes the first VID and the second identification includes a second VID.

7. The method of example 6 wherein the first VID comprises a first Media Access Control (MAC) address and the second VID comprises a second MAC address.

8. The method of example 1 further comprising:
receiving, at the location server from a third mobile device, a third identification for the third mobile device;
determining whether the third identification matches the first identification and the second identification; and
determining whether the first mobile device, the second mobile device, and the third mobile device are the same mobile device based at least in part on determining whether the third identification matches the first identification and the second identification;

wherein the enabling location services for the first mobile device is in response to determining that the first mobile device, the second mobile device, and the third mobile device are the same mobile device.

9. The method of example 8 wherein the first identification includes a first internet protocol address, the second identification includes a second internet protocol address and the third identification includes a third internet protocol address.

10. The method of example 8 wherein the first identification includes a first Media Access Control (MAC) address, the second identification includes a second MAC address and the third identification includes a third MAC address.

11. The method of example 8 further comprising sending a venue-assigned identifier (VID) to either the first mobile device from the location-based services application server or to the third mobile device from the location server, wherein the VID is temporarily unique to the mobile device to which it is sent.

12. The method of example 11, wherein determining whether the third identification matches the first identification and the second identification comprises determining that the first identification, the second identification and the third identification each comprise the VID.

13. The method of example 11 wherein the VID comprises a Media Access Control (MAC) address.

14. The method of example 1 wherein the access/location network comprises at least one of an IEEE 802.11 WiFi access point (AP), a Bluetooth AP, or a Femtocell.

15. The method of example 1 wherein enabling location services for the first mobile device comprises enabling location services for the first mobile device from the location-based services application server.

16. The method of example 1 further comprising withholding location services for the first mobile device from the location server in response to failing to determine that the first mobile device and the second mobile device are same mobile device.

17. A processor-readable storage medium comprising processor-readable instructions configured to cause a processor to:

receive, from a location-based services application server, a first identification for a first mobile device associated with the location-based services application server;

receive, from an access/location network, a second identification for a second mobile device associated with the access/location network;

determine whether the first identification matches the second identification;

determine whether the first mobile device and the second mobile device are the same mobile device based at least in part on whether the first identification matches the second identification; and enable location services for the first mobile device in response to determining that the first mobile device and the second mobile device are the same mobile device.

18. The processor-readable storage medium of example 17 wherein the instructions configured to cause the processor to enable location services comprise instructions configured to cause the processor to at least one of provide location assistance data to the first mobile device, provide a location estimate to the first mobile device, or provide a location estimate for the first mobile device to the location-based services application server.

19. The processor-readable storage medium of example 18 further comprising instructions configured to cause the processor to obtain the location estimate for the first mobile device using at least one of measurements for the first mobile device provided by the access/location network, a location estimate for the first mobile device provided by the first mobile device, or location measurements provided by the first mobile device.

20. The processor-readable storage medium of example 19 wherein the instructions include instructions configured to cause the processor to obtain the location estimate for the first mobile device provided by the first mobile device or the location measurements provided by the first mobile device are obtained using a Secure User Plane Location session with the first mobile device.

21. The processor-readable storage medium of example 17 wherein the first identification includes a first internet protocol address and the second identification includes a second internet protocol address, or the first identification includes a first Media Access Control (MAC) address and the second identification includes a second MAC address.

22. The processor-readable storage medium of example 17 further comprising instructions configured to cause the processor to:

receive, from a third mobile device, a third identification for the third mobile device;

determine whether the third identification matches the first identification and the second identification; and determine whether the first mobile device, the second mobile device, and the third mobile device are the same mobile device based at least in part on determining whether the third identification matches the first identification and the second identification;

wherein the instructions configured to cause the processor to enable location services for the first mobile device are configured to cause the processor to do so in response to determining that the first mobile device, the second mobile device, and the third mobile device are the same mobile device.

23. The processor-readable storage medium of example 22 wherein the first identification includes a first internet protocol address, the second identification includes a second internet protocol address and the third identification includes a third internet protocol address.

24. The processor-readable storage medium of example 22 wherein the first identification includes a first Media Access Control (MAC) address, the second identification includes a second MAC address and the third identification includes a third MAC address.

25. The processor-readable storage medium of example 22 further comprising instructions configured to cause the processor to send a venue-assigned identifier (VID) to the third mobile device, wherein the VID is temporarily unique to the mobile device to which it is sent.

26. The processor-readable storage medium of example 25, wherein the instructions configured to cause the processor to determine whether the third identification matches the first identification and the second identification comprise instructions configured to cause the processor to determine that the first identification, the second identification and the third identification each comprise the VID.

27. The processor-readable storage medium of example 25 wherein the VID comprises a Media Access Control (MAC) address.

28. The processor-readable storage medium of example 17 wherein the access/location network comprises at least one of an IEEE 802.11 WiFi access point (AP), a Bluetooth AP, or a Femtocell.

29. The processor-readable storage medium of example 17 further comprising instructions configured to cause the processor to withhold location services for the first mobile device from the location server in response to failing to determine that the first mobile device and the second mobile device are same mobile device.

30. A method of obtaining location-based services at a mobile device, the method comprising:

sending a first identity for the mobile device to a Location-Based Services Application Server (LBS AS);

sending a second identity for the mobile device to an Access/location Network (ALN), wherein the first identity and the second identity comprise a common identity for the mobile device; and obtaining a location service from at least one of the LBS AS or the ALN.

31. The method of example 30, wherein the common identity for the mobile device comprises an Internet Protocol (IP) address or a Media Access Control (MAC) address.

32. The method of example 30 wherein the obtaining location services from the LBS AS or the ALN comprises at least one of receiving location assistance data from the LBS AS or the ALN, or receiving a location estimate for the mobile device from the LBS AS or the ALN.

33. The method of example 30, further comprising receiving a venue-assigned identifier (VID) from the LBS AS, wherein the VID is temporarily unique to the mobile device, and wherein the second identity includes the VID.

34. The method of example 33 wherein the VID comprises a Media Access Control (MAC) address.

35. The method of example 30 further comprising:

sending a third identity for the mobile device to a location server, wherein the third identity comprises the common identity for the mobile device.

36. The method of example 35 further comprising:

obtaining location services from the location server.

37. The method of example 36, wherein the obtaining location services from the location server comprises at least one of receiving location assistance data from the location server, or receiving a location estimate for the mobile device from the location server.

38. The method of example 37 wherein the location server is a Secure User Plane Location (SUPL) Location Platform (SLP) and wherein receiving location assistance data from the location server or receiving a location estimate for the mobile device from the location server, comprises using a SUPL session between the location server and the mobile device.

39. The method of example 35, further comprising receiving a venue-assigned identifier (VID) from the location server, wherein the VID is temporarily unique to the mobile device, and wherein the first identity and the second identity includes the VID.

40. The method of example 39 wherein the VID comprises a Media Access Control (MAC) address.

41. The method of example 30 wherein the ALN comprises at least one of an IEEE 802.11 WiFi access point (AP), a Bluetooth AP, or a Femtocell.

42. A processor-readable storage medium comprising processor-readable instructions configured to cause a processor to:

send a first identity for a mobile device to a Location-Based Services Application Server (LBS AS);

send a second identity for the mobile device to an Access/location Network (ALN), wherein the first identity and the second identity comprise a common identity for the mobile device; and obtain a location service from at least one of the LBS AS or the ALN.

43. The processor-readable storage medium of example 42, wherein the common identity for the mobile device comprises an Internet Protocol (IP) address or a Media Access Control (MAC) address.

44. The processor-readable storage medium of example 42 wherein the instructions configured to cause the processor to obtain location services from the LBS AS or the ALN comprise instructions configured to cause the processor to at least one of receive location assistance data from the LBS AS or the ALN, or receive a location estimate for the mobile device from the LBS AS or the ALN.

45. The processor-readable storage medium of example 42, further comprising instructions configured to cause the processor to receive a venue-assigned identifier (VID) from the LBS AS, wherein the VID is temporarily unique to the mobile device, and wherein the second identity includes the VID.

46. The processor-readable storage medium of example 45 wherein the VID comprises a Media Access Control (MAC) address.

47. The processor-readable storage medium of example 42 further comprising instructions configured to cause the processor to send a third identity for the mobile device to a location server, wherein the third identity comprises the common identity for the mobile device.

48. The processor-readable storage medium of example 47 further comprising instructions configured to cause the processor to obtain location services from the location server.

49. The processor-readable storage medium of example 48, wherein the instructions configured to cause the processor to obtain location services from the location server comprise instructions configured to cause the processor to at least one of receive location assistance data from the location server, or receive a location estimate for the mobile device from the location server.

50. The processor-readable storage medium of example 49 wherein the location server is a Secure User Plane Location (SUPL) Location Platform (SLP) and wherein the instructions configured to cause the processor to receive location assistance data from the location server or receive a location estimate for the mobile device from the location server comprise instructions configured to cause the processor to use a SUPL session with the location server to receive the location assistance data or the location estimate.

51. The processor-readable storage medium of example 47, further comprising instructions configured to cause the processor to receive a venue-assigned identifier (VID) from the location server, wherein the VID is temporarily unique to the mobile device, and wherein the first identity and the second identity includes the VID.

52. The processor-readable storage medium of example 51 wherein the VID comprises a Media Access Control (MAC) address.

53. The processor-readable storage medium of example 42 wherein the ALN comprises at least one of an IEEE 802.11 WiFi access point (AP), a Bluetooth AP, or a Femtocell.

The invention claimed is:

1. A location server comprising:

a receiver configured to receive, from a location-based services application server, a first identification for a first mobile device associated with the location-based services application server, the receiver being further configured to receive, from an access/location network, a second identification for a second mobile device associated with the access/location network; and a processor, communicatively coupled to the receiver, configured to determine whether the first identification matches the second identification and to determine whether the first mobile device and the second mobile device are the same mobile device based at least in part on whether the first identification matches the second identification, the processor being further configured to provide a location service for the first mobile device in response to the determining that the first mobile device and the second mobile device are the same mobile device.

2. The location server of claim 1, wherein to provide the location service the processor is configured to provide location assistance data to the first mobile device, or provide a location estimate to the first mobile device, or provide a location estimate for the first mobile device to the location-based services application server, or a combination thereof.

3. The location server of claim 2, wherein the processor is configured to obtain the location estimate for the first mobile device using measurements for the first mobile device provided by the access/location network, or a location estimate for the first mobile device provided by the first mobile device, or location measurements provided by the first mobile device, or a combination thereof.

4. The location server of claim 3, wherein the location server is a Secure User Plane Location (SUPL) Location Platform (SLP) and the processor is configured to obtain the location estimate for the first mobile device using a SUPL session between the location server and the first mobile device.

5. The location server of claim 1, wherein the first identification includes a first internet protocol address and the second identification includes a second internet protocol address, or the first identification includes a first Media Access Control (MAC) address and the second identification includes a second MAC address.

6. The location server of claim 1, wherein the processor is further configured to send a venue-assigned identifier (VID) to the first mobile device, the VID being temporarily unique to the first mobile device.

7. The location server of claim 6, wherein the VID comprises a first Media Access Control (MAC) address.

8. The location server of claim 1, further wherein the receiver is configured to receive, from a third mobile device, a third identification for the third mobile device;
wherein the processor is configured to determine whether the third identification matches the first identification and the second identification and to determine whether the first mobile device, the second mobile device, and the third mobile device are the same mobile device based at least in part on whether the third identification matches the first identification and the second identification;
wherein the processor is configured to provide the location service for the first mobile device is in response to the determining that the first mobile device, the second mobile device, and the third mobile device are the same mobile device; and
wherein the first identification, the second identification, and the third identification all include an Internet Protocol address, a Venue Assigned Identity or a Media Access Control address.

9. A location server comprising:
first receiving means for receiving, from a location-based services application server, a first identification for a first mobile device associated with the location-based services application server;
second receiving means for receiving, from an access/location network, a second identification for a second mobile device associated with the access/location network;
comparison means, communicatively coupled to the first receiving means and the second receiving means, for determining whether the first identification matches the second identification;
determining means for determining whether the first mobile device and the second mobile device are the same mobile device based at least in part on whether the first identification matches the second identification; and
location service information means, communicatively coupled to the comparison means, for providing a location service for the first mobile device in response to the comparison means determining that the first mobile device and the second mobile device are the same mobile device.

10. The location server of claim 9, wherein for providing the location service the location service information means are configured to provide location assistance data to the first mobile device, or provide a location estimate to the first mobile device, or provide a location estimate for the first mobile device to the location-based services application server, or a combination thereof.

11. The location server of claim 10, wherein the location service information means are configured to obtain the location estimate for the first mobile device using measurements for the first mobile device provided by the access/location network, or a location estimate for the first mobile device provided by the first mobile device, or location measurements provided by the first mobile device, or a combination thereof.

12. The location server of claim 11, wherein the location server is a Secure User Plane Location (SUPL) Location Platform (SLP) and the location service information means are configured to obtain the location estimate for the first mobile device using a SUPL session between the location server and the first mobile device.

13. The location server of claim 9, wherein the first identification includes a first internet protocol address and the second identification includes a second internet protocol address, or the first identification includes a first Media Access Control (MAC) address and the second identification includes a second MAC address.

14. The location server of claim 9, further comprising venue identifier means for sending a venue-assigned identifier (VID) to the first mobile device, the VID being temporarily unique to the first mobile device.

15. The location server of claim 9, further comprising third receiving means for receiving, from a third mobile device, a third identification for the third mobile device;
wherein the comparison means are configured to determine whether the third identification matches the first identification and the second identification and to determine whether the first mobile device, the second mobile device, and the third mobile device are the same mobile device based at least in part on whether the third identification matches the first identification and the second identification;
wherein the location service information means are configured to provide the location service for the first mobile device is in response to the comparison means determining that the first mobile device, the second mobile device, and the third mobile device are the same mobile device; and wherein the first identification, the second identification, and the third identification all include an Internet Protocol address, a Venue Assigned Identifier or a Media Access Control address.

16. A method of providing location-based services, the method comprising:
receiving, at a location server from a location-based services application server, a first identification for a first mobile device associated with the location-based services application server;
receiving, at the location server from an access/location network, a second identification for a second mobile device associated with the access/location network;
determining whether the first identification matches the second identification;
determining whether the first mobile device and the second mobile device are the same mobile device based at least in part on whether the first identification matches the second identification; and
enabling location services for the first mobile device in response to determining that the first mobile device and the second mobile device are the same mobile device.

17. The method of claim 16 wherein the enabling location services comprises providing location assistance data to the first mobile device, or providing a location estimate to the first mobile device, or providing a location estimate for the first mobile device to the location-based services application server, or a combination thereof.

18. The method of claim 17 wherein the location estimate for the first mobile device is obtained using measurements for the first mobile device provided by the access/location network, or a location estimate for the first mobile device provided by the first mobile device, or location measurements provided by the first mobile device, or a combination thereof.

19. The method of claim 18 wherein the location server is a Secure User Plane Location (SUPL) Location Platform (SLP) and the location estimate for the first mobile device provided by the first mobile device or the location measurements provided by the first mobile device are obtained using a SUPL session between the location server and the first mobile device.

20. The method of claim 16 wherein the first identification includes a first internet protocol address and the second identification includes a second internet protocol address, or the first identification includes a first Media Access Control (MAC) address and the second identification includes a second MAC address.

21. The method of claim 16 further comprising sending a first venue-assigned identifier (VID) to the first mobile device from the location-based services application server, wherein the first VID is temporarily unique to the first mobile device, and wherein the first identification includes the first VID and the second identification includes a second VID.

22. The method of claim 21 wherein the first VID comprises a first Media Access Control (MAC) address and the second VID comprises a second MAC address.

23. The method of claim 16 further comprising:
receiving, at the location server from a third mobile device, a third identification for the third mobile device;
determining whether the third identification matches the first identification and the second identification; and
determining whether the first mobile device, the second mobile device, and the third mobile device are the same mobile device based at least in part on determining whether the third identification matches the first identification and the second identification;
wherein the enabling location services for the first mobile device is in response to determining that the first mobile device, the second mobile device, and the third mobile device are the same mobile device.

24. The method of claim 23 wherein the first identification includes a first internet protocol address, the second identification includes a second internet protocol address and the third identification includes a third internet protocol address.

25. The method of claim 23 wherein the first identification includes a first Media Access Control (MAC) address, the second identification includes a second MAC address and the third identification includes a third MAC address.

26. The method of claim 23 further comprising sending a venue-assigned identifier (VID) to either the first mobile device from the location-based services application server or to the third mobile device from the location server, wherein the VID is temporarily unique to the mobile device to which it is sent.

27. The method of claim 26, wherein determining whether the third identification matches the first identification and the second identification comprises determining that the first identification, the second identification and the third identification each comprise the VID.

28. The method of claim 26 wherein the VID comprises a Media Access Control (MAC) address.

29. The method of claim 16 wherein the access/location network comprises an IEEE 802.11 WiFi access point (AP), or a Bluetooth AP, or a Femtocell, or a combination thereof.

30. The method of claim 16 wherein enabling location services for the first mobile device comprises enabling location services for the first mobile device from the location-based services application server.

31. The method of claim 16 further comprising withholding location services for the first mobile device from the location server in response to failing to determine that the first mobile device and the second mobile device are same mobile device.

32. A processor-readable storage medium comprising processor-readable instructions configured to cause a processor to:
receive, from a location-based services application server, a first identification for a first mobile device associated with the location-based services application server;
receive, from an access/location network, a second identification for a second mobile device associated with the access/location network;
determine whether the first identification matches the second identification;
determine whether the first mobile device and the second mobile device are the same mobile device based at least in part on whether the first identification matches the second identification; and
enable location services for the first mobile device in response to determining that the first mobile device and the second mobile device are the same mobile device.

33. The processor-readable storage medium of claim 32 wherein the instructions configured to cause the processor to enable location services comprise instructions configured to cause the processor to provide location assistance data to the first mobile device, or provide a location estimate to the first mobile device, or provide a location estimate for the first mobile device to the location-based services application server, or a combination thereof.

34. The processor-readable storage medium of claim 33 further comprising instructions configured to cause the processor to obtain the location estimate for the first mobile device using measurements for the first mobile device provided by the access/location network, or a location estimate for the first mobile device provided by the first mobile device, or location measurements provided by the first mobile device, or a combination thereof.

35. The processor-readable storage medium of claim 34 wherein the instructions include instructions configured to cause the processor to obtain the location estimate for the first mobile device provided by the first mobile device or the location measurements provided by the first mobile device are obtained using a Secure User Plane Location session with the first mobile device.

36. The processor-readable storage medium of claim 32 wherein the first identification includes a first internet protocol address and the second identification includes a second internet protocol address, or the first identification includes a first Media Access Control (MAC) address and the second identification includes a second MAC address.

37. The processor-readable storage medium of claim 32 further comprising instructions configured to cause the processor to:
receive, from a third mobile device, a third identification for the third mobile device;
determine whether the third identification matches the first identification and the second identification; and
determine whether the first mobile device, the second mobile device, and the third mobile device are the same mobile device based at least in part on determining whether the third identification matches the first identification and the second identification;
wherein the instructions configured to cause the processor to enable location services for the first mobile device are configured to cause the processor to do so in response to determining that the first mobile device, the second mobile device, and the third mobile device are the same mobile device.

38. The processor-readable storage medium of claim 37 wherein the first identification includes a first internet protocol address, the second identification includes a second internet protocol address and the third identification includes a third internet protocol address.

39. The processor-readable storage medium of claim 37 wherein the first identification includes a first Media Access Control (MAC) address, the second identification includes a second MAC address and the third identification includes a third MAC address.

40. The processor-readable storage medium of claim 37 further comprising instructions configured to cause the processor to send a venue-assigned identifier (VID) to the third mobile device, wherein the VID is temporarily unique to the mobile device to which it is sent.

41. The processor-readable storage medium of claim 40, wherein the instructions configured to cause the processor to determine whether the third identification matches the first identification and the second identification comprise instructions configured to cause the processor to determine that the first identification, the second identification and the third identification each comprise the VID.

42. The processor-readable storage medium of claim 40 wherein the VID comprises a Media Access Control (MAC) address.

43. The processor-readable storage medium of claim 32 wherein the access/location network comprises an IEEE 802.11 WiFi access point (AP), or a Bluetooth AP, or a Femtocell, or a combination thereof.

44. The processor-readable storage medium of claim 32 further comprising instructions configured to cause the processor to withhold location services for the first mobile device from the location-based services application server in response to failing to determine that the first mobile device and the second mobile device are same mobile device.

* * * * *